(12) United States Patent
Riddle et al.

(10) Patent No.: US 9,405,115 B2
(45) Date of Patent: Aug. 2, 2016

(54) LASER BEAM GUIDANCE SYSTEMS AND METHODS

(71) Applicant: CALIFORNIA INSTITUTE OF TECHNOLOGY, Pasadena, CA (US)

(72) Inventors: Reed Riddle, Pasadena, CA (US); Christoph Baranec, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 584 days.

(21) Appl. No.: 13/843,112

(22) Filed: Mar. 15, 2013

(65) Prior Publication Data
US 2013/0265413 A1 Oct. 10, 2013

Related U.S. Application Data

(60) Provisional application No. 61/622,319, filed on Apr. 10, 2012.

(51) Int. Cl.
| | |
|---|---|
| *H04N 7/18* | (2006.01) |
| *G02B 26/06* | (2006.01) |
| *G02B 23/00* | (2006.01) |
| *G02B 23/02* | (2006.01) |
| *G02B 7/00* | (2006.01) |
| *G03B 21/20* | (2006.01) |
| *G05B 15/02* | (2006.01) |

(Continued)

(52) U.S. Cl.
CPC .............. *G02B 26/06* (2013.01); *G01B 11/00* (2013.01); *G01J 3/021* (2013.01); *G01J 3/027* (2013.01); *G01J 3/0224* (2013.01); *G01J 3/0229* (2013.01); *G01J 3/0237* (2013.01); *G01J 3/32* (2013.01); *G01J 3/36* (2013.01);
*G01J 9/00* (2013.01); *G02B 7/003* (2013.01); *G02B 23/00* (2013.01); *G02B 23/02* (2013.01); *G02B 23/06* (2013.01); *G02B 26/0816* (2013.01); *G02B 27/40* (2013.01); *G03B 21/2033* (2013.01); *G05B 15/02* (2013.01)

(58) Field of Classification Search
CPC ....... G02B 23/10; G02B 23/105; G02B 27/30
See application file for complete search history.

(56) References Cited

U.S. PATENT DOCUMENTS

| | | |
|---|---|---|
| 3,517,998 A | 6/1970 | Pryor |
| 4,757,268 A | 7/1988 | Abrams et al. |

(Continued)

FOREIGN PATENT DOCUMENTS

JP 01061724 A 3/1989

OTHER PUBLICATIONS

Davies et al., "Adaptive Optics for Astronomy"; Annu. Rev. Astron. Astrophysics, 2012, pp. 1-47.*

(Continued)

*Primary Examiner* — Christopher Findley
(74) *Attorney, Agent, or Firm* — Steinfl & Bruno, LLP

(57) ABSTRACT

An automated adaptive optics and laser projection system is described. The automated adaptive optics and laser projection system includes an adaptive optics system and a compact laser projection system with related laser guidance programming used to correct atmospheric distortion induced on light received by a telescope. Control of the automated adaptive optics and laser projection system is designed in a modular manner in order to facilitate replication of the system to be used with a variety of different telescopes. Related methods are also described.

14 Claims, 26 Drawing Sheets

(51) Int. Cl.
| | |
|---|---|
| G01B 11/00 | (2006.01) |
| G02B 23/06 | (2006.01) |
| G02B 26/08 | (2006.01) |
| G02B 27/40 | (2006.01) |
| G01J 9/00 | (2006.01) |
| G01J 3/02 | (2006.01) |
| G01J 3/32 | (2006.01) |
| G01J 3/36 | (2006.01) |

(56) References Cited

U.S. PATENT DOCUMENTS

| | | | |
|---|---|---|---|
| 5,278,402 | A | 1/1994 | Wein |
| 6,548,796 | B1 | 4/2003 | Silvermintz et al. |
| 6,630,656 | B2 | 10/2003 | Wirth |
| 6,704,331 | B2 | 3/2004 | Payne et al. |
| 8,853,604 | B1 | 10/2014 | Barchers |
| 9,279,977 | B2 | 3/2016 | Baranec et al. |
| 2002/0196505 | A1 | 12/2002 | Cordier et al. |
| 2002/0196506 | A1 | 12/2002 | Graves |
| 2003/0071969 | A1 | 4/2003 | Levine et al. |
| 2006/0056468 | A1 | 3/2006 | Dantus et al. |
| 2006/0180744 | A1 | 8/2006 | Shen |
| 2006/0196506 | A1 | 9/2006 | Ubogaya et al. |
| 2007/0117227 | A1 | 5/2007 | Gu |
| 2007/0176077 | A1* | 8/2007 | Barchers ............... G01J 9/00 250/201.9 |
| 2008/0042042 | A1 | 2/2008 | King et al. |
| 2009/0078850 | A1 | 3/2009 | Pinto |
| 2011/0078434 | A1 | 3/2011 | Chu et al. |
| 2011/0228386 | A1 | 9/2011 | King et al. |
| 2012/0018614 | A1 | 1/2012 | King et al. |
| 2013/0176574 | A1 | 7/2013 | Sirat |
| 2015/0023645 | A1 | 1/2015 | Boelen et al. |

OTHER PUBLICATIONS

Babcock, H. W. *The possibility of compensating astronomical seeing.* Publ. Astron. Soc. Pac. 65, 229-236 (1953).

Baranec, C. et al. *Deployment of low-cost replicable laser adaptive optics on 1-3 meter class telescopes.* Astro2010: The Astronomy and Astrophysics Decadal Survey (2009).

Baranec, C et al. *Robo-AO: An Autonomous Laser Adaptive Optics and Science System.* OSA Conference on Adaptive Optics: Methods, Analysis and Applications (2011).

Baranec, C. et al. *Robo-AO: autonomous and replicable laser-adaptive-optics and science system.* OSA Conference on Adaptive Optics: Methods, Analysis and Application, Draft Version. (2011).

Baranec, C. et al. *Bringing the Visible Universe into Focus with Robo-AO.* J. Vis. Exp. ( ), e50021, doi:10.3791/50021 (2013).

Basden, A. G et al. Photon counting strategies with low-light-level CCDs. Monthly Notices of the Royal Astronomical Society, 345, 985-991. (2003).

Beckers J.M. *Adaptive Optics for Astronomy: Principles, Performance, and Applications.* Annu. Rev. Astron. Astrophy. vol. 31, pp. 13-62 (1993).

Bifano, T. et al. *MEMS deformable mirrors in astronomical adaptive optics.* 1st AO4ELT conference, 06003 (DOI:10.1051/ao4elt/201006003) (2010).

Cenko, S. B. et al. *The automated Palomar 60 inch telescope.* PASP, 118: 1396-1406 (2006).

Choi, P. I. et al. *KAPAO: a Pomona College adaptive optics instrument.* Bulletin of the American Astronomical Society, 43 (2011).

Davies, R. & Kasper, M. *Adaptive Optics for Astronomy.* Annu. Rev. Astron. Astrophys., in press (arXiv:astro-ph/1201.5741) (2012).

Devaney, N. et al. *Chromatic effects of the atmosphere on astronomical adaptive optics.* Ap. Op. 47, 8 (2008).

DOD Instruction 3100.11 Illumination of Objects in Space by Lasers. Mar. 31, 2000.

Fugate, R. Q., ed. Laser Guide Star Adaptive Optics. Proc. Workshop, Mar. 10-12, Starfire Optical Range, Phillips Lab./LITE, Kirtland AFB, NM 87117-6008, pp. 606-618 (1992).

Goldstein, R. *Pockels Cell Primer.* Laser Focus, Feb. 21-26, 1968.

Gupta, R. et al. *IUCCA 2 meter telescope and its first light instrument.* IFOSC BASI, 30, 785 (2002).

Hart, M. Recent advances in astronomical adaptive optics. Appl. Opt. 49, D17-D29 (2010).

Law, N. *Lucky imaging: diffraction-limited astronomy from the ground in the visible.* Ph. D., U. of Cambridge (2006).

Law, N. M. et al.. Three new eclipsing white-dwarf—M-dwarf binaries discovered in a search for transiting Planets around M-dwarfs. ApJ, in press. Version Dated: Dec. 9, 2011.

Linnik, V. P. On the possibility of reducing atmospheric seeing in the image quality of stars. Opt. Spectrosc. 3, 401-402 (1957).

Milton, N. M. M. *Tomographic reconstruction of wavefront aberrations using multiple laser guide stars.* Ph. D., U. of Arizona (2009).

Platt, B. C. & Shack, R. *History and principles of Shack-Hartmann wavefront sensing.* J. Refract Surg.17:S573-S577 (2001).

Riddle, R.L. et al. *The Robo-AO software: Fully autonomous operation of a laser guide star adaptive optics and science system.* Caltech Optical Observatories. Draft Version dated: Jan. 28, 2013.

Terziev, E. et al. Millions of Multiples: Detecting and Characterizing Close-Separation Binary Systems in Synoptic Sky Surveys. Draft Version dated: Oct. 18, 2012.

Thompson, L. A., & Teare, S. W. Rayleigh laser guide star systems: application to the University of Illinois seeing improvement system, PASP, 114:1029-1042 (2002).

Zigman, S. Effects of near ultraviolet radiation on the lens and retina. Doc Ophthalmol. Sep. 30;55(4):375-91 (1983).

Palomar Observatory "Robo-AO Comes to Palomar" Palomar Skies, Sep. 29, 2010. 5 pages.

Egner et al. "Atmospheric dispersion correction for the Subaru AO system" Proceedings of the SPIE, vol. 7736, id. 77364V, 2010. 10 pages.

Wizinowich et al. "The W.M. Keck Observatory Laser Guide Star Adaptive Optics System: Overview" Publications of the Astronomical Society of the Pacific. Feb. 9, 2006, vol. 118, pp. 297-309.

Notice of Allowance for U.S. Appl. No. 13/842,996, filed Mar. 15, 2013 on behalf of Christoph Baranec. Mail Date: Nov. 2, 2015. 12 pages.

Non-Final Office Action for U.S. Appl. No. 13/842,441, filed Mar. 15, 2013 on behalf of Christoph Baranec. Mail Date: Jul. 28, 2015. 37 pages.

Final Office Action for U.S. Appl. No. 13/842,441, filed Mar. 15, 2013 on behalf of Christoph Baranec. Mail Date: Jan. 29, 2016. 45 pages.

Non-Final Office Action for U.S. Appl. No. 13/843,265, filed Mar. 15, 2013 on behalf of Reed Riddle. Mail Date: Jan. 7, 2016. 35 pages.

Final Office Action for U.S. Appl. No. 13/843,265, filed Mar. 15, 2013 on behalf of Reed Riddle. Mail Date: Apr. 22, 2016. 38 pages.

* cited by examiner

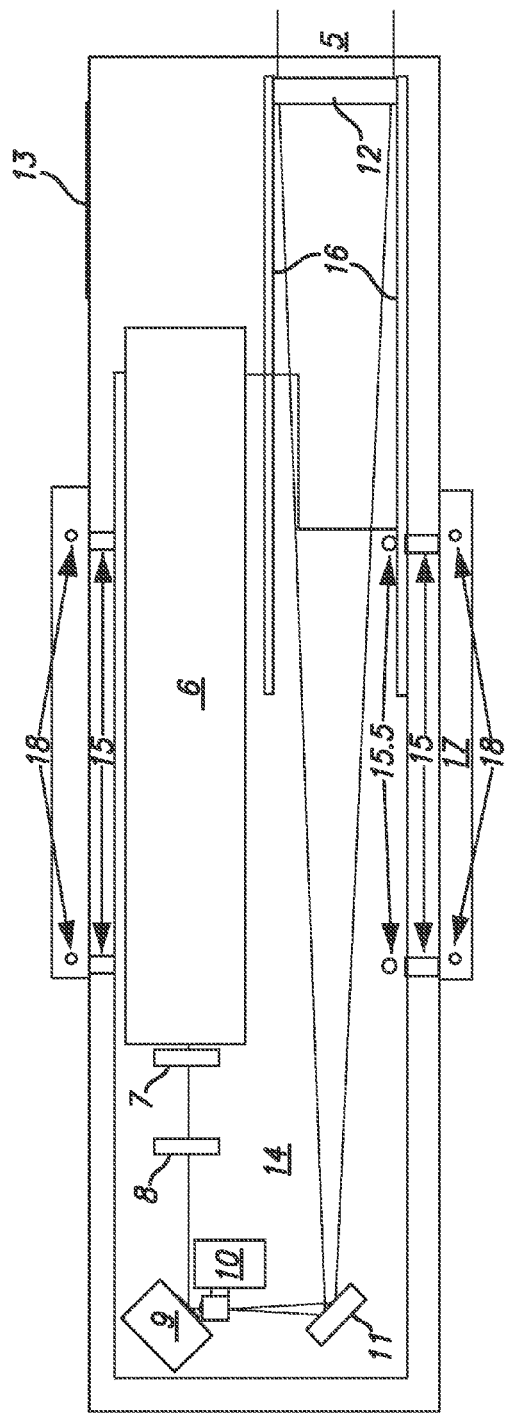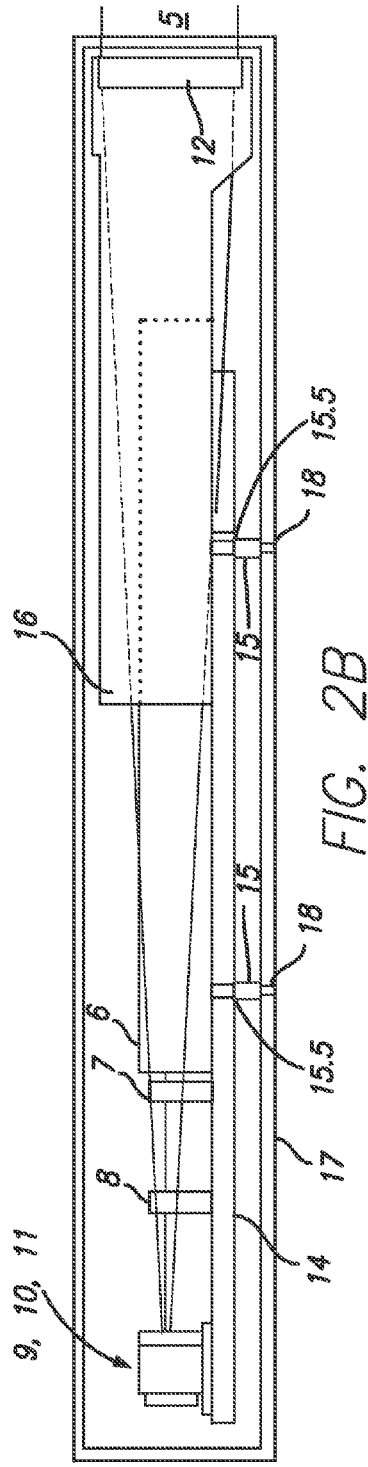
FIG. 2A
FIG. 2B

LASER BEAM GUIDANCE SYSTEMS AND METHODS

CROSS REFERENCE TO RELATED APPLICATIONS

The present application claims priority to U.S. Provisional Application No. 61/622,319 filed on Apr. 10, 2012 and incorporated herein by reference in its entirety.

The present application is related to U.S. application Ser. No. 13/842,996 entitled "Compact Laser Projection Systems and Methods" filed on even date herewith and incorporated herein by reference in its entirety. The present application is also related to U.S. application Ser. No. 13/842,441 entitled "Robotic Adaptive Optics and Laser Systems and Methods for Correcting Atmospheric Distortion" filed on even date herewith and incorporated herein by reference in its entirety. The present application is also related to U.S. application Ser. No. 13/843,265 entitled "Systems and Methods for Modularized Control of Robotic Adaptive Optics and Laser Systems" filed on even date herewith and incorporated herein by reference in its entirety.

STATEMENT OF GOVERNMENT GRANT

This invention was made with government support under AST0906060 & AST0960343 awarded by the National Science Foundation. The government has certain rights in the invention

FIELD

The present application is directed to adaptive optics laser systems and related devices and software control methods.

BACKGROUND

Images of astronomical objects produced by ground-based telescopes are limited by degrading effects of turbulent atmosphere. Light from distant objects arrives at Earth as plane waves. In the absence of atmosphere, the theoretical angular resolution of a telescope is limited only by diffraction. Such diffraction is measurable by noting the observing wavelength ($\lambda$) and dividing the observing wavelength by the size of the telescope's primary mirror or aperture (D).

However, in reality, one must account for atmosphere. The atmosphere contains cells of air at different temperatures with resulting different indices of refraction. The presence of such atmosphere causes the light to become non-planar. This causes the ground-based telescopes, when they try to focus on these light waves, to obtain images which appear distorted and blurry. Such images also change as a function of time as the atmosphere the light waves travel through also change over time.

In order to compensate for distortions caused by the atmosphere, laser adaptive optics systems have been used. Such systems are capable of measuring the atmospheric distortions induced onto a laser projected into the sky and then apply compensating effects accordingly to the light received by the ground-based telescope since the light would have similar distortions as the laser.

Laser adaptive optics systems can compensate for effects of atmospheric turbulence. A high-powered laser is projected in the direction the telescope is pointed and is used as a probe of the atmosphere. A tiny fraction of the laser light from the high-power laser returns back towards the telescope which has similar non-planar optical distortions as the light being observed. Internal measurements and calculations done by the laser adaptive optics system on the shape of the laser light received can then be used to shape the incoming light waves being observed to be flat (planar) again.

SUMMARY

According to a first aspect of the present disclosure a system comprising: a laser projection system configured to project a laser beam, whereby at least a portion of the laser beam is returned to the system for detection of an error; an adaptive optics system configured to use the detected error to perform a compensating action comprising modifying an operating characteristic of at least one optical component contained in the laser projection system; and an automated laser alignment system comprising a computer, the computer including a processor and a computer-readable storage medium, the computer-readable storage medium having stored thereon, instructions for automatically performing steps directed at a) controlling the projection of the laser beam by the laser projection system and b) executing the compensating action in the adaptive optics system.

According to a second aspect of the present disclosure a method comprising: activating a laser projection system to propagate a laser beam, whereby at least a portion of the laser beam is returned to the system for detection of an error; configuring an adaptive optics system to detect the detected error to perform a compensating action comprising modifying an operating characteristic of at least one optical component contained in the laser projection system; and executing a computer-controlled automated acquisition procedure to automatically align the laser projection system, the automated acquisition procedure comprising: capturing in a wavefront sensor, an image associated with a portion of the projected laser beam returned; and using information obtained by processing the captured image to perform a compensating operation directed at addressing the error.

BRIEF DESCRIPTION OF THE DRAWINGS

FIGS. 2A-C show a compact laser projection system used in the robotic adaptive optics laser system of FIG. 1.

FIG. 3A shows the internal components and light paths of the adaptive optics system. FIG. 3B shows the internal components and light paths of the internal light source used during a calibration mode of the adaptive optics system.

FIG. 8 shows a flow chart for a weather monitoring control subsystem daemon.

FIGS. 12-1 and 12-2 show a software architecture of a 'visible instrument camera' control subsystem daemon.

FIGS. 13-1 and 13-2 show a software architecture of an infrared camera control subsystem daemon.

FIGS. 14-1 and 14-2 show a software architecture of an adaptive optics control subsystem daemon.

FIGS. 15-1 and 15-2 show a software architecture of a laser guide star control subsystem daemon.

FIGS. 16-1 and 16-2 show a basic architecture of a robotic control system subsystem daemon.

FIGS. 17-1 and 17-2 show a detailed flow chart of a robotic system control observation thread.

DETAILED DESCRIPTION

Embodiments of the present disclosure aim to fully automatize calibration and operation of a telescope, e.g. a ground based robotic telescope, with its adaptive optics and laser projection system. This is achieved in two ways: 1) modularization within the adaptive optics and laser projection systems so that the adaptive optics and laser systems can easily be replicated and customized for any telescope and 2) implementation of corresponding software to automate the entire process, the software being implemented in a way that facilitates the modularization of the adaptive optics and laser projection system. The detailed description of the present application will first describe in detail the apparatus and hardware pertaining to the robotic adaptive optics laser system (Robo-AO). Afterwards, a detailed explanation of the corresponding software and methods used to operate the Robo-AO will be provided.

Hardware/Apparatus

Figure 1:
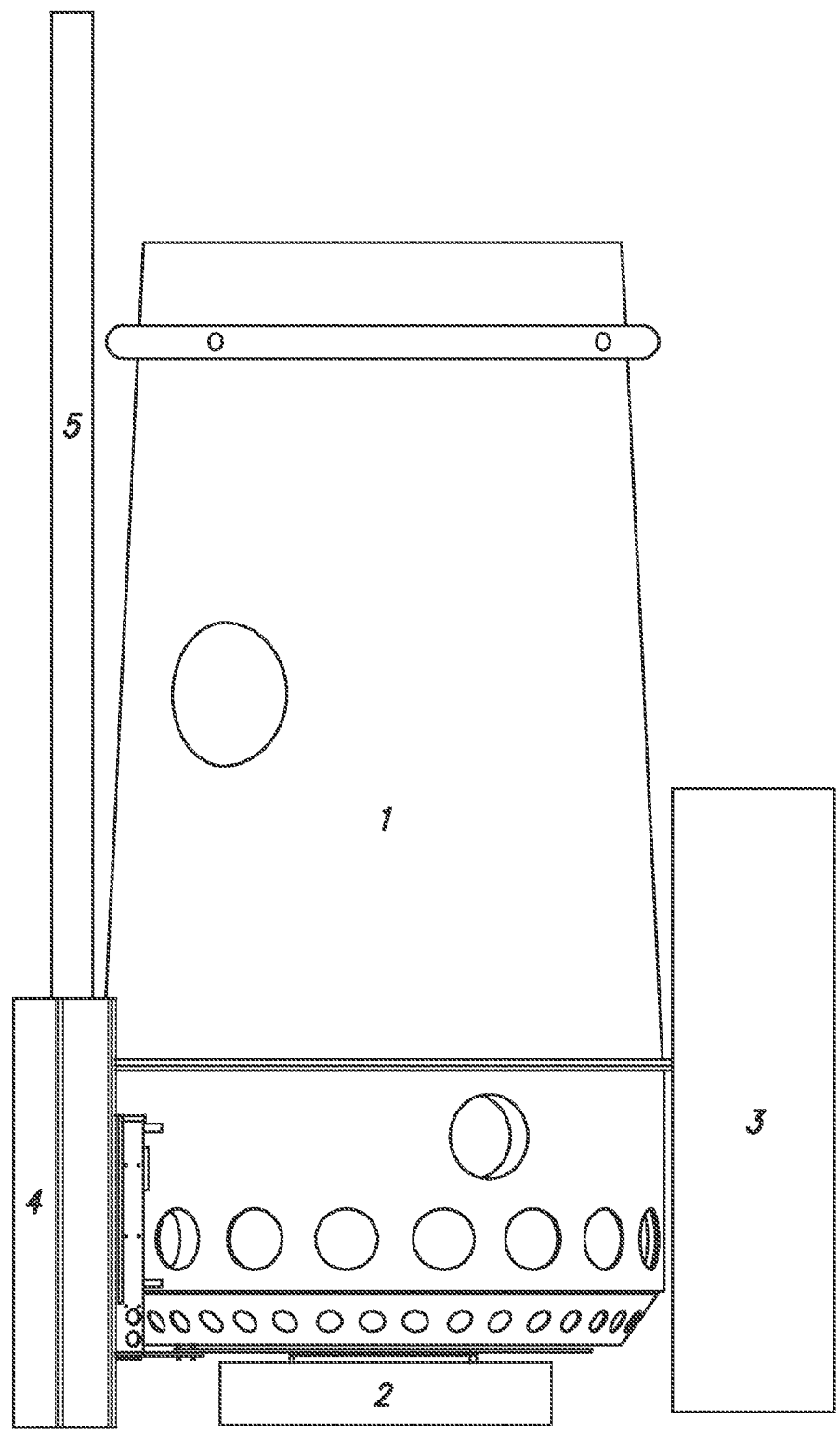
FIG. 1 is a top schematic view showing a robotic adaptive optics laser system with a telescope in accordance with the present disclosure.

FIG. 1 is a top schematic view showing a robotic adaptive optics laser (Robo-AO) system (2, 3, 4) being associated with a telescope (1). The Robo-AO system includes a container mounted at a focus of the telescope that houses an adaptive optics (AO) system and respective science instruments (2), a set of support electronics and computers (3) and a compact laser projection system (4).

The set of support electronics and computers (3) includes at least one processor used to oversee the entire Robo-AO system. It will be understood that the word "processor" as used herein in this disclosure, can be interpreted in some embodiments as referring to a single device (such as a microprocessor chip), and in other embodiments as referring to a computer unit containing multiple elements (such as a controller device incorporating a microprocessor chip and input-output circuits). Such variations in terminology will be understood in the context of usage, by persons of ordinary skill in the art.

Additionally, the compact laser projection system (4) of the Robo-AO provides a laser beam (5) used to measure (or probe) for optical distortions caused by atmospheric turbulence which would be induced onto observed light that the telescope (1) would receive from an object to be observed (such as an astronomical object in the sky).

Although FIG. 1 and the related text of the present application describe embodiments using a telescope, the person skilled in the art will understand that the present application is also applicable in other embodiments. The benefit of using the Robo-AO with respect to a telescope is to provide a process of acquiring images from objects to be observed in a more efficient manner as well as without the use of a human operator.

Without the use of the AO system (2), images obtained by the telescope (1) are distorted and unclear. Such distortion and clarity issues with the images are caused by atmospheric turbulence induced on the light traveling from the target or object to be observed (e.g., an astronomical object) to the telescope (1). Calibrations to the telescope (1) and accompanying systems are provided to compensate for the given presence of atmospheric turbulence. A general description of the process is provided below.

After the telescope (1) is pointed at a selected object to be observed, a compact laser projection system (4) is turned on. The compact laser projection system (4) emits a laser beam (5) in the same direction as the robotic telescope (1) towards the selected object.

A wavefront sensor (not shown in the figure) within the AO system (2) obtains Rayleigh scattered light from the laser beam (5) returning back from the atmosphere from around ten kilometers away. The reflected laser beam (5) is used to measure a dynamic wavefront error induced by the atmosphere. A control computer within the set of support electronics and computers (3) calculates a compensatory shape for a deformable mirror (42) within the AO system (2) to correct for the measured dynamic wavefront error obtained. The AO system (2) then applies the correction to the incoming light from the object being observed by the telescope (1). This correction is possible because the Rayleigh scattered light from the laser beam (5) should contain similar non-planar optical distortions caused by the atmosphere as the light from the object being observed.

The control computer described above sends commands and receives feedback from the telescope (1) and the AO system (2). The same control computer also commands other support electronics (2) used to control a sub set of components of the AO system (2) and the compact laser projection system (4).

Figure 2C:
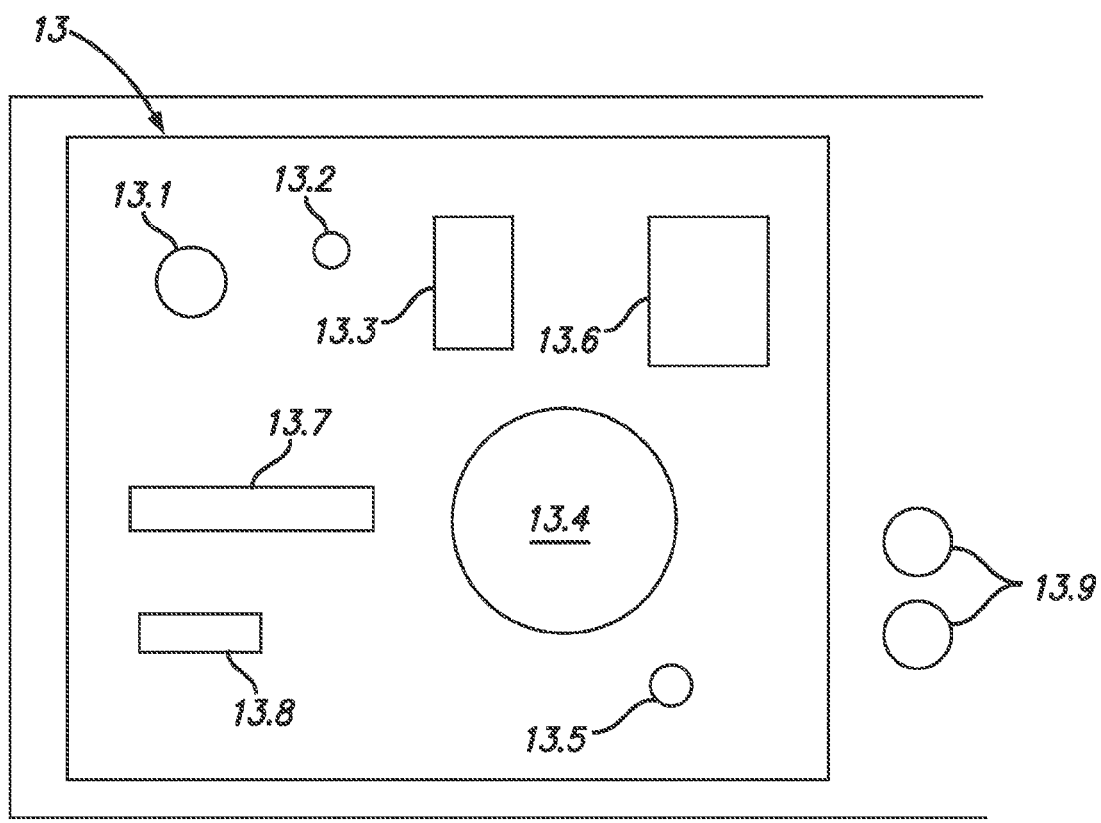

Focus will now turn to the compact laser projection system (4) used in the Robo-AO system as seen in FIGS. 2A-2C. The compact laser projection system (4) includes a high-powered laser source (6), a redundant external safety shutter (7), a half-wave plate (8), a beam steering mirror (9) and a positive lens (10). The control computer described above is capable of controlling all the above elements (6, 7, 8, 9 and 10) within the compact laser projection system (4).

Generally observatories have laser projection systems which are much larger and cannot be attached to the side of the ground-based telescope. These laser projection systems can have multiple parts (e.g. the laser may be physically separate from the projection optics), may be housed in separate rooms and custom built for a particular or specific type of telescope. The concept of miniaturizing and standardizing a laser projection system to be used across a plurality of different types of telescopes has not been previously undertaken, and will be described in detail below. The outcome in accordance with the present disclosure is that a single laser projection system can be easily replicated to be used over a number of different telescopes.

The embodiments of FIGS. 2A-2C of the present disclosure describe a compact laser projection system (4) which is not only compact but also modular in design. This facilitates replication and use of such laser projection system among numerous different ground-based telescopes. With the exception of the drive electronics and laser chiller which can be ten or more meters away, all the elements associated with the compact laser projection system (4) is contained in a housing element (which is, for example, 1.5 m long, 0.25 m high and 0.5 m wide). The housing element can be attached and detached from a telescope. The housing (e.g. a box) is, for example, approximately 70 kg in weight. Such compact package, compared to prior implementations of the laser projection system, makes the present design of the compact laser projection system (4) easier to replicate. Furthermore, attachment platforms or adaptor brackets (later described below) are provided so that the compact laser projection system (4) can be attached to several different types of telescopes.

With reference to FIG. 2A, a cross-sectional view from the top of the compact laser projection system (4) is provided. This view illustrates components as well as an internal arrangement of the compact laser projection system (4). The compact laser projection system (4) contains a high-powered laser source (6), a redundant external safety shutter (7), a half-wave plate (8), a moveable beam steering mirror (9), positive lens (10) and a fold mirror (11). All the above elements of the compact laser projection system (4) are mounted on a lightweight and stiff honeycomb breadboard (14). The compact laser projection system (4) also contains an output aperture and lens (12) connected to the stiff honeycomb breadboard (14) by two substantially perpendicular light weighted cantilever lens mounts (16).

The output aperture and lens (12) are not directly connected to the external enclosure of the compact laser projection system (4). Instead, the output aperture and lens (12) are mounted at a free-standing end of the cantilever lens mount (16) that is projected beyond the honeycomb breadboard (14). The cantilever lens mount (16) has the other end attached to the honeycomb bread board (14).

With respect to the high-powered laser source (6), the laser source is used to generate a laser beam for the compact laser projection system (4) to be used. By way of example, the high-powered laser source (6) is capable of firing a 10 W beam. The beam diameter and divergence is not critical and can be changed via the positive lens (10). The wavelength of the high-powered laser source (6) is between 340 nm and 390 nm. Typical commercial wavelengths for laser sources can be between 351 nm and 355 nm. Additionally, by way of example, pulse laser length can be below 100 ns. In several embodiments, the laser pulse repetition rate is desired to be at least 1.2 kHz to operate the AO control system. Such a rate corresponds to one pulse per measurement. At most, the laser repetition rate should be 15 kHz to avoid having more than one returning laser beam in the atmosphere at the same time.

Reference is now made to the redundant external safety shutter (7) of FIG. 2A. The redundant external safety shutter (7) is provided as an extra layer of safety. Although these shutters have been included in the embodiment shown in FIG. 2A, there may be embodiments which do not utilize them. This is possible because the high-powered laser source (6) has its own internal shutter.

Next, focus will be placed on the half-wave plate (8). The half-wave plate (8) is located inside a motorized rotatable stage which is used by the compact laser projection system (4) to rotate the linear polarization of the projected laser beam corresponding to the beam of laser light (5) of FIG. 1. By rotating the half-wave plate (8), the polarization of the linearly polarized light source can be rotated. The magnitude by which the polarization can be rotated is twice an angle of rotation of the half-wave plate (8).

The above application of the half-wave plate (8) is significant because the first and second linear polarizers (60, 62) and the Pockels cell (61) of the AO system (2) (as seen in FIG. 3 below) desire laser light polarization orientation to be in a particular direction. The above process of Rayleigh scattering of the laser light preserves a particular polarization. Therefore, a matching arrangement to match the polarization produced by the compact laser projection system (4) to match the polarization needed by the first and second linear polarizers (60, 62) is desired.

In alternative embodiments, the half-wave plate (8) could be omitted if the AO system (2) were rotated with respect to an optical axis of the telescope. Rotating the AO system (2) in such a way would match the polarization of the returning laser beam and the first and second linear polarizers (60, 62). Alternatively, one could engineer a mount for the AO system (2) to provide a proper orientation.

Rotation of the half-wave plate (8) is performed through a motorized rotation stage to which the half-wave plate (8) is mounted to. The motorized rotation stage is used so that the half-wave plate (8) can be rotated without opening the housing of the compact laser projection system (4). Once a proper orientation is found for a given telescope and AO system setup, the position of the half-wave plate (8) usually does not need to be changed unless the same laser projector (4) is used in different telescope setups. However, there may be situations where, for example, an instrument field de-rotator is used with an Alt-Az type telescope, motorization of the half-wave plate may be necessary.

The next element in the compact laser projection system (4) is the moveable beam steering mirror (9). The moveable beam steering mirror (9) operates to reposition the laser beam from the high-powered laser source (6), thereby repointing the laser beam (5) being projected out of the compact laser projection system (4). The moveable beam steering mirror (9) is optically conjugated to the output aperture and lens (12). In other words, the positive lens (10) creates an image of the moveable beam steering mirror (9) at the same physical location as the output aperture and lens (12). Additionally, the positive lens (10) also can create an image of the output aperture and lens (12) at the same physical location as the moveable beam steering mirror (9).

Because of the relationship between the moveable beam steering mirror (9) and the output aperture and lens (12), the laser beam from the high-powered laser source (6) does not shift at the output aperture and lens (12) as the moveable beam steering mirror (9) is tilted in different directions. Additionally, such arrangement allows the laser beam from the high-powered laser source (6) to pivot about the output aperture and lens (12).

As discussed later, the moveable beam steering mirror (9) is controlled by wavefront sensor using tip and tilt signals. When commanded by the wavefront sensor, the moveable beam steering mirror (9) executes an outward spiral pointing procedure.

According to an embodiment of the disclosure, the moveable beam steering mirror (9) can repoint the laser beam (5) at rates of several hundreds Hertz and over a total useable range of 160 by 228 arcseconds. In particular, there may be situations where the telescope (1) readjusts its direction and angle to acquire a target. In such situations, the moveable beam steering mirror (9) is able to repoint the laser beam (5) in order to realign the laser along the same optical axis as the telescope (1). Modes of operation pertaining to how the compact laser projection system (4) compensates for changes in the direction and angle of the telescope (1) will be further described below with reference to the software and methods used to control the compact laser projection system (4).

The total usable range (e.g. 160 by 228 arcseconds) is determined by how parallel the optical axis of the telescope and the optical axis of the compact laser projection system (4) can be maintained as the telescope points to different areas, as the overall system may experience different gravity vectors. Additionally, individual mechanical structures of the telescope as well as the rigidity of the telescope may also influence the total usable range.

With respect to the update rates (e.g. several hundred Hz) by which the moveable beam steering mirror (9) can repoint the laser beam (5), a slower update rate will tend to increase the amount of time it takes the system to find the laser beam (5). Generally, the update rate should be fast enough (e.g. 100 Hz) in order to keep up with vibrations in the telescope (1) and the compact laser projection system (4) structure so that accurate corrections can be made.

With continued reference to FIG. 2A, the laser beam from the high-powered laser source (6) then encounters the positive lens (10). The positive lens (10) is on a motorized positioning stage and is used to refocus the laser beam (thereby creating a beam waist) as discussed above.

With reference to the beam waist, situations may arise with prior art designs where the creation of intermediate foci of the laser beam with very high fluence levels can ionize air and disrupt propagation of the laser beam. This occurs because a mixture of super-heated gas and plasma is created at the beam waist thereby creating a chaotic lens in the air (turbulence) which would affect the laser beam passing through it. Such an occurrence tends to reduce overall transmission and results in a much larger projected laser spot, such as, e.g. a projected laser spot on the sky. The larger spot could negatively impact the performance of the AO system and could potentially prevent the AO system from working. However, such problem is not present in the structure according to the present disclosure, as such structure does not contain fluence levels high enough to ionize the surrounding air within the laser projection system.

A benefit of using the positive lens (10) instead of an alternative negative lens is that the moveable beam steering mirror (9) and the output aperture and lens (12) can be made optically conjugated as discussed above. This prevents the laser beam from the high-powered laser source (6) from shifting at the output aperture and lens (12) as the moveable beam steering mirror (9) is tilted in different directions. Therefore, one can maintain maximum throughput of the laser beam through the output aperture and lens (12).

If the positive lens (10) is not used and a negative lens is used instead, the effect would be that the moveable beam steering mirror (9) and the output aperture and lens (12) would not be optically conjugate. This would result in an outcome where the moveable beam steering mirror (9) is moved to different angles (such as in processes for re-acquiring the laser beam) and the laser beam from the high-powered laser source (6) would wander on the output lens (12) resulting in a transmission loss. Therefore, although use of a lens that is not a positive lens is possible, doing so will result at a cost of reduced performance.

An additional feature of the positive lens (10) is now described. By moving the positive lens (10) forwards and backwards, an image of the laser waist can be projected over a range of several kilometers. The distance from the positive lens (10) to a reimaged beam waist is a function of the forward and backward movement of the positive lens (10). Therefore, by moving the positive lens (10), one can move the location of the beam waist with respect to the output lens (12) (corresponding to the laser beam (5) being projected out of the compact laser projection system (4)).

By nature of a location of the beam waist being near the front focal distance of the output aperture and lens (12), a small change in the forward or backward motion of the positive lens (10) can cause very large changes in the distance the laser beam (5) is ultimately focused. For example, by moving the positive lens (10) thereby extending the reimaged beam waist by about 50 μm, the laser beam focus distance on the sky can be changed by 2 km.

The compact laser projection system (4) also uses the fold mirror (11) for the purpose of redirecting the laser beam from the positive lens (10) to the output aperture and lens (12). The fold mirror (11) is stationary and mounted to the honeycomb breadboard (14). The fold mirror (11) folds an optical path of the laser beam to keep the compact laser projection system (4) more compact compared to situations where the fold mirror (11) is not used. Therefore, the fold mirror (11) can be omitted if compactness of the laser projector box is not an issue.

The laser beam from the high-powered laser source (6) travels through the output aperture and lens (12) to create an almost collimated beam, corresponding to the laser beam (5) of FIG. 1. As stated above, the relationship of the positive lens (10) and the output aperture lens (12) influences the image of the beam waist (and the distance the laser beam (5) is projected) out of the compact laser projection system (4). According to an embodiment of the present application, an image of the beam waist corresponding to a distance of 10 km is used, although larger or shorter distances (e.g. 12 km and 6 km respectively) are also possible. Alternative distances from the image of the beam waist can also be implemented by changing a radius of curvature and conic constant on the powered side of the output lens (12).

The above elements, in particular the high-powered laser source (6), moveable beam steering mirror (9), positive lens (10), output aperture and lens (12) and fold mirror (11) all form a compact loopback arrangement. Such compact loopback arrangement assists in and provides the compact laser projection system (4) with the "miniaturization" or compactness features. Details will now be provided below regarding the non-optical elements of the compact laser projection system (4).

The high powered laser source (6), the redundant external safety shutter (7), the half-wave plate (8), the moveable beam steering mirror (9), the positive lens (10) and the fold mirror (11) are all mounted on a lightweight and stiff honeycomb breadboard (14). As shown in the cross-sectional side view of FIG. 2B, the use of the stiff honeycomb breadboard (14) provides an improved alignment for all optical elements of the compact laser projection system (4).

Although stiff alignment is also desired for the output aperture and lens (12), the output aperture and lens (12) are not directly connected to the honeycomb breadboard (14) because such a connection would block part of the expanding laser beam. To overcome the problem, the output aperture and lens (12) is connected to the honeycomb breadboard (14) through two perpendicular and substantially light-weighted cantilever lens mounts (16) as described above.

Additionally, the output aperture and lens (12) is not directly connected to the external enclosure of the compact laser projection system (4). Rather, a small gap is provided, for example around 1.5 mm wide, which is filled by a compliant gasket material. Such small gap mechanically decouples the above referenced optical elements (e.g. the high-powered laser source, the moveable beam steering mirror, etc. . . . ) from the external enclosure of the housing. This is significant because the external enclosure can shift and flex under its own weight influenced by different gravity vectors. The above referenced arrangement with the honeycomb bread board (14) allows the external enclosure to shift and flex without affecting any of the optical elements inside the compact laser projection system (4) mounted to the honeycomb breadboard (14).

The gap itself is filled to keep the enclosure of the compact laser projection system (4) sealed against dust and other particles which may enter the system and provide interference. The use of a compliant gasket material to seal the gap maintains the seal with negligible contact force between the enclosure and the output aperture and lens (12) and is able to adapt as the gap changes size over different gravity vectors.

As stated above, FIG. 2B shows a cross-sectional view of the compact laser projection system (4) of FIG. 2A. In particular, the honeycomb breadboard (14) is shown mounted to two crosswise mounted ribs (15). The two crosswise mounted ribs (15) have attachment points (15.5, two which are shown and two which are hidden by the positioning of the high-powered laser source (6)) to the honeycomb breadboard (14) and a base of the enclosure (17) of the compact laser projection system (4). The above configuration keeps the attachment points (15.5) in very close proximity (e.g. 3 inches) to the mounting points (18) of a laser projector adaptor later described below. In general, by minimizing a distance between the attachment points (15.5), a pointing stability of the honeycomb breadboard can be tied more directly to the laser projector adaptor (later described).

As stated above, all of the optical elements of the compact laser projection system (4) are connected to the honeycomb breadboard (14) in one manner and are therefore mechanically decoupled from the external enclosure (17) of the compact laser projection system (4). This allows the compact laser projection system (4) to be used over a full range of angles. In particular, as different angles are used, changing gravity vectors induce mechanical sag to the external enclosure (17). Such mechanical sag could then directly affect the optical elements if the optical elements were attached to the external enclosure (17). However, because the honeycomb breadboard (14) is decoupled from the external enclosure (17), the mechanical sag of the external enclosure (17) caused by changing gravity vectors does not affect the optical elements. This arrangement improves alignment of all optical elements within the compact laser projection system (4) over the range of angles used.

FIG. 2C shows electrical connections to components within the compact laser projection system (4). As shown in the figure, all the electrical connections to components within the compact laser projection system (4) go through an electrical interface panel (13). The electrical interface panel (13) is a removable panel that is on the side of and is attached to the laser projection system (4) as seen in FIG. 2A.

The redundant external safety shutter (7) uses shutter connection (13.1). A temperature sensor is attached inside via temperature connection (13.2). The high powered laser (6) uses ground connection (13.3) for ground, laser connection (13.4) for power and control and trigger connection (13.5) for a laser trigger. AC power for an internal heater is supplied through power connection (13.6). A focus stage for the positive lens (10) is controlled through focus connection (13.7). Additionally, the beam steering mirror (9) is controlled through mirror connection (13.8). Although not directly part of the electrical interface panel (13), two plumbing connections (13.9) provide liquid cooling to the high powered laser (6).

As stated above, the compact laser projection system (4) operates by providing a probe for the AO system (2) so that the AO system (2), described in detail next, can determine an atmospheric distortion and apply a correction or compensation to the light coming from a desired object to be observed because such light from the object and light from the returned laser beam contains similar atmospheric distortions.

Figure 3A:
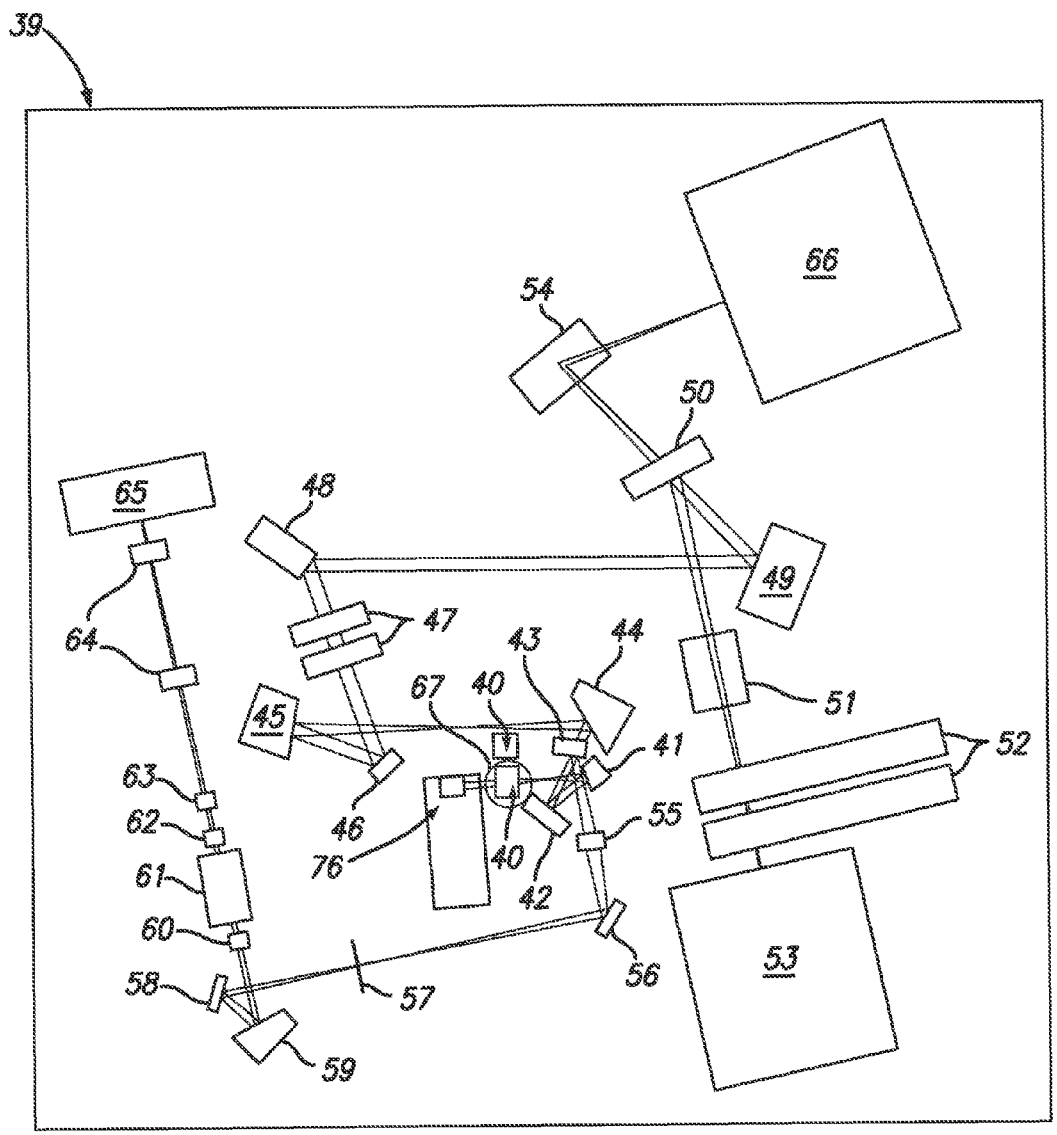
FIGS. 3A-B show in more detail internal components and light paths of the adaptive optics system. In particular.

Reference will now be made to FIG. 3A, which shows in detail internal components and light paths of the AO system (2) enclosed in a container or casing mounted at a focus of the telescope (1), as previously shown with reference to FIG. 1. The AO system (2) is used to compensate for atmospheric distortion on the observed light by measuring the distortion observed in the returned laser beam (5) and applying a correction to the observed light from the desired target (e.g. an astronomical object). Typically, the AO system (2) takes thousands of measurements per second although more or less can be taken, as long as a sufficient number of measurements are taken in order to constantly and accurately compensate for the atmospheric distortion being induced onto light coming from the observed object.

In the embodiment shown in FIG. 3A, all the components described below can be attached to a light weight plate (39) on a three-point mount (to avoid deforming the plate) which attaches directly to the telescope (1).

During operation of the telescope (1) and the compact laser projection system (4), light enters the AO system (2) through a small aperture (not shown) in the center of the light weight plate (39). The light entering the AO system (2) includes light both from the selected object to be observed (e.g. astronomical objects) as well as Rayleigh scattered light from the laser beam (5) coming from the compact laser projection system (4) combined by the telescope (1).

The light entering the AO system (2) is then reflected by a fold mirror (40) with an ultraviolet (UV)-enhanced silver coating on a retractable stage. The fold mirror (40) is used to direct the light from the telescope into the AO system (2). Without the use of the fold mirror (40), the light would just pass through the AO system. The fold mirror (40) changes the light's direction from being perpendicular to being parallel with reference to the light weight plate (39) of the AO system (2). As stated above with reference to the fold mirror in the compact laser projection system (4), the fold mirror (40) in the AO system (2) can likewise be removed in alternative embodiments. However, since the fold mirror (40) here is being used to assist in the packaging of the AO system (2), implementation of the AO system (2) without the fold mirror (40) would potentially increase an area the AO system (2) would take up.

The fold mirror (40) of the AO system uses a silver coating because silver is a superior reflecting material for optical and near infrared wavelengths which are the wavelengths which the AO system according to the present disclosure typically observes at. However, since silver is a poor reflector of UV light, a UV enhanced coating is also provided, to extend the reflectivity down to UV wavelengths. Alternatively aluminum could be used as a replacement, but this would result in a loss of about 10% in reflectivity per surface.

Alternatively, the fold mirror (40) can be retracted via its motorized linear stage. Instead of directing the light from the telescope (1) into the AO system (2), the fold mirror (40) reveals light from an internal light source which optically mimics on-sky operation with a black body optically conjugate to infinity and a UV source at 10 km to mimic the laser.

Figure 3B:
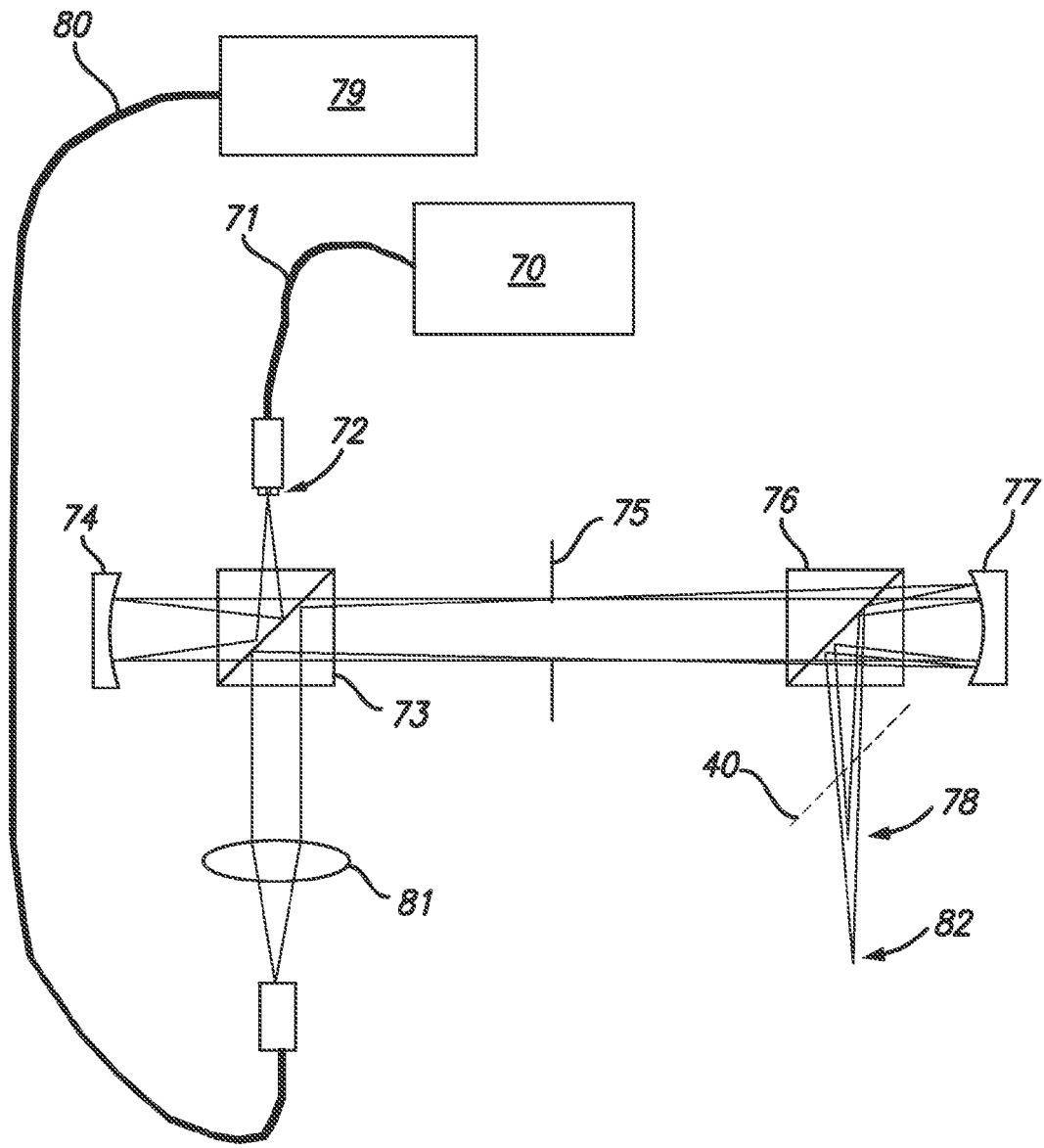

Reference is now made to FIG. 3B which shows internal components and light paths of the internal light source within the AO system (2). Such internal light source and arrangement is utilized to calibrate the AO system (2) when the telescope (1) and compact laser projection system (4) are not being operated. The calibration provides the AO system (2) with calibration sources that mimic the light sources that would be seen through the telescope (1) without any (or minimal) optical aberration. In particular, the arrangement of FIG. 3B is used to 1) optically calibrate the deformable mirror (42) to null out any alignment errors in the visible light (53) and infrared camera (66) light path and 2) optically calibrate the non-common path errors that may exist between the optical paths of the visible light (53) and infrared (66) cameras and the wavefront sensor.

With continued reference to FIG. 3B, the arrangement has a blackbody point-source radiator (70) that is optically conjugate to infinity, having the same f-ratio and exit pupil position as a star would have if it was imaged by the telescope (1). In an example embodiment, the blackbody point-source radiator (70) can be an incandescent lamp with a port to attach an optical fiber (71).

Visible and near-infrared light produced by the blackbody point-source radiator (70) travels down the optical fiber (71) until it exits the optical fiber (71). A fiber mount is provided at the end the optical fiber (71). In an alternative embodiment, the blackbody point-source radiator (70) may be a laser diode with a fiber output connected to a single mode fiber adapted to the wavelength of the laser diode.

A 1 µm pinhole (72) is affixed to the end of the fiber tip thereby reducing the effective size of the point source from the radiator from about 5 µm to about 1 µm. The pinhole (72) also significantly reduces throughput. In an alternative embodiment, the 1 1 µm pinhole (72) could be fed by a microscope objective with greater optical throughput than the optical fiber (71) and blackbody point-source radiator (70). However, this alternative takes up more physical space.

As the light from the blackbody point-source radiator (70) leaves either the fiber end or the pinhole (72), the light passes into a 50/50 optical beam splitter cube (73). Half of the light is reflected off of the internal surface of the beam splitter and propagates to a spherical mirror (74). The spherical mirror (74) then collimates the light which then passes through the beam splitter cube (73) again to a simulator stop (75).

The simulator stop (75) defines a pupil size of the simulator, which ultimately defines the final reimaged f-ratio. As the light continues to propagate, it passes through a second beam splitter cube (76) and to a second spherical mirror (77). The second spherical mirror (77) focuses the light in reflection which passes back through the second beam splitter cube (76). With the second beam splitter cube (76), half of the light is reflected off of an internal surface and comes to a focus at a point (78).

The second part of the calibration system uses a UV light source (79). The UV light source (79) can be either a UV light emitting diode or a low power UV laser. In either case, only a few mW of total power is used from the UV light source (79).

The UV light source (79) is coupled to a 100 µm core diameter multi-mode fiber connected to a fixed fiber end holder. When reimaged, this approximates the size of the Rayleigh scattered laser beam as seen by the telescope (1). Light exiting from the fiber tip is expanding and is then almost collimated by a lens (81). This light then propagates to the beam splitter cube (73) where the light reflects off of the internal surface towards the simulator stop (75).

The UV light is then forced to have the same footprint as the light from the blackbody point-source radiator (70). This is achieved by having the UV light propagate through the second beam splitter cube (76) and to the second spherical mirror (77) like with the light from the blackbody point-source radiator (70). The second spherical mirror (77) focuses the UV light in a reflection which passes back through the second beam splitter cube (76). The second beam splitter cube (76) reflects roughly half off of the internal surface. This UV light then comes to a focus at a second point (82). The two points (78, 82) are used to calibrate the AO system.

When the fold mirror (40) (seen in FIG. 3A) is in the way of the light coming from the telescope (1), the fold mirror (40) of the AO system (2) intercepts the light and directs it to the first off-axis parabolic mirror (41). When the fold mirror (40) is moved out of the way, the two focus points of the blackbody point-source radiator and UV light (78 and 82) coincide with the same points in space as the focus of a star and of the 10 km UV laser focus respectively (while also matching the f-ratio and exit pupil of the telescope).

Returning to FIG. 3A, for the situation where the internal light source is not used (and the fold mirror (40) is in the position to intercept the light coming from the telescope (1)), the light entering the AO system (2) then passes to an off-axis parabolic mirror (41) which images the pupil of the telescope onto a deformable mirror (42). The off-axis parabolic mirror (41) also has a UV-enhanced silver coating. The positioning of the off-axis parabolic mirror (41) is provided in order to minimize aberrations while simultaneously reflecting the light off at an angle. If the light was to be reflected back on itself, the light would not be as useful because subsequent optical elements would block the light.

The deformable mirror (42) is an active optical component which is used to apply spatially resolved phase delays in reflection across a light beam that is incident upon the surface of the deformable mirror (42). The application of the spatially resolved phase delays is provided through the use of a grid of small actuators, which can push and pull a reflective face sheet of the deformable mirror (42).

The deformable mirror is controlled via a USB connection from the control computer in the box that contains other support electronics (3). Furthermore, the shape of the reflective surface of the deformable mirror can be updated at a rate of over 3000 Hz. Practically, the deformable mirror (42) is updated after a measurement is made with the wavefront sensor and a new shape is calculated by the control computer.

The deformable mirror (42) is typically located in a position that is optically conjugate to the pupil of the telescope (1). Such a position also corresponds to the image of the primary mirror of the telescope (1). This location is significant because it represents the location where the footprint from the returning laser beam (5) and the light from the object being viewed exactly overlap.

The deformable mirror (42) uses a low-refractive-index material coated with an anti-reflection coating to protect the mirror from humidity. An example of an applicable low-refractive-index material that can be used is magnesium fluoride ($MgF_2$). Alternatively, $CaF_2$ and $BaF_2$ could also be used but may have problems with humidity. Additionally, the deformable mirror (42) could be replaced with other glasses, with or without anti-reflection coatings at the cost of decreased optical transmission.

The low-refractive-index material coated with the anti-reflection coating can operate from a wavelength of 350 nm to 2200 nm. The lower wavelength end allows maintaining high transmission for returning UV laser light. On the other hand, the upper wavelength end covers the maximum range of scientific light that is expected to be imaged by the science cameras (e.g. visible light camera (53)).

Alternatively, it is possible to utilize coatings which provide a narrower range. For example, if a system is only desired to work in visible light, a coating operating from 350 nm to 1000 nm is sufficient. Such a range is a typical of the long wavelength cutoff for silicon-based detectors like CCDs or CMOS.

With continued reference to FIG. 3A, after reflection from the deformable mirror (42), an UV dichroic (43) reflects light with a wavelength under 390 nm, corresponding to UV light, to a condenser lens (55) and transmits light with a wavelength over 390 nm, corresponding to visible and near-infrared light, to an off-axis parabolic mirror coated with protected silver (44).

The UV dichroic (43), as stated above, splits the UV light from the visible and infrared light. The location of the UV dichroic (43) is relevant, as the light of the observed object (e.g., starlight) coming from the off-axis parabolic mirror (41) is perfectly collimated with no additional optical error while the light from the returned laser beam is still diverging and can pick up significant amount of coma optical aberration. The above stated deformable mirror (42) is effectively a flat surface so it does not cause any additional issues with either the light sources (from the observed object or the laser beam). On the other hand, the UV dichroic (43) should be in the path of the laser beam (5) so that the wavefront sensor can measure the optical errors caused by the atmospheric turbulence after the deformable mirror (42) has attempted to correct the errors.

By placing the UV dichroic (43) immediately after the deformable mirror (42), the deformable mirror (42) is in the path of the laser beam and no other optics have to deal with objects at different distances (which could cause additional optical errors in one or both of the light paths).

With respect to the visible and near-infrared light, a second off-axis parabolic mirror (44) coated with protected silver refocuses the visible and near-infrared light to an intermediate focus before it is re-collimated by another off-axis parabolic mirror (45) coated with protected silver.

In accordance with an embodiment of the present disclosure, there are two optical relays between a focus of the telescope (1) and the image plane of scientific cameras (e.g. the visible light camera (53) and infrared camera (66)) in the AO system (2). Each optical relay includes a first off-axis parabolic mirror which collimates the light and a second which refocuses it. Normally, having two relays is avoided if possible because the two relays could create extra reflections thereby reducing overall throughput. However, the implementation of the deformable mirror (42) is small enough that it would be harder to include all the functionalities of the dispersion corrector (47), fast steering mirror (48), visible dichroic mirror (50), visible light filter wheels (52) and the eyepiece (93) all into a single optical relay. Therefore, two relays are used in such embodiment, although embodiments which use more or less than two relays are also possible.

Next, a fixed fold mirror (46) directs the visible and near-infrared light to an atmospheric dispersion corrector (ADC) (47) located at a reimaged pupil of the telescope. The ADC (47) comprises two motorized rotating prisms. The ADC (47) works independently of the AO system (2). However, the ADC (47) is used because it solves an issue relating to observing objects through the atmosphere that are not directly overhead.

In particular, the atmosphere acts as a prism and refracts light as a function of wavelength. As the telescope points lower in images, the overall effect of the refraction becomes stronger. This causes the images to appear elongated in a direction normal to the horizon, especially those images which have been sharpened by AO system corrections. The ADC (47) can add an opposite amount of dispersion to the incoming light which effectively negates the effect of the prismatic dispersion caused by the atmosphere.

While other embodiments may not place the ADC (47) at the reimaged pupil of the telescope, doing so minimizes the size of the prisms used by the ADC. This is due to the fact that all the light received by the telescope (1) passes through a very well defined aperture at the reimaged pupil.

Alternatively, there may be situations where the ADC (47) is not beneficial. In particular, such situations arise if objects are viewed that are close to and directly overhead (within ~20 degrees) of the telescope (1). Additionally, the ADC (47) may not be used if narrowband scientific filters are used in front of the visible light (53) or infrared cameras (66).

After the visible and near-infrared light passes through the ADC (47), a fast steering mirror (48) reflects the visible and near-infrared light to a third off-axis parabolic mirror coated in protected silver (49) which refocuses the visible and near-infrared light one more time. The fast-steering mirror (48) is used in embodiments, such as the one seen in FIG. 3A, where more than one science camera (e.g. visible light camera (53) and infrared camera (66)) is used in the system and then only if one of those two cameras is used to make high-speed image motion measurements.

With respect to the science cameras, the fast steering mirror (48) can be used in one of two ways. In a first way, the fast steering mirror (48) can be set to a fixed position. If this is the case, the science cameras take fast images of the objects being viewed and correct for image motion in the software after the images are taken. Alternatively, the fast steering mirror (48) can be commanded to stabilize an image on either the visible light camera (53) or infrared camera (66) while the other camera (not being stabilized by the fast steering mirror (48)) is used to take long exposure images.

A visible dichroic (50) is used to interrupt the visible and near-infrared light reflected by the third off-axis parabolic mirror (49) and reflects light with a wavelength under 950 nm, corresponding to visible light, through a series of visible light filter wheels (52) and ultimately to a visible light camera (53). The visible dichroic (50) is generally used when embodiment (such as the one in FIG. 3A) includes both a visible light and infrared camera. In the embodiment of FIG. 3A, both the visible dichroic (50) and the visible light filter wheels (52) are in fixed mounts.

The visible filter wheels (52) each have a position for each of six different optical filters. The different optical filters allow the visible light camera to access different parts of the transmitted visible spectrum as each filter has a different upper and lower wavelength cut off. The visible filter wheels (52) are optional and in other embodiments for the AO system (2), the AO system (2) can operate without the visible filter wheels (52). However, the filter wheels (52) do provide scientific benefit and therefore have been implemented as seen in FIG. 3A.

The visible light camera (53) captures the final images produced by the telescope (1) and the AO system (2). The visible light camera (53) can also be used to measure the image motion of a viewed object which can then be stabilized with the fast steering mirror (48). If the image motion is stabilized in this way, long exposures can then be taken with the infrared camera (66).

The visible dichroic (50) also transmits light with a wavelength over 950 nm, corresponding to near-infrared light, to a gold-coated fold mirror (54). The fold mirror (54) uses a gold coating because gold is one of the best near-infrared reflecting materials. The near-infrared light is then directed perpendicular to the light weight plate (39) and to the infrared camera (66).

The infrared camera (66) functions in the same manner as the visible light camera (53) but instead works at longer wavelengths (from about 950 nm to about 2200 nm). The infrared camera (66) captures final images produced by the telescope (1) and can also be used to measure the image motion of a viewed object which can then be stabilized with the fast steering mirror (48). Similarly to the situation with the visible light camera (53), if the viewed object is stabilized using the fast steering mirror (48) with reference to the infrared camera (66), long exposures can be taken with the visible light camera (53).

With respect to the UV light, corresponding to light under the wavelength of 390 nm reflected by the ultraviolet dichroic (43) to the condenser lens (55), the UV light is folded by a flat laser mirror (56) before coming to a 10 km focus at an adjustable diameter field stop (57). The adjustable diameter is nominally 5 arcseconds. The flat laser mirror (56) is used to maintain the compactness of the overall instrument as similar structures have been described above. Meanwhile, the 10 km focus is provided to be optically conjugate to the 10 km distance the laser beam is being propagated.

The adjustable diameter field stop (57) is an adjustable size iris in a fixed optical mount, but is usually only adjusted during assembly of the instrument. The adjustable diameter field stop (57) is used to restrict the field of view of the wavefront sensor to a narrow angle (e.g., 5 arcseconds). In this way, the grid of images on the wavefront sensor is confined to specific pre-determined pixels.

In an alternative embodiment, one may provide an AO system without the adjustable diameter field stop (57). In such an embodiment, the AO system would have a different pixel readout from the wavefront detector (65), software to compensate for a shifting of the Shack-Hartmann pattern of images and different shuttering techniques. The benefit of not implementing the adjustable diameter field stop (57) would be that it could potentially speed up laser acquisition process given that the wavefront sensor detector (65) would have a larger field of view. Additionally fewer steps would be needed in the spiral search algorithm which would also provide a speed up in laser acquisition.

Returning to FIG. 3A, the UV light then expands and is folded by a second flat laser mirror (58) before being collimated by an off-axis parabolic mirror (59). The off-axis parabolic mirror (59) is used to optically null out the coma induced by reflection off of the first off-axis parabolic mirror (41). If the coma is not removed, the coma will cause a large static error to be seen in the wavefront sensor. Alternatively, in other embodiments, one can use a Schmidt plate or a spherical correcting plate (of which are commercially available) with reference to a collimated beam to remove spherical aberrations which may arise.

Such coma is induced because the laser focus was not at the radius of curvature of the first off-axis parabolic mirror (41). This can occur because light from the viewed object is at the center of the radius of curvature of the first off-axis parabolic mirror (41). Generally, one can pick either or neither of the two images (corresponding to infinity focus or 10 km focus) to be at the center of the radius of curvature but not both. The present embodiment, shown in FIG. 3A, is arranged such that it can separately fix the coma in the wavefront sensor detector (65) easily.

The collimated UV light then passes through a first linear polarizer (60), a Pockels cell (61) and a second linear polarizer (62) oriented orthogonal to the first linear polarizer (60). The first linear polarizer (60) is used to match the polarization of the returning laser beam after it has been set by adjusting the half-wave plate (8) as described above. The first linear polarizer (60) rejects any laser light that is not linearly polarized in the proper direction corresponding possibly to reflection off of dust in the atmosphere.

The Pockels cell (61) is a dielectric crystal. If left alone, the polarized light that passes through the first linear polarizer (60) will pass through the Pockels cell (61). Afterwards, the light will come to an orthogonally oriented second linear polarizer (62). The second linear polarizer (62) will then stop the light from propagating further into the wavefront sensor detector (65). On the other hand, if a potential voltage is applied across the Pockels cell (e.g. about 3500 V), the Pockels cell will act as a half wave plate and rotate the polarization of the linearly polarized returning laser beam that passes through it. Once the laser beam is rotated, it will transmit through the orthogonally oriented second linear polarizer (62) to the wavefront sensor detector (65).

In other embodiments, the Pockels cell (61) as well as the first and second linear polarizers (60, 62) may be removed if some other way of shuttering the returned laser beam is implemented to replicate the functionality of the above elements. For example, such embodiments may include the use of electronically gated CCD detectors.

As previously stated above, Rayleigh scattered light from the laser beam (5) is used to measure (or probe) atmospheric distortion. With respect to the above mentioned Rayleigh scattered light from the beam of laser light (5) used to measure (or probe) the atmospheric distortion, the AO system (2) is able to identify Rayleigh scattered light obtained from the laser beam (5) about ten kilometers away through the use of a signal delay generator. The signal delay generator triggers a Pockels cell electro-optic shutter to open after a calculated round-trip time for the laser beam to travel 10 km and return back. In other embodiments, the AO system (2) can be reprogrammed to allow the laser beam from different distances (other than 10 km) to be measured.

The wavefront sensor detector (65) can potentially obtain other sources of light (i.e. not of the laser beam (5)) which the wavefront sensor detector (65) can mistake as coming from the laser beam (5). Such undesired situations can arise, for example, when light is being obtained from some very bright stars. To mitigate or minimize the effect of receiving contaminating light at the wavefront sensor detector (65), broadband metallic mirrors within the wavefront sensor detector can be replaced with mirrors with a laser-line dielectric coating (like the flat laser mirror (56)).

With reference back to FIG. 3A, after the light passes through the second linear polarizer (62), a lenslet array (63) is placed at the reimaged pupil of the telescope (1) which spatially subdivides the returning laser beam that entered the telescope (1) thereby creating a Shack-Hartmann set of images of the laser. The Shack-Hartmann set of images allows the system to measure the local gradient of the light wave at the reimaged pupil. The lenslet array (63) is a refractive optical element which is flat on one side and with a grid of square-shaped convex lenses on the other side. The lenslet array (63) is located at a position optically conjugate to the entrance pupil of the telescope (1). When non-planar light from the laser beam (5) passes through the lenslet array (63), images of the laser are created at a focus of each of the lenses in the lenslet array (63).

The pattern of laser images is then optically relayed to a UV optimized charged-coupled device (CCD) camera by an optical relay (64). Lateral x-y positions of each laser image give a measure of a local gradient or slope of the non-planar light wave through each lens of the lenslet array (63). In other embodiments, the optical relay (64) may be removed if the wavefront sensor detector (65) were matched in size to the lenslet array (63).

The overall shape of the non-planar light wave is then calculated by multiplying the measured slopes by a wavefront reconstructor matrix. The reconstructor matrix converts the relative positions of the Shack-Hartmann set of images to a set of correcting displacements for the actuators in the deformable mirror (42).

The adaptive optical system (42) uses a reconstructor matrix that is calculated by first making a model of the pupil geometry that is sub-divided by the lenslet array (63). Individual ortho-normal basis functions are realized over the model of the pupil geometry and a 2-D least-squares solution to the best fit plane for each lens in the lenslet array (63) is calculated. An influence matrix is thus derived that converts unit amplitudes for each basis function with the slope offset for every lens. The reconstructor matrix is then created by taking the pseudo-inverse of the influence matrix using Singular Value Decomposition. The person skilled in the art will understand that the above description represent one possible embodiment to allow use of the reconstructor matrices in the AO system (2), and that other embodiments are also possible.

Once the shape of the non-planar wave is known in terms of coefficients of the basis set, an inverse shape can be commanded on the high-order wavefront corrector. This process then provides the corrections necessary to compensate for the distortion caused by the atmosphere. The process of making a measurement, then applying a correction is repeated many times. As described above, such measurements may be performed at a rate of 1.2 kHz in order to keep up with the dynamics of the atmosphere.

Figure 4:
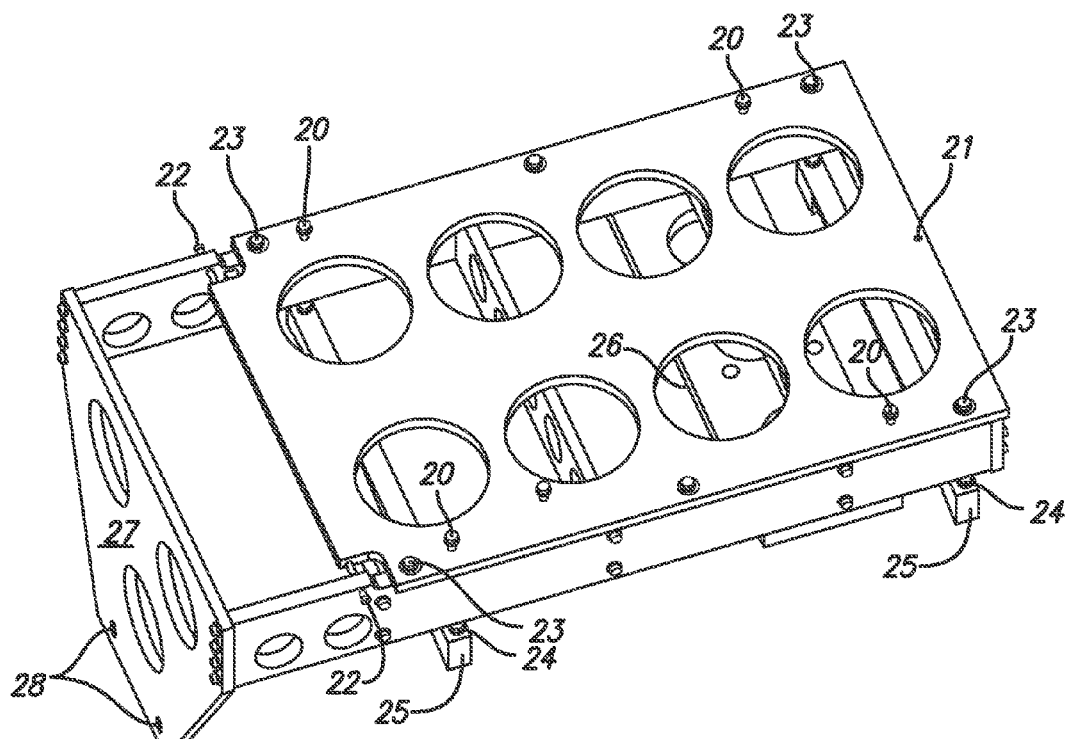
FIG. 4 shows an adapter bracket used to attach the compact laser projection system to the telescope.
Figure 5:
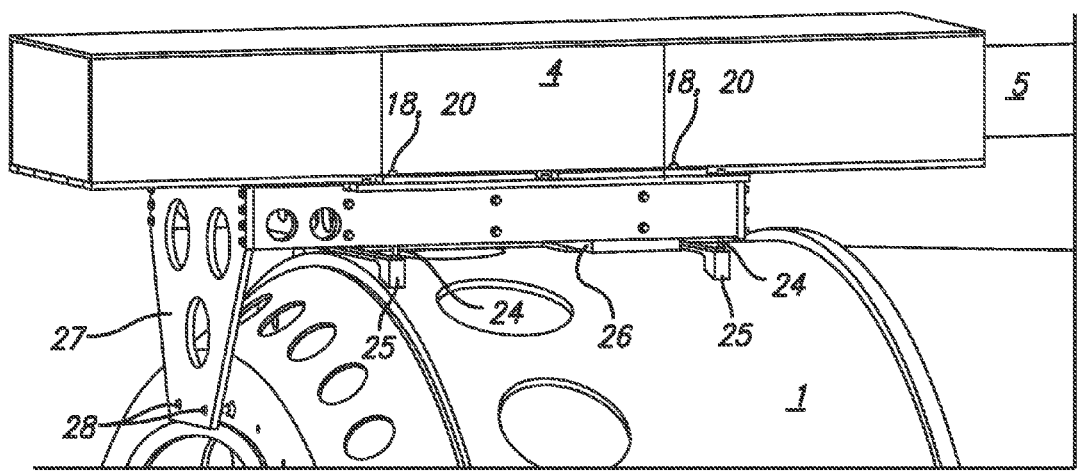
FIG. 5 shows the compact laser projection system being attached to the telescope via the adapter bracket.

Attention is now drawn to a laser adaptor bracket, as seen in FIGS. 4 and 5. The laser adaptor bracket allows attachment of the compact laser projector system (4) to any telescope (1). One benefit for attaching the compact laser projector system (4) to the telescope (1) is that it ensures that the compact laser projector system (4) and the telescope (1) are always pointed in the same direction within the mechanical tolerances of the telescope (1) and the laser adaptor bracket for the compact laser projection system (4). This obviates the need to have a separate pointing mechanism for the compact laser projection system (4).

FIG. 4 illustrates an example of an outlined laser adapter bracket that can be used to attach the compact laser projection system (4) to the telescope (1). FIG. 5 shows the compact laser projection system (4) physically attached to the telescope (1) via the laser adapter bracket. The laser adaptor bracket is designed to adjust a crude pointing of the compact laser projector system (4) in two directions.

With continued reference to FIGS. 4 and 5, the compact laser projector system (4) attaches to the telescope (1) through the mounting points (18) to a top plate (19) of the laser adaptor bracket via corresponding points (20) of the laser adaptor bracket. A pivot pin (21) in the top plate (19) allows the compact laser projector system (4) to be manually tilted in one direction by adjusting positions of push bolts (22). Furthermore, the compact laser projector system (4) can also be fixed into location by tightening bolts (23) of the laser adaptor bracket.

To adjust the rough pointing of the laser adaptor bracket orthogonal to the pointing provided by the pivot pin (21) of the laser adaptor bracket, preload bolts (24) are used to push against the structure of the telescope (1). By adjusting the amount of compression on the preload bolts (24) of the laser adaptor bracket, an angle that the laser adaptor bracket makes with the structure of the telescope (1) can be adjusted. Additional bars (25) can be used in the laser adaptor bracket to match a normal direction of a telescope tube of the telescope (1) with respect to the preload bolts (24).

The laser adaptor bracket attaches to the telescope (1) via bolt holes (28) in the two platforms (26 and 27). Typically, observatory telescopes that are greater than 1 m in size have some way of mounting instruments and electronics on them. However, mounting holes and platforms are different from telescope to telescope, thereby requiring a different laser adaptor bracket for each different telescope.

Typically, the laser projection system has a very limited ability to repoint the laser beam (e.g. 160 by 228 arcseconds). The laser adaptor bracket shown in FIGS. 4 and 5 allows the change to be applied to the compact laser projection system (4) by several degrees. This results in a very large manual pointing adjustment which can be done to facilitate the laser beam (5) to be close to the alignment of the telescope (1). Afterwards, the robotic controls can provide fine adjustments to fix the rest of the alignment. Furthermore, the laser adaptor bracket can also compensate for differential pointing as detailed in the software laser acquisition section.

Reference will now be made to an additional embodiment of the present disclosure, shown in FIG. 6. The embodiment, to be described below, is used if a user desires naked-eye viewing of the images being obtained by the AO system (2). Such additional elements are not necessary for the operation of the AO system (2).

Typically, an individual is unable to see images being obtained by the AO system (2) except through a display (such as a computer console) where the image being obtained is transmitted. According to the present disclosure, a further embodiment is provided, which enables an individual to directly view an image being observed. In particular, the individual would be able to view the visible light image within the AO system (2), through an eyepiece (93). Such light is the same visible light which is being reflected to the visible light camera (53).

Figure 6:
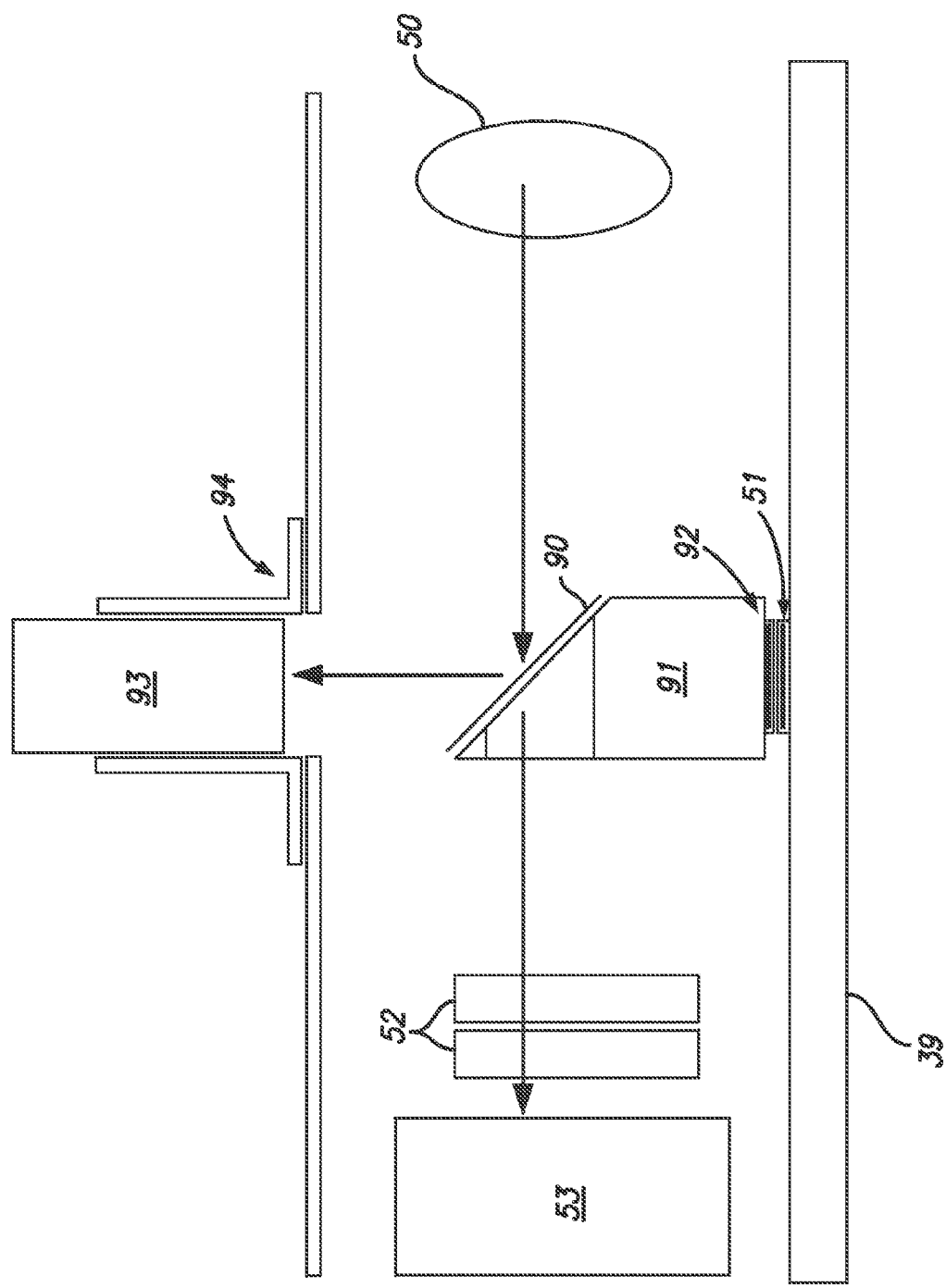
FIG. 6 shows a system adapted for naked-eye observation whereby a visible light path within the adaptive optics system is reflected to an eyepiece through the use of a beam splitter.

As already noted before, visible light is normally reflected by the visible dichroic (50) through visible filter wheels (52) and to the visible light camera (53), as now shown in FIG. 6. However, it is possible to allow an individual to view the image being transmitted via visible light by adding additional components to the AO system (2).

In order to allow the individual to view the visible light transmitted within the AO system (2), first a beam splitter block (91) is used. In particular, the beam splitter block (91) comprises a visible beam splitter (90) and is placed between the path of the visible light coming from the visible dichroic (50) and the visible light camera (53). The beam splitter block (91) is attached to the light weight plate (39) through magnetic bases (51) and (92), as shown in FIG. 6, to allow for easy installation and removal of the beam splitter block (91).

Because of the presence of the beam splitter block (91), there is a variable amount of light that is sent to the eyepiece (93) and to the visible light camera (53). The quality of the images is negligibly impacted but the amount of intensity can be reduced. Additionally, different types of visible beam splitters (90) may be used to change the amount of light split between the eyepiece (93) and the visible light camera (53). Alternatively to the beam splitter, a regular mirror can be used, to maximize the light sent to the eyepiece (93) at the expense of being able to also use the visible light camera (53) simultaneously, since the regular mirror will prevent light from reaching the visible light camera (53).

The visible beam splitter (90), attached to the beam splitter block (91), reflects visible light out of the instrument, perpendicular to the plane of the light weight plate (39). The beam splitter block (91) also has a hole which allows the visible light not reflected off the visible beam splitter (90) to pass through to the visible filter wheels (52) and the visible light camera (53).

To view the visible light which has been reflected by the visible beam splitter (90), the eyepiece (93) is attached to an external structure (94) of the instrument enclosure of the AO system (2). Such external structure (94) can be realized through an eyepiece holder or a tube with a set-screw to securely hold the eyepiece (93) in place. Additionally, filters can be added to the eyepiece (93), if desired.

With the use of the eyepiece (93) without filters, a person is able to see the images received by the visible light camera (53) in full color. The visible light camera, on the other hand, generally only records monochrome images regardless of the visible filter used. These images viewed correspond to the images being received by the telescope (1).

Alternatively, in other embodiments, one can also use an adaptor to put a digital SLR camera in the same port as the eyepiece (93). This would allow a person to take full color adaptive optics corrected images.

Following the above description of the compact laser projection system (4) and the AO system (2), the present disclosure will now describe in detail the overall software and programming used to control the Robo-AO system.

Software/Methods

As introduced earlier in the present application, an aim of the present disclosure is to provide a system that is fully automated and easily replicated. In other words, the Robo-AO system would be able to automatically perform any calibration, correction and operational procedure necessary to obtain scientific measurements from a particular telescope and that such a system would be useable with a wide variety of different telescopes. This is achieved by modularizing the various subsystems within the Robo-AO control system to allow greater interchangeability between the Robo-AO and the software/hardware that the Robo-AO manages. Although full automation is achieved in accordance with the teachings of the present disclosure, the person skilled in the art will understand that manual intervention is still allowed, whenever desired, e.g. for maintenance purposes. In the following paragraphs, a detailed description will be provided as to implementations of a plurality of subsystems and their control system designs which are used to control the respective subsystems of the Robo-AO control system.

According to several embodiments of the present disclosure, the control software used to run the Robo-AO is based on a client-server architecture. By way of example, the software for the control can be C++ based. Furthermore, the client-server architecture can be implemented over TCP/IP using a Linux® operating system. Although it would be possible to incorporate the entire Robo-AO system (in other words the robotic control system and the various subsystems) into a single program, an advantage of the current implementation is that it is more robust. In particular, if any single subsystem of the Robo-AO system crashes, the rest of Robo-AO system would not be immediately terminated.

Figure 7:
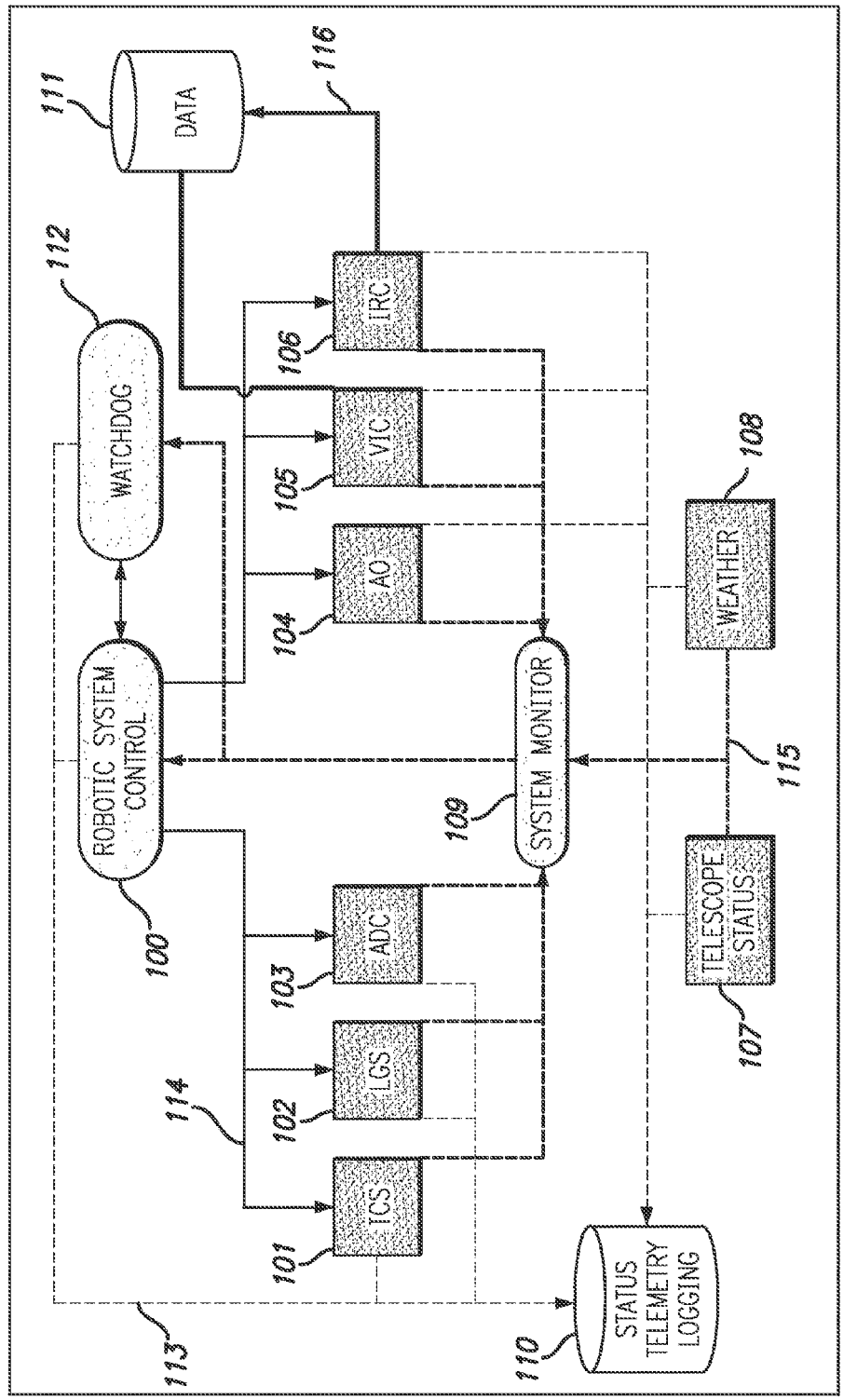
FIG. 7 shows an architectural layout of the control software used in the system according to the disclosure.

FIG. 7 shows an exemplary architectural layout for a control software of the Robo-AO system in accordance with the disclosure. The Robo-AO control software includes a number of subsystem daemons and communication paths between the subsystems. The term 'daemon' as used throughout the present disclosure indicates a program, e.g. a control program, running as a background process, rather than being under control of a user. Alternatively, embodiments can be provided where the user has direct control of the subsystems of the Robo-AO system, or even over the operation of the Robo-AO system. In such embodiments, however, the system would not be fully automatized.

A robotic control system (100) (e.g. a daemon) manages the entire Robo-AO system. After being instructed to observe a particular object (or by selecting a particular object to be viewed based on a queue), scientific data will next be acquired from the object. Such scientific data includes images of the object which are used to calculate measurements for the object. For example, in one embodiment, the objects being viewed could be astronomical objects while the measurements being taken could be astrometric, photometric or spectroscopic. A more detailed disclosure pertaining to how the robotic control subsystem (100) selects the object to be viewed will be described later below.

Also present in the control software are a number of subsystems (101-108) that directly interface with different hardware or software interfaces. Such subsystems, together with the robotic control system (100), accept commands and provide output subsystem statuses using a communication system for control (114) and status monitoring (115).

According to an embodiment of the disclosure, the communication system is a C++ based software that is developed to handle communications over TCP/IP connections. During operation, a server is started first. Next, a client opens a connection and passes a message that the client is connecting with the server. The server responds with a welcome message and information about the particular server process is provided. If the connection is successful, communication between the client and server is established. The client and server then send ASCII text strings back and forth to each other as appropriate to execute commands, share state information and otherwise operate the Robo-AO.

A list of the Robo-AO subsystems (101-108) will now be provided. Details relating to such system daemons will be provided later in the disclosure, also with reference to the figures. Although the eight subsystem daemons below are provided in detail, embodiments of the Robo-AO can have any number of subsystem daemons, more or less than the number being described throughout the present disclosure.

Telescope control subsystem daemon (101): used to send commands to the telescope (1) for operations.

Laser beam guidance subsystem daemon (102): controls operation of the laser beam guidance hardware.

ADC subsystem daemon (103): controls operation of the ADC (47).

AO subsystem daemon (104): controls operation of the AO system (2).

Visible instrument camera (VIC) subsystem daemon (105): controls operation of the visible light camera (53) and visible light filter wheels (52) used to gather visible wavelength science data.

Infrared camera (IRC) subsystem daemon (106): controls operation of the infrared camera (66) and infrared filter wheels.

Telescope status control subsystem daemon (107): interfaces with the telescope control system to monitor operational status of the telescope (1).

Weather monitor control subsystem daemon (108): monitors a state of observatory weather system and checks for safe environmental operating parameters.

In this present embodiment, the above listed subsystem daemons, as well as other potential subsystem daemons, are provided in such a way that particular processes are separate. However, in other embodiments, it is possible to further separate operations of particular processes into multiple different subsystems. Furthermore, it may be provided that multiple processes be combined into a single subsystem. As stated above, additional processes (or subsystems) could be added to the Robo-AO system as the above listing is not meant to limit the possible subsystems incorporated by the Robo-AO system. However, all the above embodiments maintain the goal that particular functions can be modularized. Furthermore, such control structures would be implemented as a compromise between the operational capability of the system and its modularization.

Returning back to FIG. 7, the robotic control system (100), by using the communication system for control (114), is configured to automatically detect situations when a subsystem has disconnected or has crashed. If a disconnection is detected, the robotic control system (100) assumes that the connected subsystem has crashed and kills related processes tied to the crashed subsystem. The robotic control system (100) then restarts the subsystem through the use of a restart command. If the subsystem cannot restart after a predefined set of attempts, the robotic system control (100) logs the server failure and then shuts down.

The Robo-AO system control software also contains a system monitoring thread (109). The system monitoring thread (109) receives a status from each of the subsystem daemons (101-108) and sets flags for the operation of the robotic control system (100) based on the status. The system monitoring thread (109) is represented differently from the subsystems in FIG. 7 because it is currently a separate thread inside the robotic control system (100). However, embodiments are also possible in which the system monitoring thread (109) can be a separate subsystem.

FIG. 7 also shows a watchdog control system (112) which is used by the robotic system control (100) to monitor the status of the entire Robo-AO system and its operation. If an error is detected by the watchdog control system (112) or if the robotic control system (100) crashes, the watchdog control system (112) automatically takes over operational control of the robotic control system (100).

In the above situation when the watchdog control system (112) takes over operational control of the robotic control system (100) when the robotic control system (100) crashes, the watchdog control system (112) first puts the robotic control system (100) into a safe state. Afterwards, the watchdog control system (112) will attempt to restart normal operations. If a situation arises where the watchdog control system (112) is unable to restart after a predefined set of attempts, the watchdog control system (112) may log the failure and then shut down the Robo-AO system.

The watchdog control system (112) contains all information from the system monitoring thread (109). In fact, the software used for the watchdog status system in the watchdog control system (112) is the software as in the robotic control system (100). If the robotic control system (100) fails at something, the watchdog control system (112) sends signals to the robotic control system (100) to pause. Furthermore, the watchdog control system (112) will attempt to execute programmed operations to fix the experienced failure. These programmed operations include the same operations the robotic control system (100) runs as well as more draconian measures to stop the robotic control system from continued operation immediately (e.g., cutting the power). Once the robotic control system (100) has been placed in a safe state, the watchdog control system (112) will take individual subsystems through an initialization process. The entire Robo-AO system is stopped if any of the subsystems continue to fail.

All components of the Robo-AO system control software continually output telemetry and logging information to allow examination of the operation of the system via communication line (113). If desired, a multi-threaded method can be used to write log file statements. Such log file statements are stored in hard drives (110). Throughout the present disclosure, the term 'multi-threaded', a technique where a program has more than one function executing in parallel, will be used to indicate multiple threads existing within a same process during the execution of a task. In the Robo-AO system, multi-threading allows an efficient functioning of the system.

Additionally, the outputted telemetry can also be written to memory using a multi-threaded method, similar to the logging system described above. With respect to the telemetry, such can have both high and low speed capabilities. The system telemetry outputs state values for each of the subsystems as they operate. State values may include weather parameters (such as temperature or humidity), camera parameters (such as temperature, cooler state and current instructions), motor parameters (such as position and motion state) and telescope status, among other information. According to an embodiment of the disclosure, everything that can be recorded is done so into one or more hard drives (110).

The system telemetry is generally taken at 1 Hz although some systems (such as the AO system (2)) may desire telemetry at higher rates. Depending on a speed at which the system telemetry is taken at, the information is recorded in different locations. The low speed telemetry writes its data to a file on the hard disk directly when gathered. On the other hand, the high speed telemetry writes its data into memory and generates a thread to write the telemetry to a file on the hard disk as necessary. The high speed telemetry also makes new files automatically when the file grows too large. In contrast, the low speed telemetry does not grow large enough to require additional space from a new file.

Additionally, image data can be saved, if desired, in a Flexible Image Transport System (FITS) format via link (116). The image data can also have low and high speed capabilities, as similarly provided for the above described telemetry data. Such capabilities are provided since some camera images are taken as long exposures while other images require a rapid readout from the camera system. The high speed FITS data is able to create FITS data cubes (i.e. three-dimensional arrays of image data) at a camera rate continuously. Additionally creation of new data cubes can also be done on-the-fly, if desired.

All image data (e.g., astronomy image data) can be saved in a standard FITS format. Camera systems generally gather data from their respective cameras and write the camera data, corresponding to pixels of information, into FITS data files. An information header is added to the image that contains information on the state of the Robo-AO system at the time the observation was taken.

With respect to long exposures, the camera image can be written to a disk directly when the exposure is finished. However, when rapid readout is used, the camera system gathers images one after another so fast that writing a single FITS file for each may be too slow. In such a case, a FITS data cube (which constitutes a stack of FITS images) is created and written to as each image is gathered. Once the FITS data cube is full, the FITS data cube is closed and another is created if more camera images are to be taken.

Figure 8:
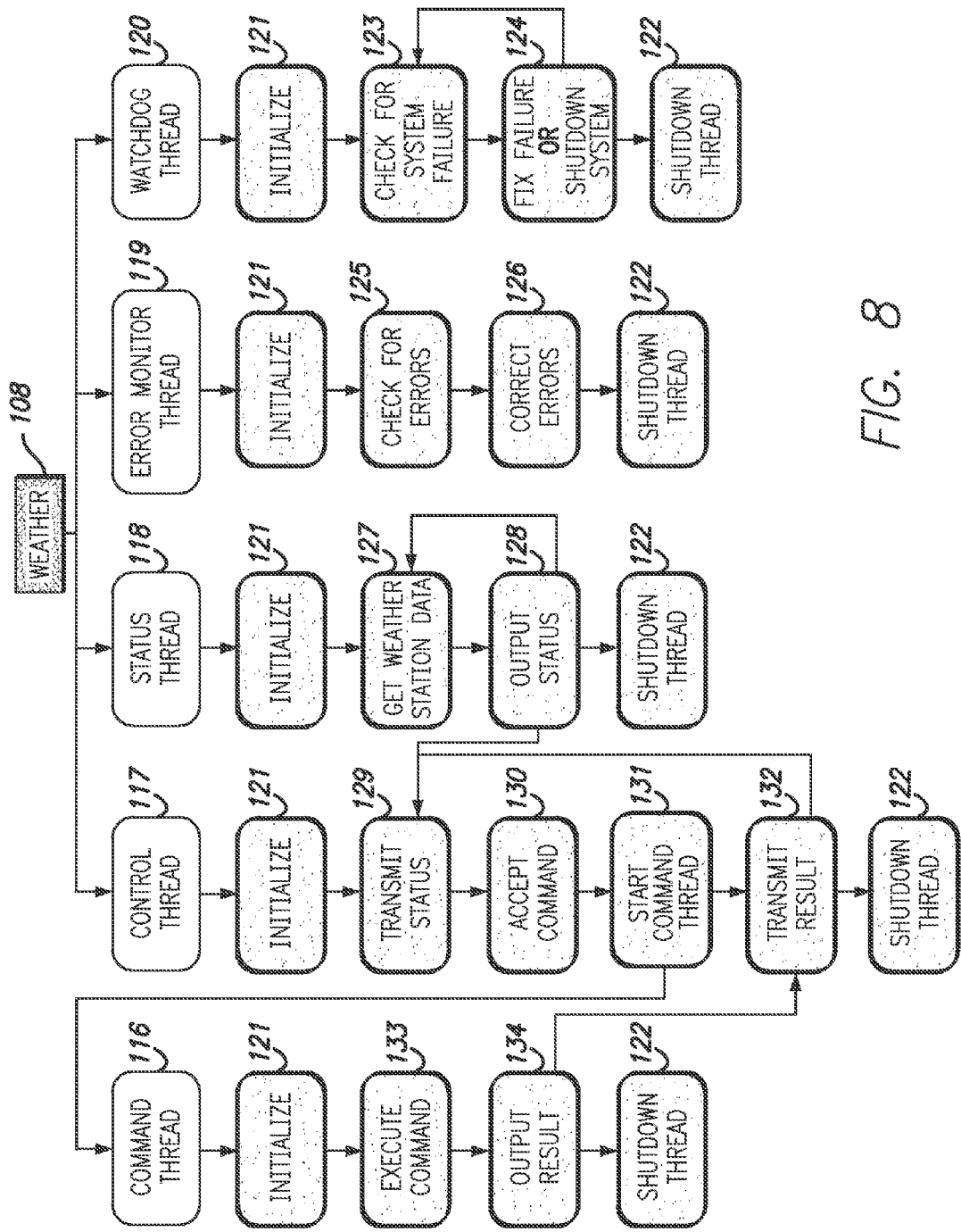
FIG. 8 shows a high level flow chart for one of the subsystem daemons used in the system of the disclosure. In particular.

Discussion of the Robo-AO subsystem daemons (101-108) listed above will now be provided in detail below. Reference is first made to FIG. 8, which shows a high level flow chart for the weather monitor control subsystem daemon (108) used to monitor the observatory weather system and to check for safe environmental operating parameters. The weather monitor control subsystem daemon (108) is the simplest of all the subsystem daemons (101-108) previously described and will be used to describe the general behavior of all other subsystems used within the Robo AO control system.

According to an embodiment of the present disclosure, all subsystems (including the weather monitor control subsystem daemon (108) illustrated in FIG. 8) of the Robo-AO system feature multi-threaded architecture. The use of multi-threaded architecture covers the implementation where several threads are provided in a same process. As shown, for example in FIG. 8, the multi-threaded architecture of the weather monitor control subsystem (108) has five main threads (command (116), control (117), status (118), error monitor (119) and watchdog (120)), which are used to monitor and control the operation of the subsystem's respective hardware and software interfaces. Furthermore, in accordance with an embodiment of the disclosure, the subsystems can inherit their respective properties from a base C++ class where some functions are defined in the base class to enhance performance and modularity of the subsystem.

When a subsystem daemon is launched, four threads are initially created: the control (117), status (118), error monitor (119) and watchdog (120) threads. All threads start with their own initialization procedure (121) that is used to set variable states and prepare the respective thread for operation. Such threads will also undergo a shut-down procedure (122) in order to terminate the thread in a proper manner, either naturally during operations or when the operation of the daemon ends.

The control thread (117) is the main management thread in the operation of each subsystem. The control thread (117) receives commands from clients (e.g. other subsystems) connected to the particular subsystem (accept command (130)) and launches a fifth thread (the command thread (116)) (start command thread (131)) that executes the received commands from external clients separately.

The command thread (116) undergoes its own initialization procedure (121) and then executes the received commands (execute command (133)), outputting a result (output result (134)) to a state variable that is read by the control thread (117). The control thread (117) then transmits (transmit result (132)) the results of the command to the external client that provided the instructions to the command thread (116). Since the command thread (116) is independent from the other threads of the multi-threaded architecture, it is able to execute operations while the control thread (117) continues to operate and communicate with attached external clients.

Although subsystem daemons (through the command thread (116)) usually accept only one command at a time, commands can be queued for later execution if multiple commands are provided to the system. Such feature can apply to all subsystem daemons described throughout the present disclosure.

With continued reference to FIG. 8, a status thread (118) is also provided. In the specific case of the weather monitor control subsystem daemon (108), the status thread (118) polls its respective hardware and then writes a state to a weather state class container (get weather data (127)). The associated hardware for the weather monitor control subsystem (108) can be, for example, an observatory weather station and internal thermal and humidity sensors.

The state stored in the weather state class container (127) is then shared with the control thread (117). The control thread (117) transmits the state (129) to the clients at a rate of, e.g., 1 Hz. With reference to the weather daemon (108), information is sent to the robotic system daemon (100) and the watchdog daemon (112) through the system monitor thread (109).

The fourth thread in a subsystem daemon is an error monitor thread (119), which is used to examine the operation of the subsystem daemon for any anomalies (check for errors (125)). This operation includes executing functions that may help the subsystem daemon to provide correct instrument operation (such as a hardware control interface, purely software functions, etc.). In the specific case of the weather monitor control subsystem daemon (108), the error monitor thread (119) looks at parameters such as wind speed and temperature to see if any conditions are outside the safe operating parameters of the observatory. The error monitor thread (119) can also monitor the connection to the observatory weather station and flags an error in situations where there are lost communications.

Additionally, the error monitor thread (119) can be used to change an operating state of the subsystem for safety, or to start an automated error control operation (correct errors (126)) to fix the error. In the case of the weather monitor control subsystem daemon (108), this could entail restarting the weather station communications.

The fifth thread of the multi-threaded architecture is the watchdog thread (120). According to an embodiment of the disclosure, the watchdog thread (120) is defined in the base class and is the same in all subsystem daemons. The watchdog thread (120) monitors operation of the other threads (e.g. 116-119) to make sure that the other threads continue to operate properly (check for system failure (123)). In particular, the watchdog thread (120) tracks execution times of the other threads. This can be performed by requiring that the other threads write their respective current execution time into a variable that is tracked by the watchdog thread (120). If one thread stops executing its control loop, the watchdog thread (120) steps in.

The watchdog thread (120) can also examine variable settings or other parameters to make sure they do not drift out of a set boundary. In a further embodiment, the watchdog thread (120) is also able to monitor memory leaks or issues, processor usage of the other threads and other operating system parameters. The watchdog thread (120) is also able to adjust operation of the subsystem daemon accordingly.

The following are some exemplary cases where the watchdog daemon (120) undergoes different procedures to fix issues that arise in the subsystem daemon. In one situation where one of the threads freeze, the watchdog thread (120) attempts to take over action of the frozen thread to fix the situation. In another situation, the watchdog thread (120) can try to stop the frozen thread and then restart the same thread. Where variable settings are drifting outside a set boundary, the watchdog thread (120) can provide a flag and reset the variable settings. The watchdog thread (120) can also change operational parameters such as updating the rate of the status or control threads. Lastly, the watchdog thread (120) can even stop the entire subsystem daemon process, if necessary.

In a situation where a problem cannot be resolved (for example, if a frozen thread cannot be unlocked by the watchdog thread (120)), the watchdog thread (120) can shut down the entire subsystem daemon (fix failure or shutdown system (124)). Furthermore, all attached clients to the particular subsystem daemon are alerted. Each client attached to the subsystem daemon can then attempt to restart the shut-down subsystem daemon.

When several clients attempt to restart a subsystem daemon, more than one instance of the subsystem daemon can be created in the process. However, having multiple instances of the subsystem daemons to control the same piece of hardware is undesired. To avoid this, a subroutine in a client may use a random number generator to set a delay time before attempting to restart a subsystem. Once a subsystem daemon has started, another client that attempts to start the subsystem can identify from the operating system that the subsystem daemon is already running and may abort the attempt to restart the subsystem. Additionally, even in situations where two or more instances of subsystem daemons are somehow started, the Robo-AO system can stop all the subsystem daemons and attempt to restart the subsystems again.

Figure 9:
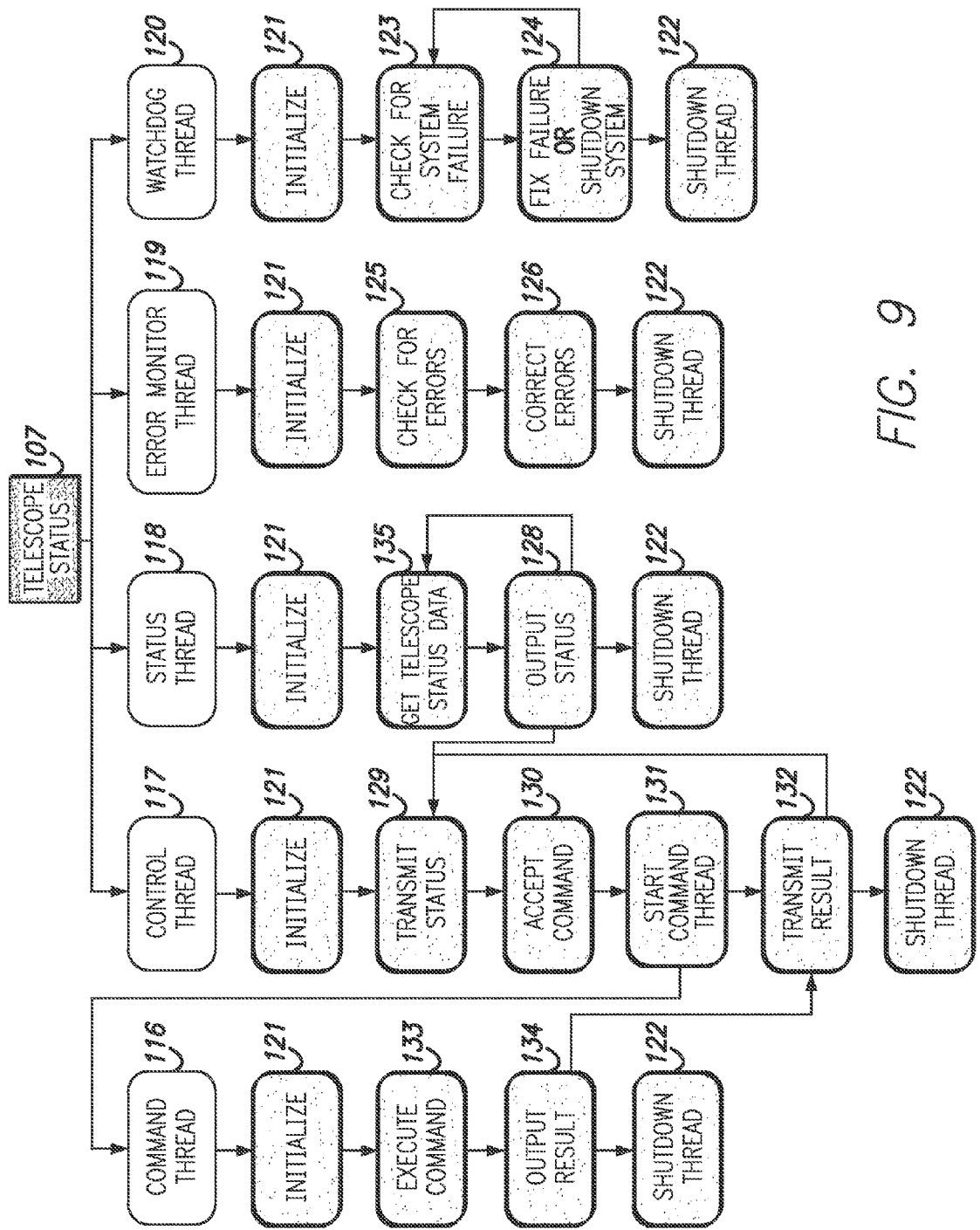
FIG. 9 shows a software architecture of a telescope status control subsystem daemon.

Reference is now made to FIG. 9, which shows an architecture for the telescope status control subsystem daemon (107). The telescope status control subsystem daemon (107) is similar to the weather monitor control subsystem daemon (108) discussed above. The only difference between the telescope status control subsystem daemon (107) and the weather monitor control subsystem daemon (108) is that the telescope status control subsystem daemon (107) accesses a status of the telescope system, executes a different command set, and has different error control procedures.

In particular, the status of the telescope is accessed by sending commands over TCP/IP to a telescope control system (137). The status of the telescope (1) can also be determined by directly querying the hardware of the telescope (1).

With respect to the query action, the telescope (1) can have its own control computer that can receive commands over a TCP/IP connection. The connection returns status and controls information over the same connection. The TCP/IP connection to the telescope has three separate ports: one for weather, telescope status and telescope control subsystem daemons. Alternatively, direct control of the telescope (1) is also possible but would require new interface software to be implemented.

As stated above, the telescope status control subsystem daemon (107) and the weather monitor control subsystem daemon (108) have different command sets and error control procedures between the two, which are based on the respective subsystem daemon's functionalities. In fact, generally speaking, all the subsystem daemons (101-108) have their own set of commands and error control procedures, which are based on their functionalities. However, the programmatic operation of the subsystem daemons (101-108) are all the same.

Figure 10:
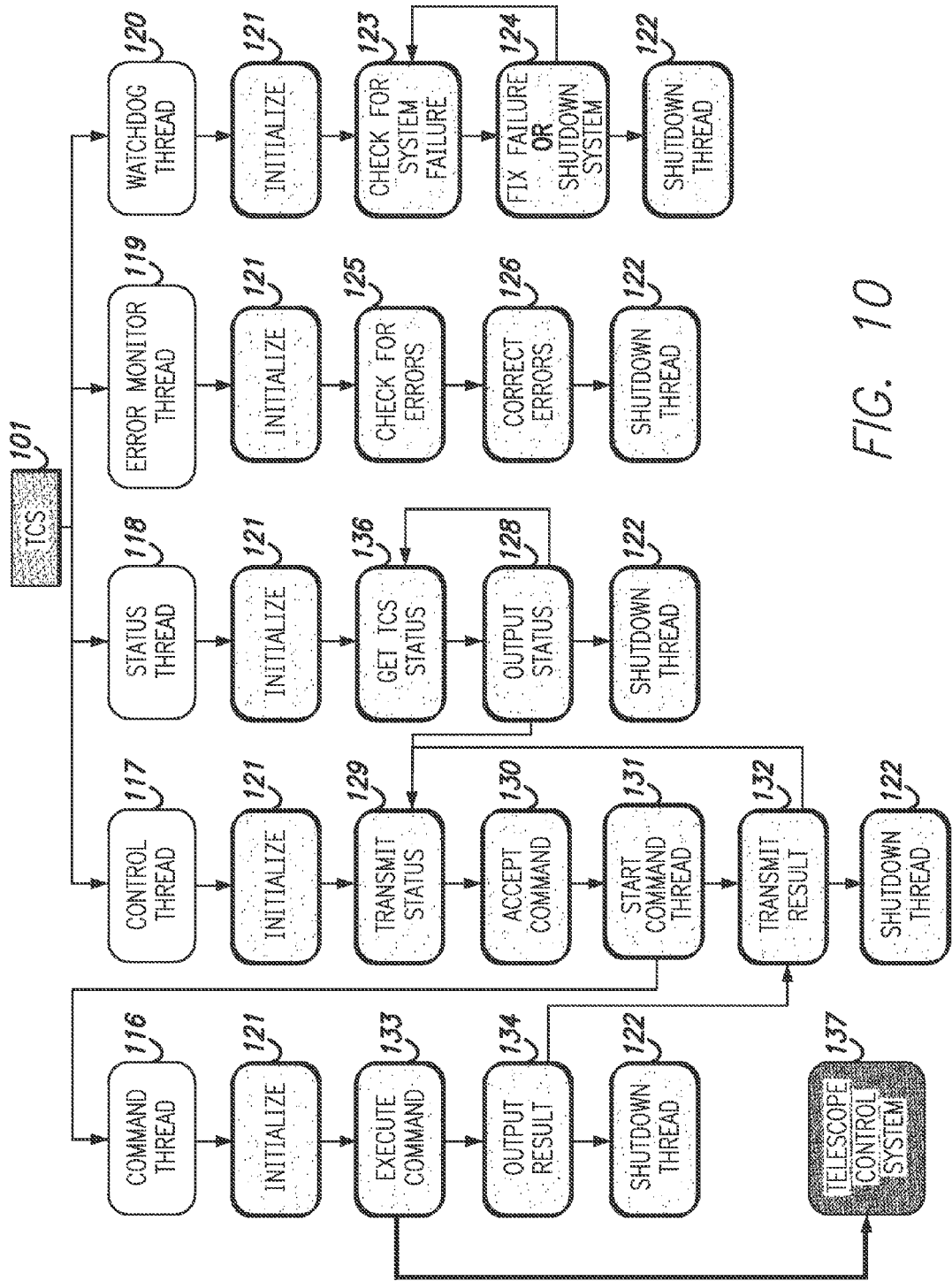
FIG. 10 shows a software architecture of a telescope control system control subsystem daemon.

Reference will now be made to FIG. 10, which shows a software architecture of the telescope control subsystem daemon (101). The telescope control subsystem daemon (101) manages operation of the telescope by sending sends commands to move the telescope (1) and operates the hardware of the telescope (1). The telescope control subsystem daemon (101) sends commands over TCP/IP to the telescope control system (137) that operates the robotic telescope.

Additionally, the telescope control subsystem daemon (101) can also directly control the hardware of the robotic telescope. Through an implementation of another system that connects the telescope (1) directly to the Robo-AO control computer (and associated software), one can use the telescope control subsystem daemon (101) to directly control the telescope hardware.

Because the Robo-AO system can layer the direct hardware interfaces in modules that are then compiled into the subsystem daemons (101-108), generally these interfaces can be exchanged for new modules that talk to a different kind of hardware that do the same thing. For example, a new camera can be used to replace an existing camera. In the present application, it will be shown that the new camera only requires writing a new module pertaining to the direct connection for the camera to the Robo-AO. This allows the rest of the Robo-AO system that controls the camera to remain the same.

With reference back to FIG. 10, the telescope control subsystem daemon status (136) indicates the status of the telescope control subsystem daemon (101) and its operational state. On the other hand, the status of the telescope itself is monitored through the separate telescope status subsystem daemon (107) described above.

Figure 11:
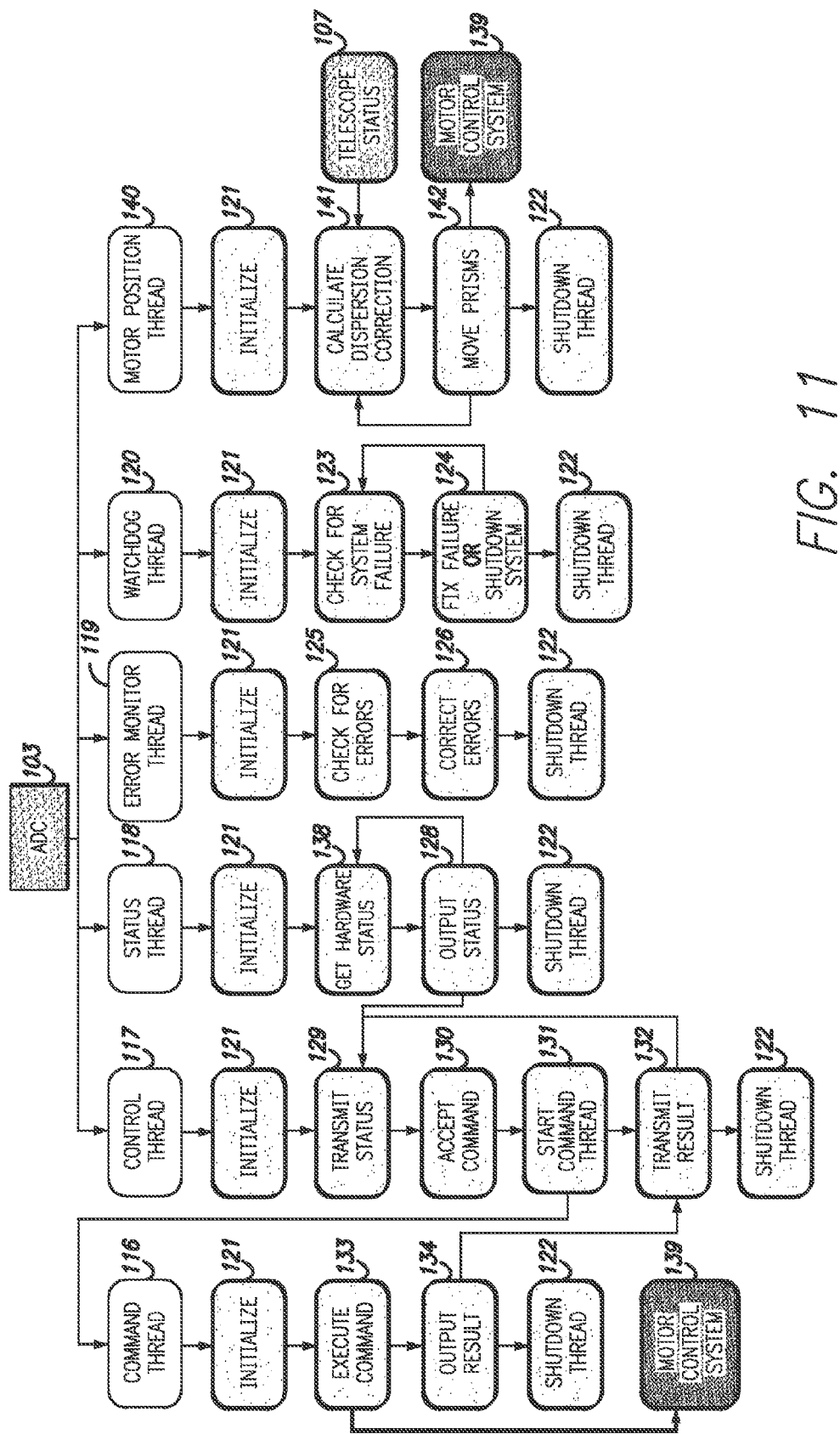
FIG. 11 shows a software architecture of an atmospheric dispersion corrector control subsystem daemon.

FIG. 11 shows a software architecture for the ADC control subsystem daemon (103). As discussed above, the ADC (47) corrects the effects of dispersion of light that passes through the atmosphere. The ADC control subsystem daemon (103) monitors the status of the ADC hardware (138). When a command is sent into the ADC control subsystem daemon (103), it executes the command by sending signals to a motor control system hardware (139). These commands move motors connected to prisms that are used to do the optical correction to compensate for the dispersion of light caused by the atmosphere.

The position of an object (e.g. a star in the sky) is one factor which influences the dispersion of light caused by the atmosphere which the telescope (1) receives because the position of the object defines a path for which light travels through the atmosphere. Therefore, the ADC (47) constantly changes the position of optics to compensate for the dispersion as the telescope (1) tracks the object. Calculating the dispersion is a known math equation that depends on an angle of the telescope above the horizon and is then used to provide angles for the prisms used to correct for the dispersion.

The above correction is performed in a motor position thread (140), which is launched when the ADC control subsystem daemon (103) starts. In particular, the motor position thread (140) takes input from the telescope status control subsystem daemon (107) and uses the information obtained to calculate a dispersion correction (141). The motor position thread (140) is unique to the ADC control subsystem daemon (103).

After the dispersion correction is obtained, the prisms are then commanded to move accordingly (142) to compensate for the dispersion caused by the atmosphere. The motor position thread (140) runs at a rate of, e.g., 1 Hz and continually updates the position of the prisms based on the position of the telescope (1).

Parameters for and limits on the update position of the prisms are usually controlled through a configuration file. The configuration file is created by a user and includes information that affects the operation of the ADC. This information can include limits to operation from zenith, connection information for the motor controller and information about the ADC design that sets the axes of rotation. The configuration file is located in a standard configuration directory, along with configuration files for all Robo-AO systems. For example, standard directories for telemetry, data and configuration files can be provided. The location of such files is included in the lowest level C++ class common to all Robo-AO software.

Figures 1, 12:
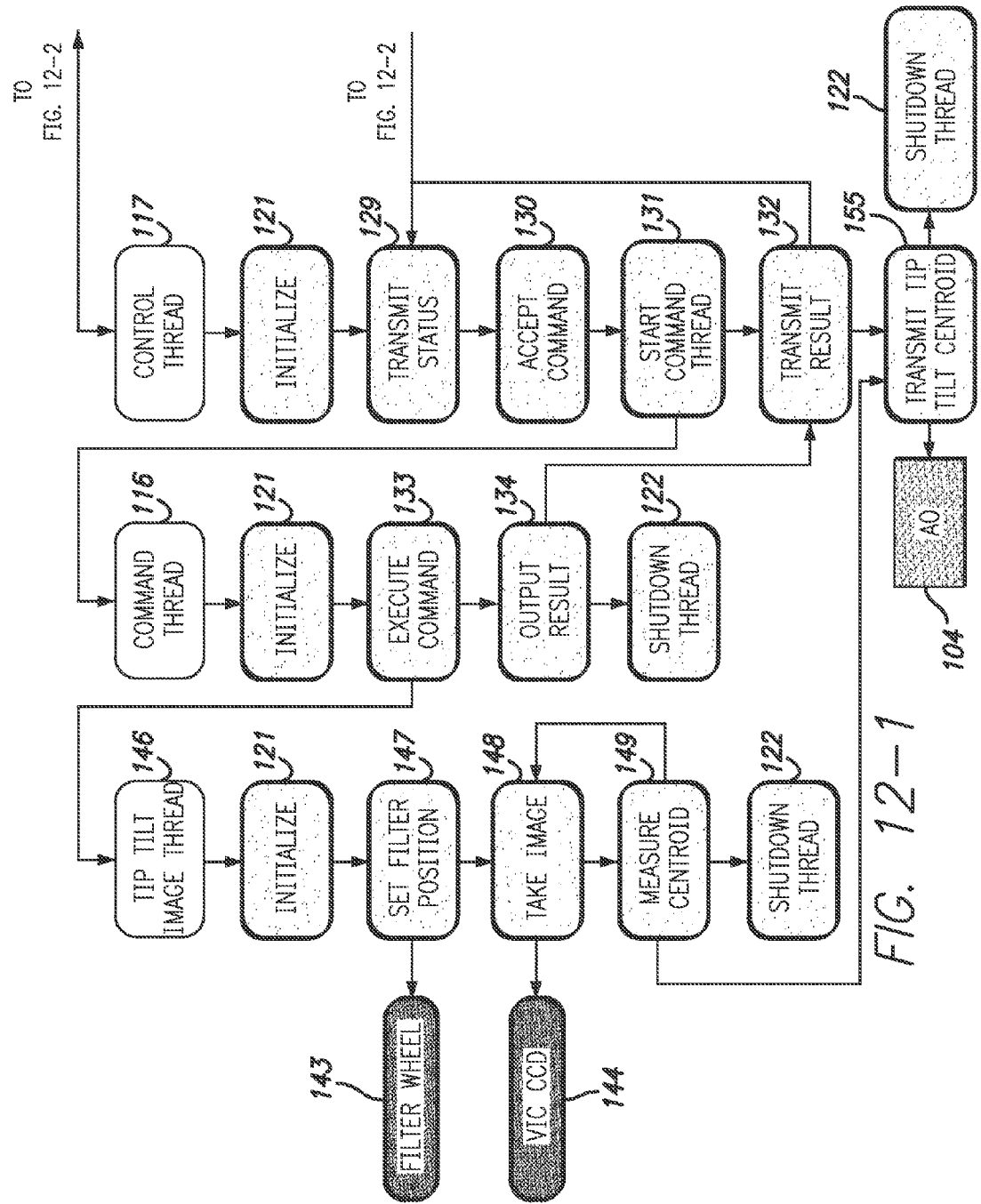
Figures 2, 12:
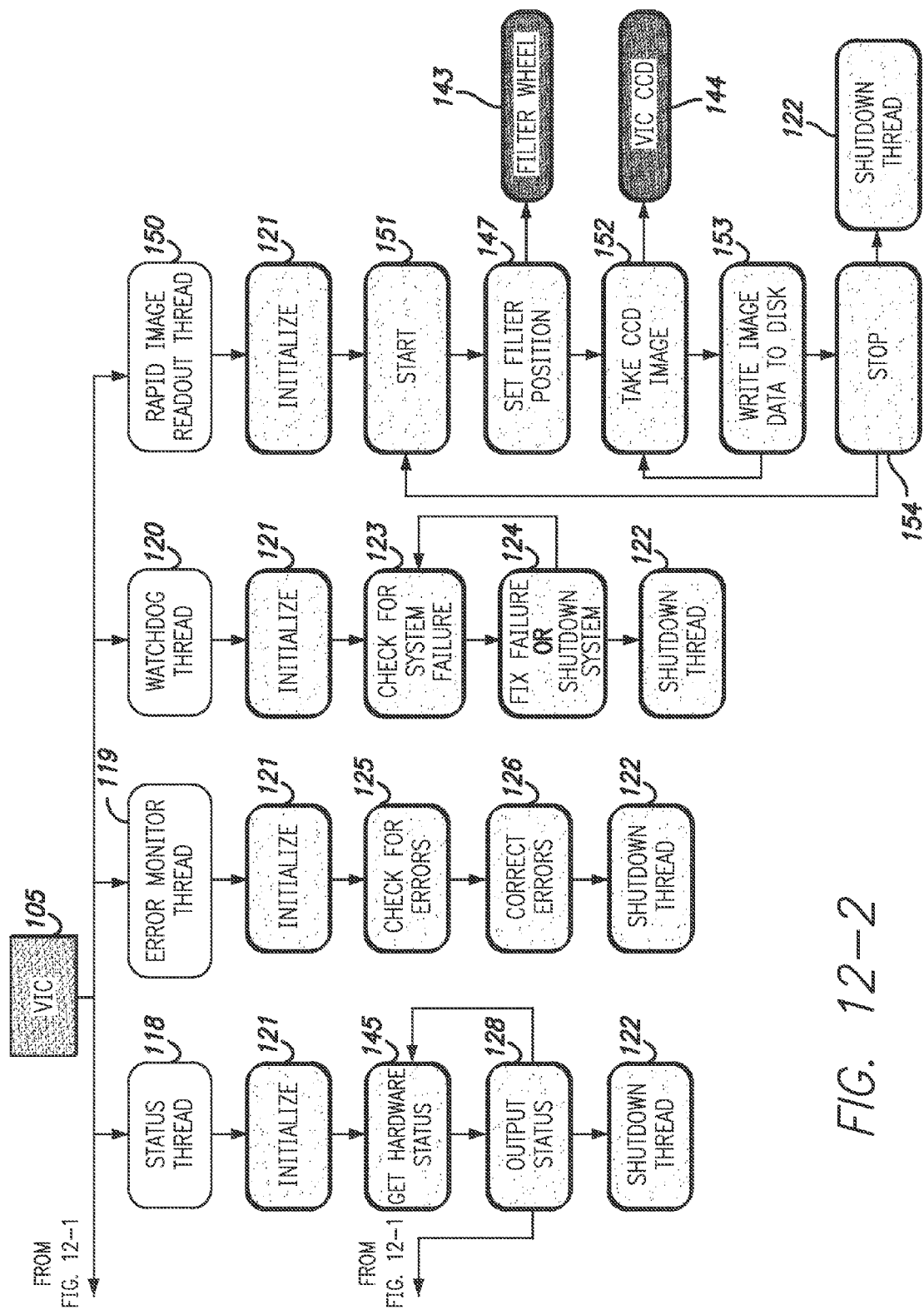

Next, FIGS. 12-1 and 12-2 show the software architecture for a visible instrument camera (VIC) control subsystem daemon (105). As with the other subsystem daemons, such as the ones discussed above, the VIC control subsystem daemon (105) monitors the status of the hardware it controls (e.g. the VIC). In the embodiment shown in FIGS. 12-1 and 12-2, the VIC control subsystem daemon (105) controls a VIC CCD (144) and any attached filter wheels (143). The communication protocol can depend on a camera-hardware connection. By way of example, the Robo-AO VIC can use Cameralink®. Alternatively, USB®, Firewire®, TCP/IP as well as other hardware protocols can also be used instead.

According to an embodiment of the disclosure, the VIC camera system can have three modes that are used to take images: regular camera images, rapid readout image sets, and tip tilt control images. The tip tilt control images are used to correct a positioning of the telescope (1) to properly acquire an object (e.g. target in the sky).

In the situation where the VIC camera system wants to take regular camera images, such command is sent first to the VIC control subsystem daemon (105). The command is accepted by the control thread (130) within the VIC control subsystem daemon (105). Then the control thread (117) starts a command thread (131). The command thread (116) executes the command and takes a single exposure of the VIC. The filter wheel position is similarly controlled by the VIC control subsystem daemon (105).

On the other hand, when the VIC camera system wants to take a rapid readout set of images, a separate rapid image readout thread (150) is generated. After initializing the rapid image readout thread (121), the rapid readout thread (150) waits for a signal from the VIC control subsystem daemon (105) to start operations.

Once the VIC CCD (144) is configured properly for operation, the signal to start operations is sent and the rapid readout thread (150) starts to gather images (151). Commands are sent to the VIC CCD (144) using the camera interface software to set up its operational parameters according to an observing mode. That includes setting cooler temperatures, configuring the camera readout amplifiers and setting gain values. A filter wheel position is set if necessary (147) by the rapid readout thread (150). Filter wheel setup is typically done before starting the rapid readout thread (150) by a separate command that goes through the control thread.

Afterwards, the camera system starts a loop that takes an image off the VIC CCD (152) and writes the images to a disk (153) or a local system hard drive. This ensures that the images are not lost if an error arises during operation. The rapid readout thread (150) gathers images by requesting an image from the camera and then waits for the camera to return an image or an error. The operation of the camera is the same as for the command thread (116) when setting up and observing a single image, except that the setup is done once and the imaging is repeated in a loop (with respect to the rapid readout thread (150)) instead of waiting for an external command to execute each observation.

The loop continues to operate until a stop signal is sent (stop (154)). After the stop signal is received, the rapid readout thread (150) returns to waiting for the next signal to start.

With reference to the third mode, taking tip tilt control images, a tip tilt image thread is launched as a separate thread (146) when a tip tilt command is sent to the AO system (2). As discussed above, the tip tilt images are used to correct the positioning of the telescope (1) in order to properly acquire an object.

After initializing the tip tilt image thread (146), the filter wheel position is set (147), if required. Afterwards, the tip tilt image thread starts a sequence of taking an image (148) and measuring a centroid position of the target star in the image (149). Images are acquired constantly during operation of the tip tilt image thread (146) until the tip tilt system is stopped. Measurements of the centroid position of the target start in the images acquired are made for every acquired image.

The centroid position is saved in a state variable that the control thread (117) picks up when the centroid position value has changed. In particular, the centroid position values for the current measurement are held in memory until the correction is completed. The centroid position values are then replaced by the next centroid measurement. Centroid position values are also included in telemetry.

The control thread transmits (155) the centroid position value to the AO system (2) which then uses the centroid position value to correct the position of the telescope so that it can properly observe the object (e.g. a star in the sky). The control thread (117) also monitors the update time of the tip tilt thread (146). When the time changes, the control thread (117) outputs new centroid values over client-server TCP/IP connections to all clients. The AO system (2) is a client of the VIC control subsystem daemon (105), so the tip tilt centroids are automatically sent to the AO system (2), which calculates new tip tilt motor position and moves the tip tilt motor accordingly.

All VIC CCD data obtained above is recorded into FITS data files. The regular images are recorded in a single two-dimensional image. Rapid readout and tip tilt images are recorded in data cubes by recording, for example, the data on demand, and creating new data cubes once the current cube reaches a set size (e.g. 1 GB).

Image headers are provided for the images using a status of all the other Robo-AO subsystems at the time of observation. The purpose of such detailed image headers is to create a complete picture of the state of the Robo-AO system at the time the image was taken.

Figures 1, 13:
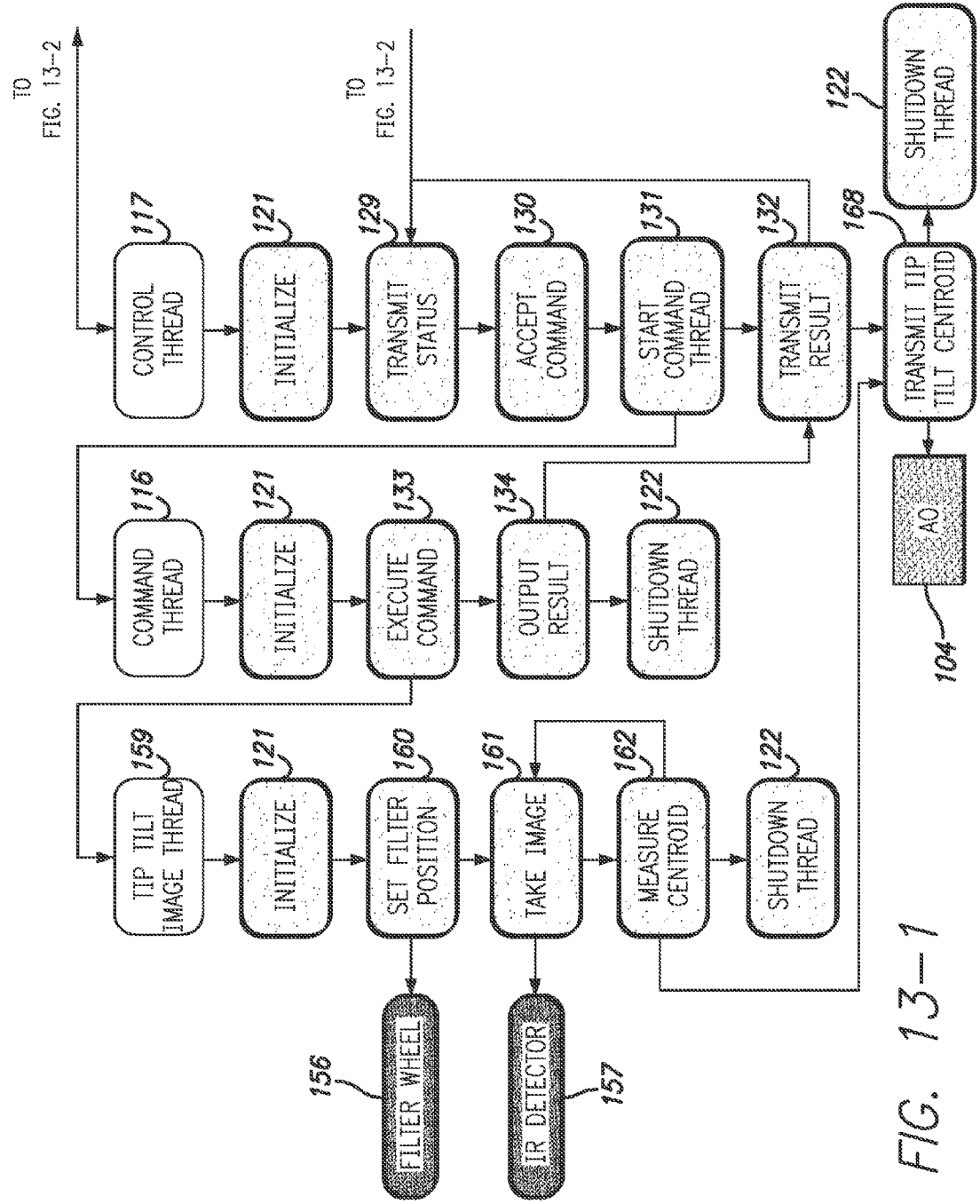
Figures 2, 13:
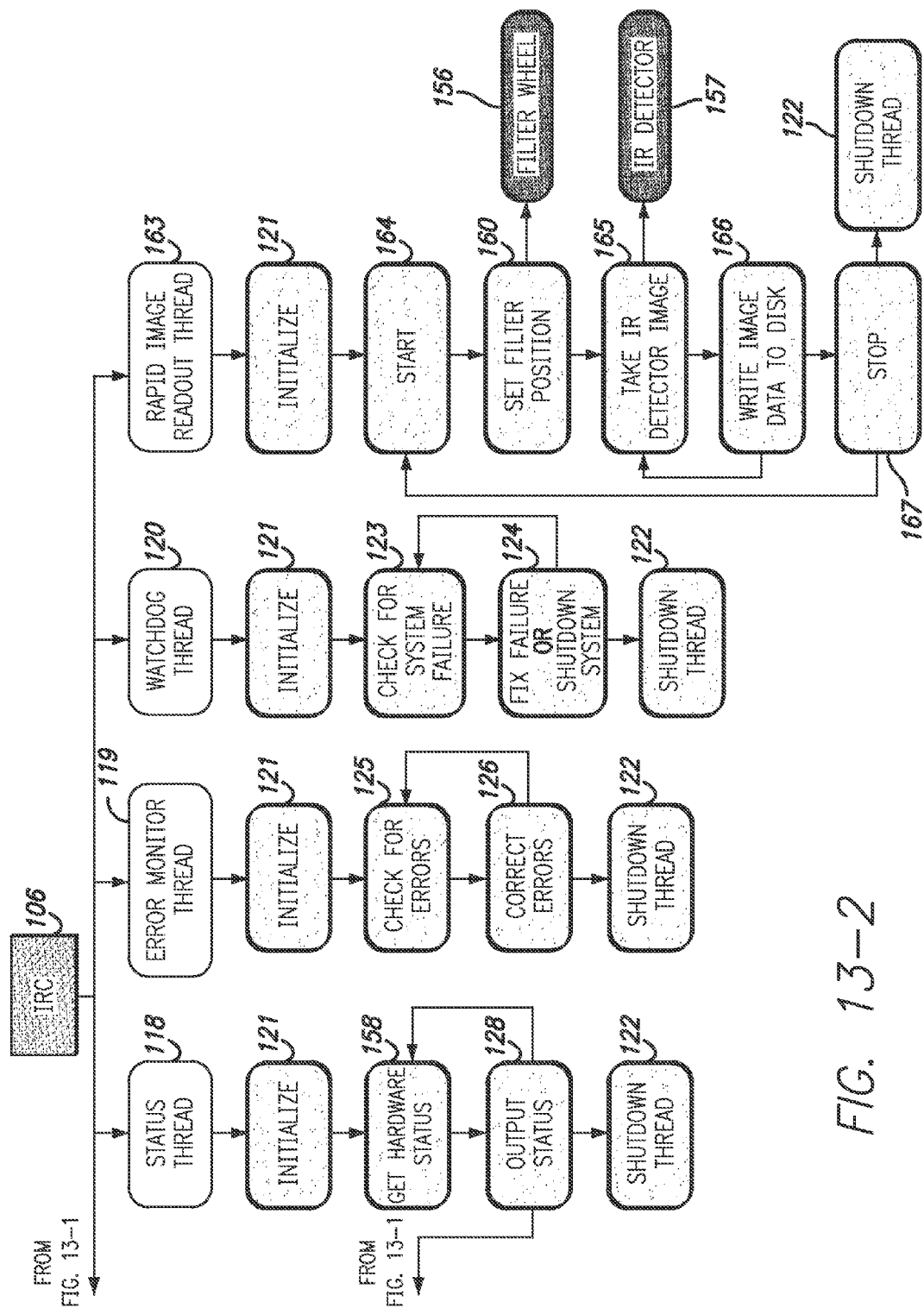

Next, FIGS. 13-1 and 13-2 show the software architecture of the IRC subsystem daemon (106). The IRC subsystem daemon (106) is constructed in a similar way to the VIC subsystem daemon (105) discussed above. Therefore, all functions of the IRC subsystem daemon (106) operate in a comparable way to the functions of the VIC subsystem daemon (105), with the exception that the IRC subsystem daemon (106) connects to an infrared (IR) detector (157).

The IRC subsystem daemon (106) and the VIC subsystem daemon (105) are interchangeable, as they both perform the same functions. As discussed above for the VIC subsystem daemon (105), the IRC subsystem daemon (106) also gathers image data in regular and rapid readout modes as well as acquires and calculates tip tilt image centroids for the AO system (2) in a similar manner.

Figures 1, 14:
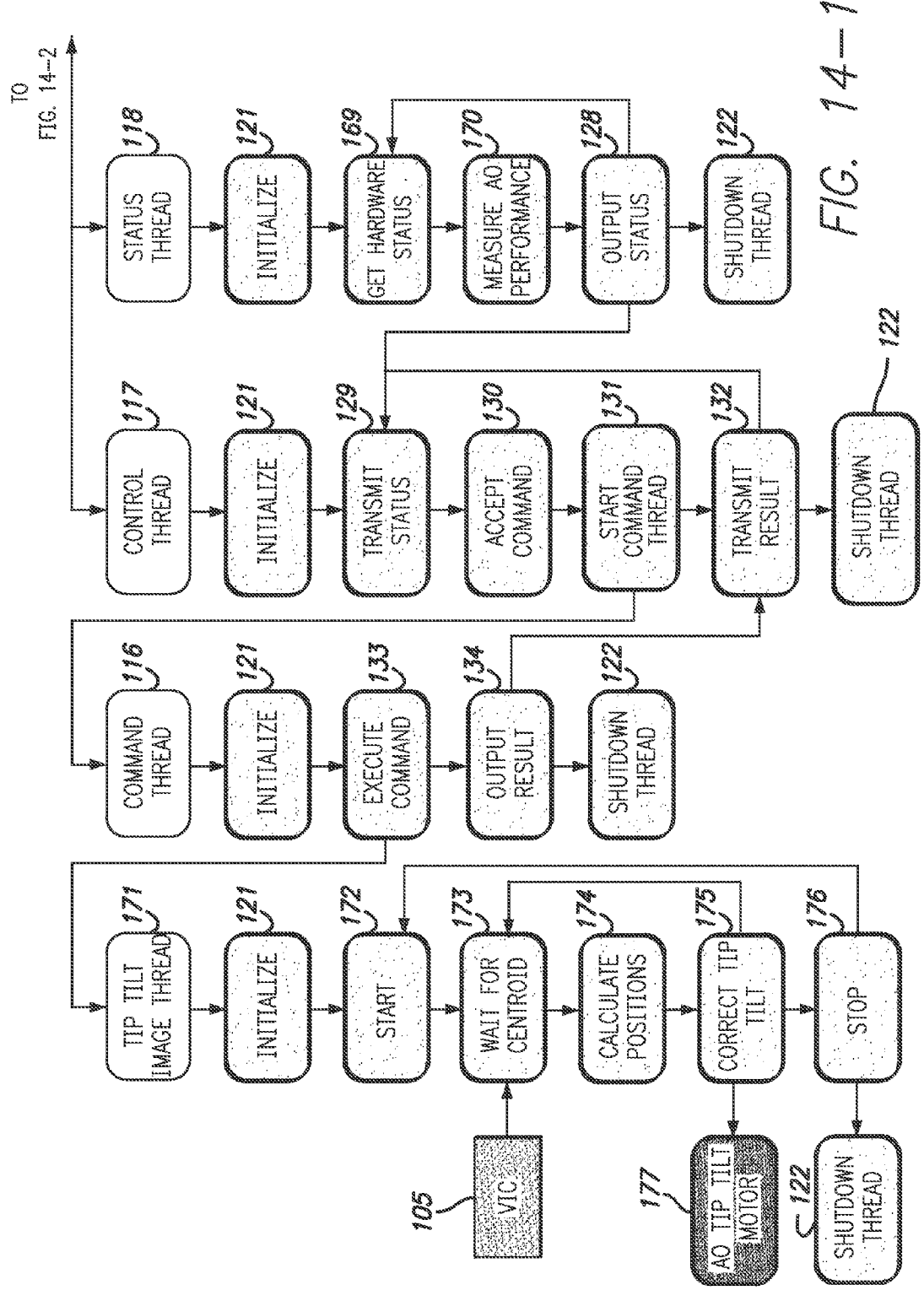
Figures 2, 14:
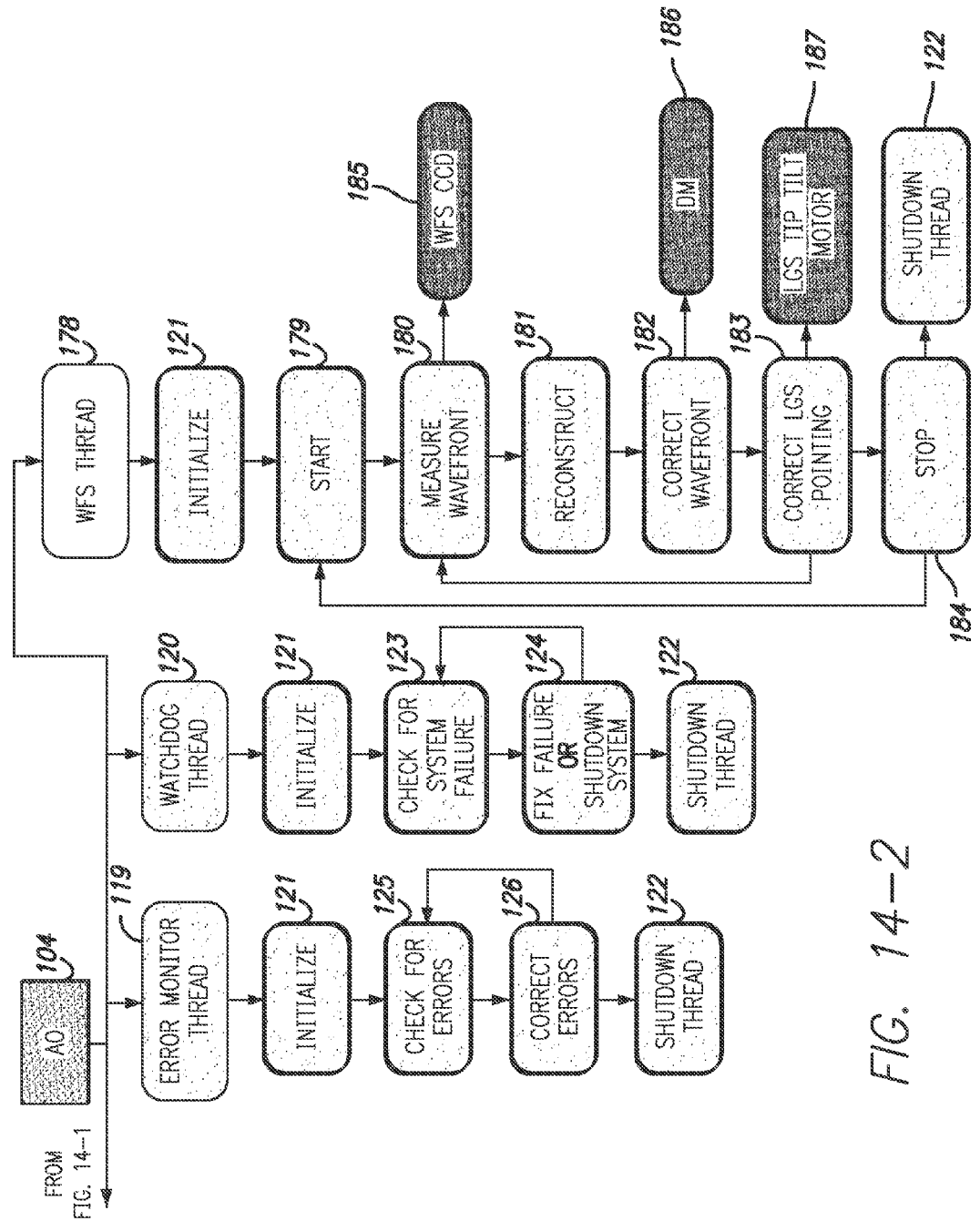

FIGS. 14-1 and 14-2 shows a software architecture of the AO subsystem daemon (104). In the embodiment of the figure, the AO subsystem daemon (104) directly controls several pieces of hardware: the wavefront sensor detector (65), the deformable mirror (42) and the fast steering mirror (48) of the AO system, and the moveable beam steering mirror (9) of the compact laser projection system (4).

As discussed above, the point of modularizing the Robo-AO system is that the AO subsystem daemon will not change, but different hardware/interface software can be plugged into the AO subsystem daemon to control different pieces of hardware. For example, a different wavefront sensor detector can be used in place of a current wavefront sensor detector without significant (if not any) changes to the AO subsystem daemon.

The hardware that can be controlled by the Robo-AO software includes motor motion controllers, camera systems, electronic systems and data collection systems. The Robo-AO software accesses these various hardware through the hardware link to the computer (e.g. USB, Firewire, TCP/IP) and through the Linux operating system drivers that connect programs in the operating system to the hardware.

The lower level hardware each have a software interface created for it within the Robo-AO software. The software interfaces (modules) can be plugged into the Robo-AO software as necessary to connect the command interface of the subsystem daemons to the hardware that the subsystem daemon controls.

Returning to FIGS. 14-1 and 14-2, the status of the AO system is monitored in the status thread (118) of the AO subsystem daemon (104). The AO performance is monitored at a rate of 1 Hz. In a similar manner as described for other subsystem daemons above, if an error is observed, the watchdog thread (120) steps in and attempts to correct the error as well as sends a message to clients that an error has been detected.

The AO subsystem daemon (104) has the five standard threads described above (command, control, status, error monitor and watchdog) but also has two extra threads, which are launched when the AO subsystem daemon (104) starts: the tip tilt image thread (171) and the wavefront sensor (WFS) thread (178).

The tip tilt image thread (171) is used to stabilize X-Y positioning of an object (e.g. target star) on the science camera (either VIC or IRC, depending on the operating mode). The stabilization corrects for atmospheric distortions and telescope and instrument motions that move the object around on the camera.

After the tip tilt image thread (171) is initialized (121), the tip tilt image thread (171) waits for a start signal to be sent to begin the correction process (172). The tip tilt image thread (171) waits for a centroid measurement (173) from the current camera. Although FIG. 14 shows that the camera used is VIC (105), it should be noted that IRC (106) can be used instead.

Once the centroid measurement is received from either the VIC or IRC, a corrected position is calculated (174) by comparing the new centroid measurement and previous centroid measurements and applying a gain value. The correction is then sent from the tip tilt image thread (171) to a AO tip tilt motor interface (177). The AO tip tilt motor is given a value that tells the motor a position to move to. The exact method of communication depends on the interface to the AO tip tilt motor.

The loop of acquiring centroid measurements, calculating a corrected position and providing the correction to the AO tip tilt motor interface is continued until the tip tilt image thread (171) is signaled to stop the correction. At this point, the tip tilt image thread (171) terminates the loop (176) and waits for the start signal.

Turning now to the description of the WFS thread (178). The WFS thread (178) is the heart of the AO system (2) because it does the correction for the atmospheric turbulence/distortion of the light from the object (e.g. star in the sky) for the AO system.

After initialization, the WFS thread (178) waits until a start signal is sent to begin the correction process (179). The signal to start the correction process (179) used with the WFS thread (178) is not necessarily the same signal sent to the tip tilt image thread (171) because the two threads (the WFS thread (178) and the tip tilt image thread (171)) operate independently.

Once the WFS thread (178) receives the signal to start, the WFS thread (178) initiates a correction loop. The correction loop for the WFS thread (178) runs at a rate of at least 1.2 kHz. Clients attached to the AO subsystem daemon (104) sends start commands for the WFS thread (178) thereby changing a state of a variable signifying whether the WFS control loop is paused or in an operational loop.

The AO system (2) commands the WFS CCD (185) to take an image to measure the wavefront (180) of the laser beam (5). The WFS image is a set of subapertures created by a lenslet array (63) in the AO system (2). Each subaperture is generally a square of four pixels. The centroid of each of these pixels is measured where generally the subaperatures do not all have the same centroid. The difference in centroids is due to the turbulence of the atmosphere plus the optical distortions of the telescope (1) and the AO system (2).

The WFS thread (178) then uses the frame to measure the distortion of the image and reconstructs the image to remove the effects of atmospheric turbulence (181). To reconstruct the image, the measured centroids are converted to slopes adjusted for static distortions in the AO system (2) and then converted to deformable mirror movement positions by using a previously constructed matrix that converts slopes to deformable mirror movements. The static distortions in the AO system (2) were previously measured as part of the AO system calibration.

With respect to deformable mirror movements, the commands are sent to the deformable mirror (42) through a hardware interface. The deformable mirror does not actively transmit its position to the AO subsystem daemon (104). However, determination of how successful the deformable mirror movements have been implemented is determined by measuring the next WFS CCD image. Depending on the results, another correction can be applied. Alternatively, if the deformable mirror is not operating properly (e.g. deformable mirror should be moving but it is readily apparent that it does not), the status and error control threads will note the problem, step in and attempt to fix the situation.

The above reference describes how a particular deformable mirror works in the present embodiment. As with all hardware interfacing, other deformable mirror may work differently. However, the overall Robo-AO system will still be operational in a similar manner regardless of which deformable mirror is used.

The X-Y position of the laser beam (5) is also measured in the WFS CCD image. The corrections for the laser beam (5) are obtained from the measurements so that the laser beam remains centered in the WFS CCD field of view. The commands to implement the corrections for the laser are sent to the tip tilt motor interface (187).

With reference to the corrections for the laser beam (5), tip and tilt measurements in the centroids of the WFS CCD images are due to movements of the laser across the sky. Measuring the tip and tilt values allows corrections of the laser position. This is similar to how the AO system corrections are measured and calculated. Instead of the tip and tilt measurements being sent to the deformable mirror as described above, the measurements are provided to a laser motor instead. Each measurement of the tip and tilt provides new correction for the laser through the tip tilt motor position. This constant correction allows the laser position to be continually updated.

In an embodiment of the present disclosure, the tip tilt motor commands (for the laser and the AO system) are sent through the deformable mirror command interface corresponding to a particular feature of the deformable mirror electronics system, which facilitates the corrections. However, as stated above, this particular hardware interface may be unique to Robo-AO based on particular hardware present. Other embodiments can utilize different lasers and/or deformable mirror hardware interfaces but essentially the same software of the Robo-AO can be used. Again the significance is to allow replication of the Robo-AO control system and increased modularity of the different subsystems controlled by the Robo-AO.

With reference back to FIGS. 14-1 and 14-2, the above loop for laser position correction is continued until the AO subsystem daemon (104) is signaled to stop the correction. At this point, the WFS thread (178) terminates the loop (184) and waits for a future start signal to resume corrections.

Figures 1, 15:
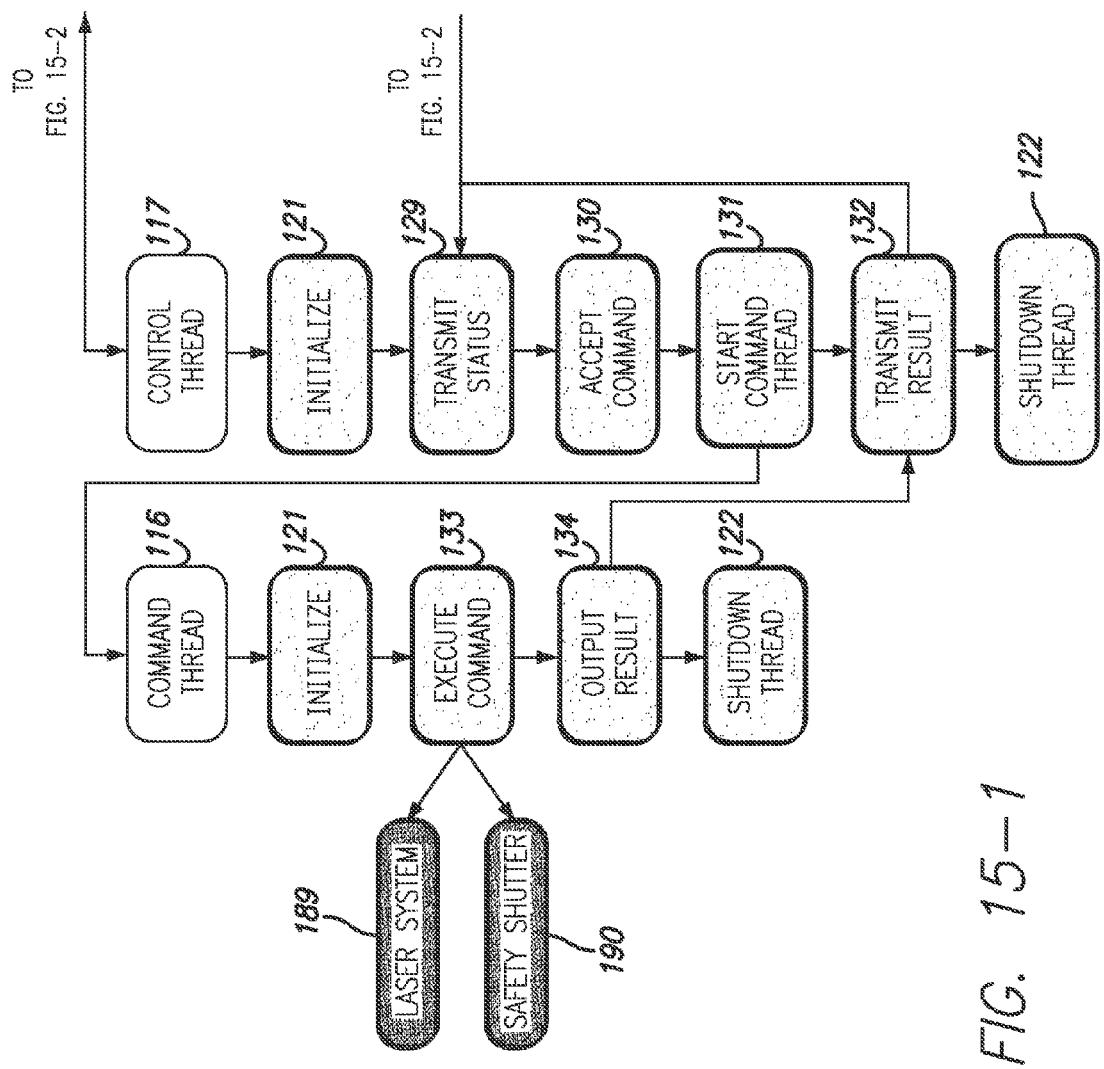
Figures 2, 15:
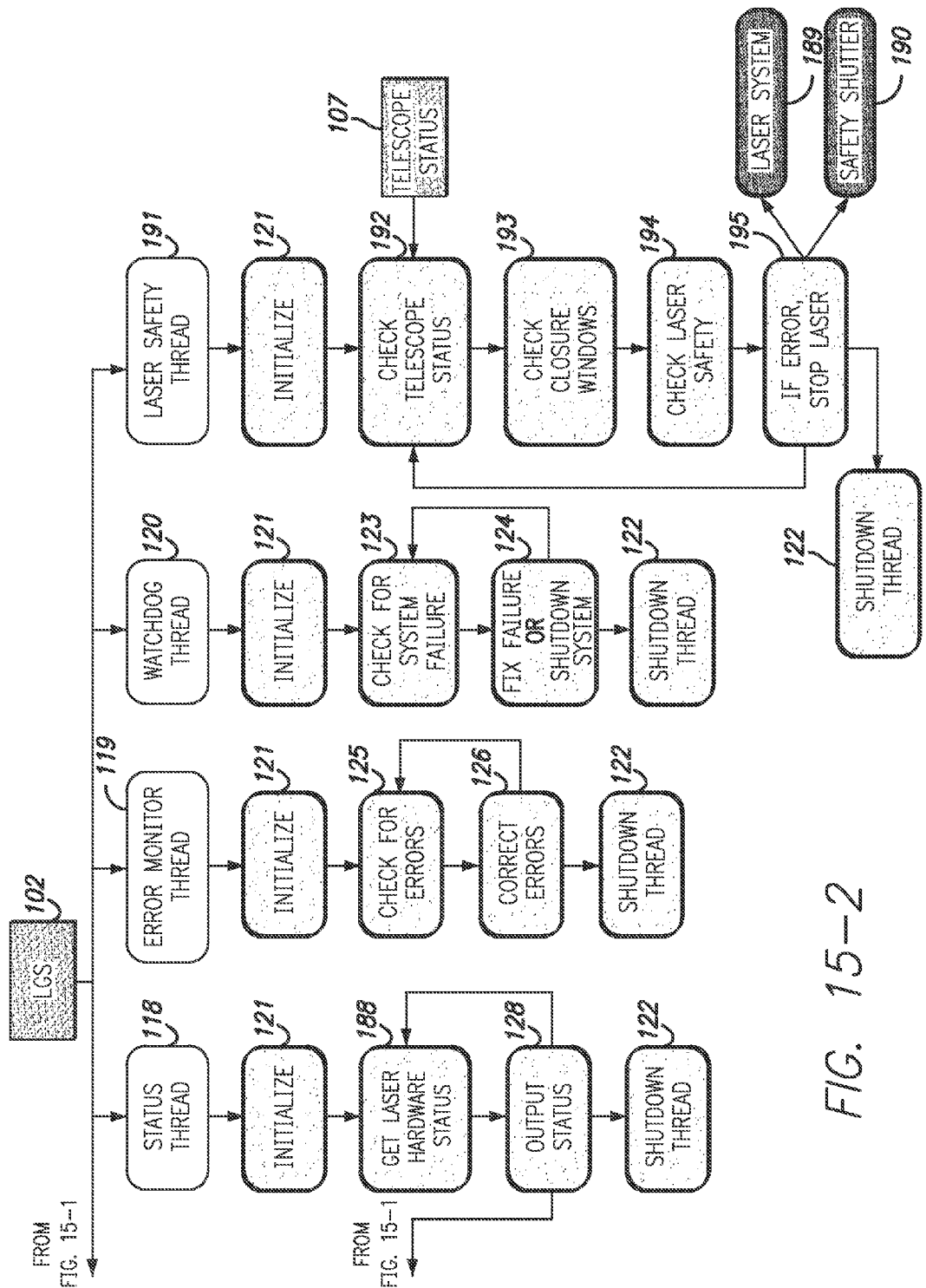

Now discussion will turn to FIGS. 15-1 and 15-2 which show the software architecture of the laser beam guidance subsystem daemon (102). The laser beam guidance subsystem daemon (102) controls all operations of the compact laser projection system (4). The status thread communicates with the compact laser projection system (4) to read the laser status (188). The laser beam guidance subsystem daemon (102) also directly operates the laser hardware (189) when a command thread (116) is executed.

The laser safety shutter (7) is also controllable through the command thread (116) of the laser beam guidance subsystem daemon (102). The laser safety shutter (7) is used to stop the laser beam from propagating out of the compact laser projection system (4) as an additional safety measure as stated above.

Aside from the five threads that all subsystem daemons contain, as described above, the laser beam guidance subsystem daemon (102) also has a laser safety thread (191) that is launched when the laser beam guidance subsystem daemon (102) starts. The laser safety thread (191) monitors operation of the laser to insure that the laser only operates when it is safe to do so.

After initializing the laser safety thread (191), the laser safety thread (191) goes into a continuous loop that has several safety checks that are done. First, the laser safety thread (191) checks the status of the telescope (192) and if the telescope is communicating properly. The latter is obtained by reading the telescope status control subsystem daemon (107). If communications with the telescope status control subsystem daemon (107) fail, or if the telescope has a safety issue, the laser safety thread (191) throws a flag to indicate the occurrence of the failure.

Next, the laser safety thread (191) checks that the laser closure windows are open for firing. Typically, the Robo-AO system clears operations with USSTRATCOM®, which sends open windows to laser operators to avoid lasing of satellites. In situations where there exists a laser closure window, which is generated by USSTRATCOM®, the closure windows are handled automatically by the Robo-AO system.

The last check made by the laser safety thread (191) is regarding safe operation of the laser hardware (194). If there are any issues with the laser firing, the laser system operations are stopped (195), and operations are not allowed to restart until it is again safe to do so.

Discussion has been provided relating to the subsystem daemons (101-108) as shown in FIG. 7. Additionally, the Robo-AO system can also be provided with two additional subsystem daemons: a queue scheduler and a power system.

The current observing system is embedded inside the robotic control system (100). The robotic control system (100) takes a predetermined list of objects (e.g. astronomical objects) and observes them in order. A simple facility is in place to skip observations for unavailable targets (concerning laser closure windows) or objects that are not observed successfully (due to system errors). Furthermore, these observations can be repeated if necessary.

This is contrasted with the queue scheduler subsystem daemon, which has a library of available objects to observe. The observation information for the available objects is stored, for example, in an XML format file. The queue scheduler daemon is able to check a number of different functions or parameters such as current conditions (such as telescope position, weather, atmospheric seeing), laser closure window times, target access and observation parameters. The queue scheduler daemon then ranks the observation targets based on functions or parameters. The observation target that is ranked first after these checks performed by the queue scheduler daemon is passed to the robotic observing system (100) to be observed. After the observation of the target is complete, the object is taken out of the list of available observations. The queue scheduler daemon allows the robotic observing system (100) to select from thousands of targets at a time but also increase observing efficiency and scientific output over the current method.

The other additional daemon mentioned above which could also be implemented in the layout of FIG. 7 is the power system subsystem daemon. All the hardware for the robotic control system (100) is plugged into a network power switch (NPS), which can be controlled by computer commands. In the current embodiment, power switching is handled by each subsystem daemon separately as necessary. This can cause issues if two subsystem daemons attempt to command the NPS at the same time.

Alternatively, a central power system can be implemented to solve the above issue. In particular, the power system subsystem daemon can monitor the state of the power system and handle switching in an intelligent manner. Clients (which can include all Robo-AO subsystems) will send commands to turn the power on or off and to check the state of the power switch. The power system subsystem daemon will be able to monitor the state of the power switch, and if there is a failure, signal the clients that there is an error. This signal can be used by the robotic control system (100) to stop operations. Furthermore, queued power switching, or sending a signal to switch multiple systems at one time are possible implementations to increase efficiency relating to the operation of the system. Additionally, the queued power switching and simultaneous switching of multiple systems can also enhance safety especially in emergency conditions where all power can be instantly switched off at once.

Reference is now made to FIGS. 16-1 and 61-2, which shows the basic architecture of the subsystem daemon of the robotic control system (100) as seen, for example, in FIG. 7. As the central control system for the Robo-AO system, the robotic control system (100) can access information from all the other subsystem daemons (e.g. 101-108). Furthermore, the robotic control system (100) can also send commands to the other subsystem daemons (101-108) for the other subsystem daemons (101-108) to execute scientific observations.

The robotic control system (100) has a multi-threaded structure similar to the other subsystem daemons. After initialization of the threads, the watchdog thread (120) monitors operations of the robotic control system (100). Similarly, if the robotic control system (100) experiences a failure, the watchdog thread (120) either fixes the error or shuts the daemon down.

Typically, in accordance with the present disclosure, if a subsystem has a failure (such as a camera cooling shutting off or the laser not starting properly), the error monitor thread of the subsystem that has an error passes an error message to clients connected to it.

The error monitoring thread (119) receives errors from the subsystems that occur during operations (as opposed to errors that occur during execution of a command). The error monitoring thread (119) of the robotic control system (100) also receives the error message provided above. In most cases, the error monitoring thread (119) makes a determination if the error identified requires the robotic control system (100) to stop operations.

It should be noted here (as similarly stated above) that aside from the robotic control system (100), all connected clients receive error messages from any connected subsystem daemon so that such clients can take appropriate action. Each of the subsystems of the Robo-AO system is individually responsible for its operations, so that errors affecting the various subsystems are handled locally. Additionally, the robotic control system (100) sends commands to back up the operations done at the local level or to monitor the subsystems to ensure that the subsystems perform the right action in response to the error. The end result is that such a system allows for better flexibility because each client subsystem does not necessarily take the same action when the same error is encountered.

For example, with respect to an laser beam guidance subsystem, a situation may arise when dealing with a closure. In a situation where the telescope communications show an error that is communicated to both the robotic control system (100) and the laser beam guidance subsystem daemon (102), the latter can immediately stop laser operations for safety reasons to handle the problem at a local level. Alternatively, if the error is provided just to the robotic system (100), which would then command the laser beam guidance subsystem daemon (102) to stop the laser, it is possible that the error signal and/or the command provided to the laser beam guidance subsystem daemon (102) could be delayed or missed thereby causing the laser not to shut down properly. However, once the error has been cleared, the robotic control system (100) will continue normal operations.

Figures 1, 16:
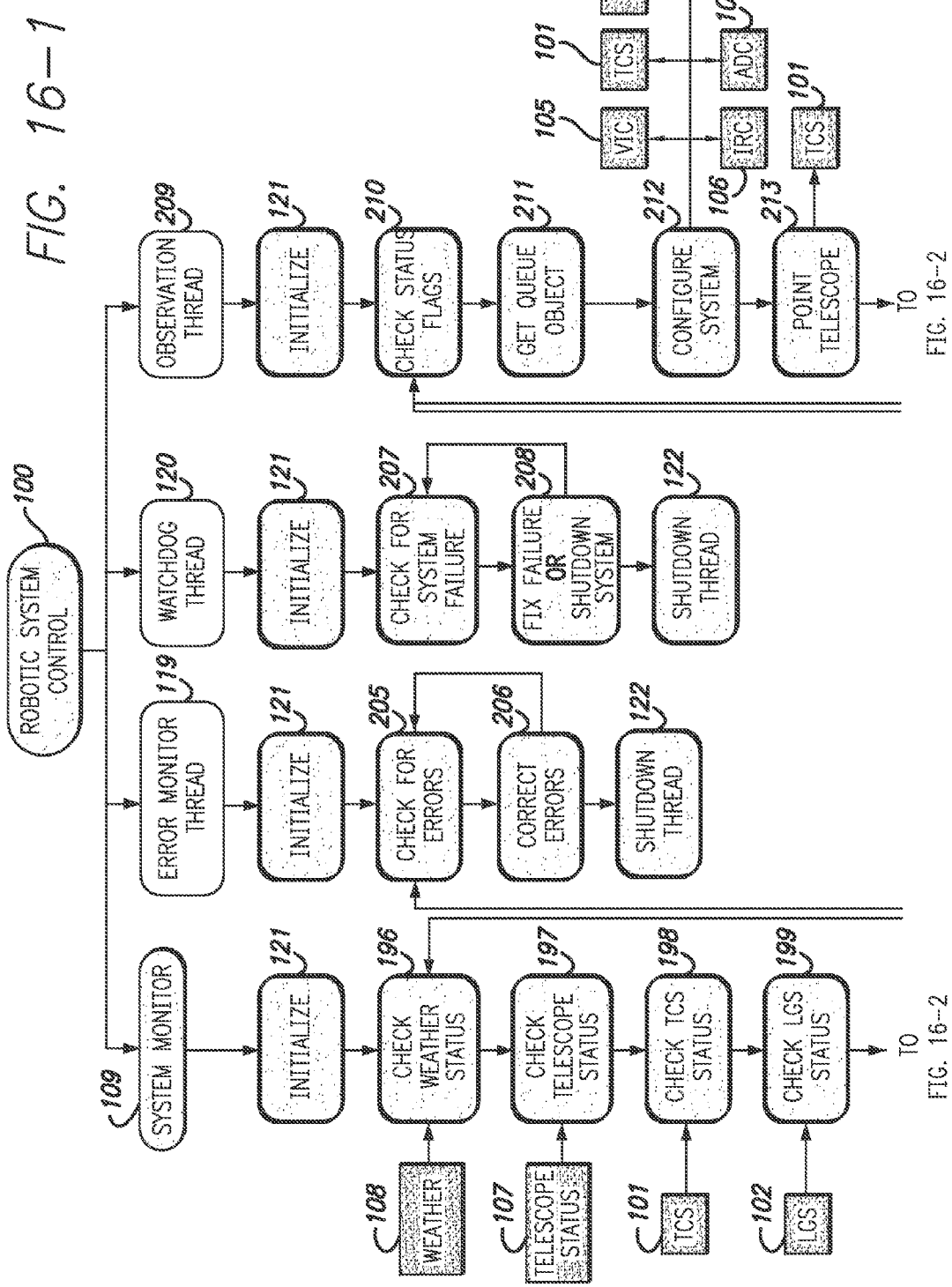
Figure 16:
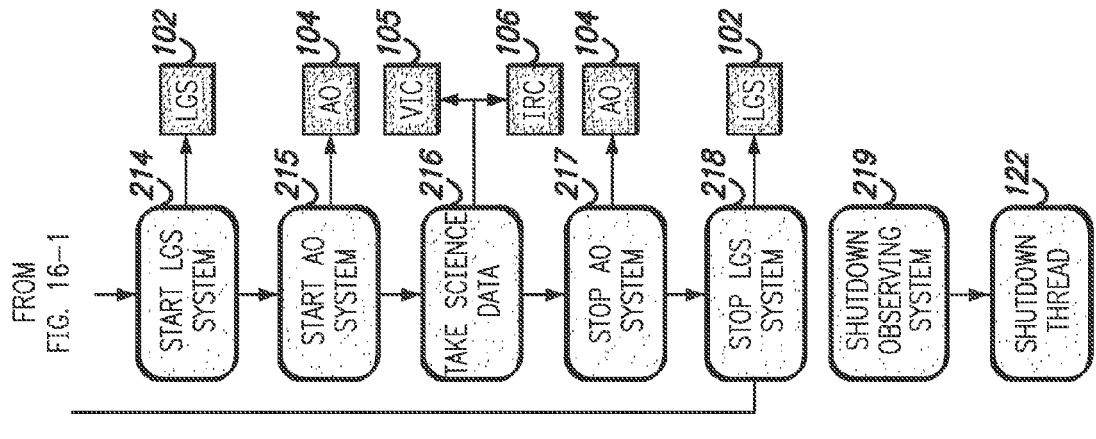
Figure 2:
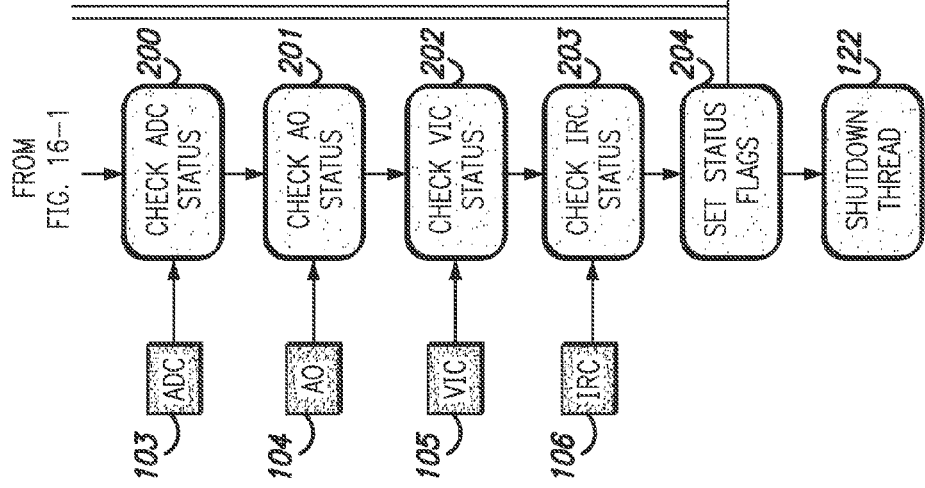

As seen in FIG. 16, a system monitor thread (109) has been created as a thread inside the robotic control system (100). However, the system monitor thread (109) could also be a separate subsystem daemon as well.

After initialization, the system monitor thread (109) reads the state of each of the subsystem daemons (101-108) through the client-server connections. All the subsystem daemons (101-108) send their state continuously to their respective clients.

As each subsystem daemon state is checked, flags are set to indicate the status. For example, a weather state flag is set when the weather monitor control subsystem daemon (108) is checked. If any of the weather parameters are outside of a predefined safe operational limit, the flag is set to indicate to the robotic control system (100) that the robotic control system (100) should stop operations and wait until the weather is safe for operations. In fact, each check of a subsystem daemon sets flags that indicate to the robotic control system (100) if operations should pause, continue, or completely stop.

The above operation of checking status/states and setting flags continues the entire time the robotic control system (100) is in operation. Any failure of the system monitor thread (109) can be caught by the watchdog thread (120). Without proper operation of the system monitor thread (109), the entire robotic control system (100) may not operate safely.

Returning to FIG. 16, discussion now turns to the observation thread (209). The observation thread (209) controls the scientific operation of the robotic control system (100). The observation thread (209) undergoes initialization (121). The initialization (121) includes additional steps such as initializing all subsystem daemons, preparing the telescope for operation, waiting for cooling systems to cool instrumentation, taking calibration frames and then waiting for the system monitor thread (109) to clear the observing thread (209) for operations.

Once operation of the observation thread (209) starts, the observation thread (209) goes through a sequence to gather scientific observations:

Select the next object (e.g. an astronomical object) from the observing queue (211).
Configure the Robo-AO system (i.e. all subsystem daemons) for observations (212).
Point the telescope (213) towards the targeted object (213).
Start the laser beam guidance system (214).
Start the AO system (215).
Take appropriate scientific observations (216).
Stop the AO system (217).
Stop the laser beam guidance system (218).

The above sequence continues until the robotic system (100) is paused due to weather or other instrument issues. The system then continues when it is safe to operate again. At the end of the night, the observation thread (209) shuts down all subsystem daemons and terminates all operations (219) of the robotic control system (100).

As discussed above, the watchdog control system (112) (as seen in FIG. 7) monitors operation of the entire system with its own embedded system monitor. If the robotic control system (100) has a failure, or any other subsystem daemon has an error to which the robotic control system (100) does not react, the watchdog control system (112) can take over and handle the error.

For example, if the observation thread (209) of the robotic control system (100) experiences an error, the watchdog control system (112) will attempt to restart the observation thread (209). If the watchdog control system (112) is unable to restart the robotic control system (100) successfully, the robotic control system (100) is shut down. A subsequent email message is provided requesting human intervention.

Figures 1, 17:
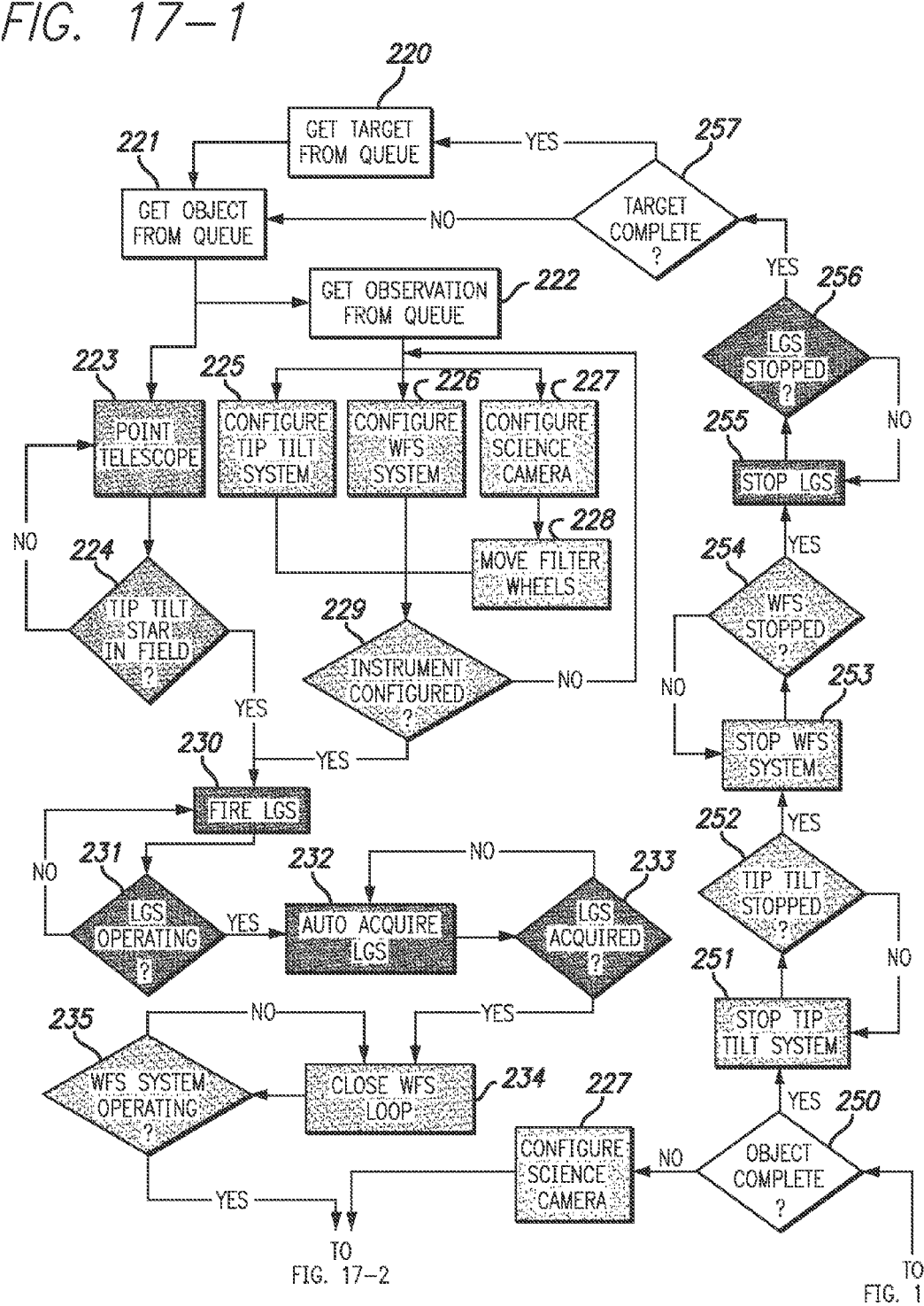
Figures 2, 17:
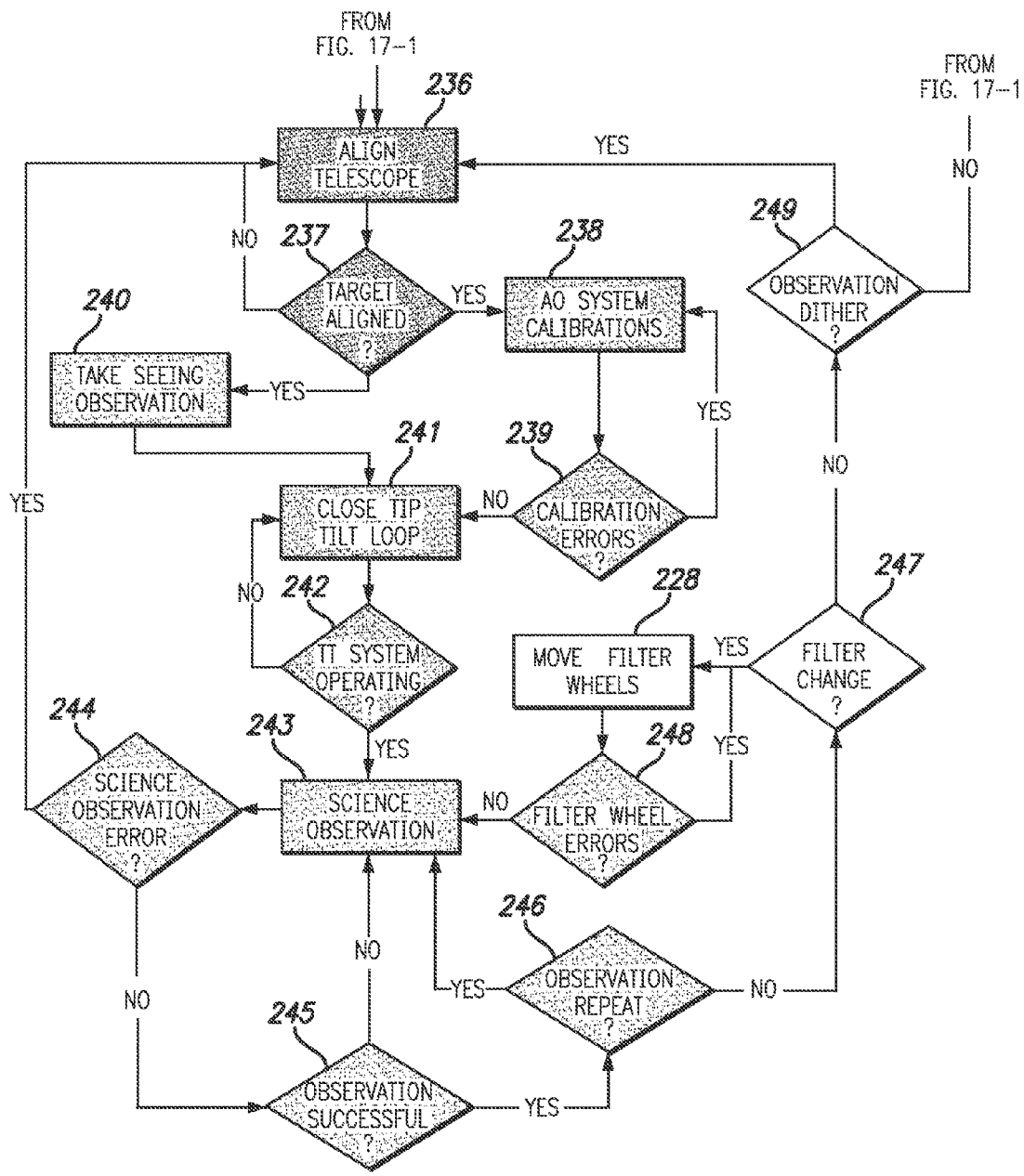

Reference is now made to FIGS. 17-1 and 17-2, which show a detailed flow chart of the observation thread (209) of the robotic control system (100). The flow chart shows execution of the observing loop during each iteration for obtaining scientific observations when made for the robotic control system (100).

In the first step of the observing loop, the observation thread (209) determines the next target to observe (220). The target for observation is defined as a set of objects (e.g. astronomical objects) that together creates a scientific observation as part of an observation program. Targets can also be composed of multiple astronomical objects. Once a target is selected, the next object to be observed is selected (221). Then the next observation for that object is selected (222).

The observation thread (209) can execute filter changes, dither observations, or other operations for the astronomical objects that require multiple exposures as part of an observation. The observation setups to be executed by the observation thread (209) are configured by the scientists responsible for the observations and provide the desired parameter.

Once the target is selected, the robotic control system (100) starts the observing sequence. In parallel operations, commands are sent to move the telescope (223), to configure the AO system, to configure the science camera (227) and move the filter wheel if necessary (228). When configuring the AO system, the robotic control system (100) controls both the tip tilt (225) and WFS (226) systems.

The robotic control system (100) is capable of checking if the above operations running in parallel with the observing sequence are completed successfully (224, 229). Once the systems and hardware are configured, the observation thread (209) moves to the next step. However, if a command failure occurs, the error monitor thread (119) of the robotic control system (100) takes over and attempts to determine the error and fix it. Command errors are communicated back to the robotic control system (100) from the subsystem daemons. In the event that the command failure results in an error, which is unrecoverable, the robotic control system (100) will shut down and send an email for human intervention. As similarly discussed above, this error control paradigm is used for all Robo-AO functions.

The next step of the observation thread (220) is to propagate the laser (230) and check that the laser is operating properly (231). If it is found that the laser is operating properly, the laser beam guidance system to acquire the laser is started (232). The system then waits until the laser is acquired on the WFS CCD (223).

Once the laser is acquired on the WFS CCD (223), the AO system is started and the loop relating to the laser is closed. The loop relating to the laser aims to keep the laser in position and starts the active wavefront correction with the deformable mirror (234). If there are no errors (235), the robotic control system (100) starts setting up for science observation of the targeted object. The tip tilt system sets the reference object to a particular spot on the science CCD (236). Once in place, the AO system is calibrated (238).

In parallel to the calibration of the AO system, a reference seeing measurement is made (240). This measurement is used to measure the performance of the system. If there are no errors (237, 239), the tip tilt loop is started (241). Afterwards, once the tip tilt loop begins operation, science observation is executed.

After a science observation is finished, the observation thread (209) checks to see if the observation was successful. If an error happens during the science observation (244), the observation is attempted again.

After completion of the science observation, the observation thread (209) steps through any other exposures associated with the observation. Some observations are repeated multiple times so a check for a repeat is made (246). If a repeat is required, the science observation is executed again for the same target.

Furthermore if the same object is observed in multiple filters (247), a filter change is made (228, 248) and the science observation completed for the object. If a dither observation is required (249), in other words situations where the telescope position is shifted, then the entire observing sequence is repeated with the new telescope alignment.

If after all of the above steps, there are still exposures to execute for the science observation (250), the required reconfiguration of the science camera (227) and the subsequent scientific observation are executed.

Once the science observations for the object are all complete, the observation thread (209) is ready to move to a new astronomical object for the next set of observations. The tip tilt system is stopped (251, 252), followed by the stopping of the WFS system (253, 254) as well. The laser beam guidance system is stopped next (255, 256). Afterwards, a check on queue targets is made (257). If the queue target still has objects available for observation, the object is selected. Otherwise, the current target is marked completed and a new queue target is selected (220). After the selection of a new object, the sequence starts again.

Figure 18:
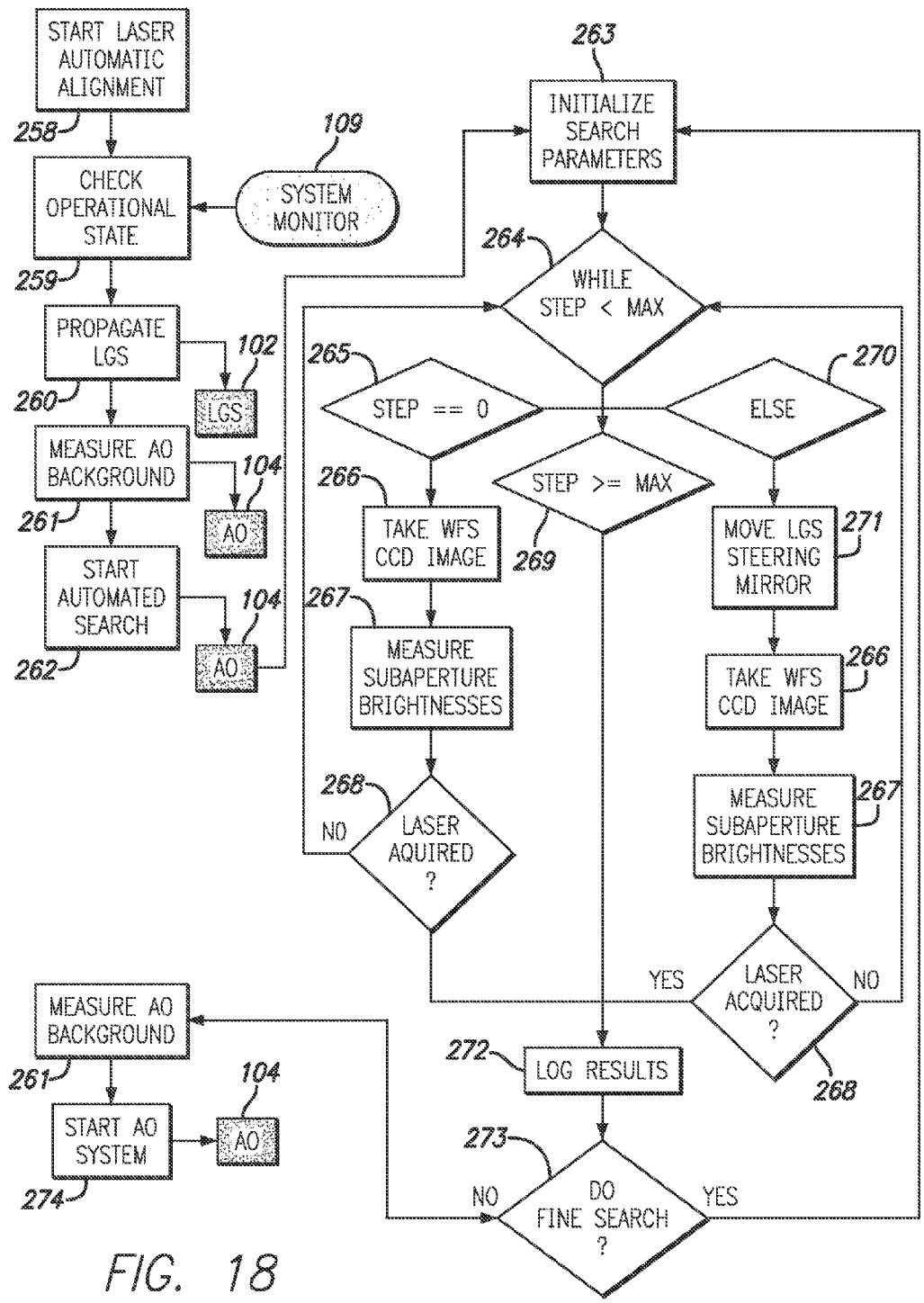
FIG. 18 shows a flow chart for an operation of a laser beam guidance system.

Earlier, the application described the operations of the laser beam guidance system. FIG. 18 shows a flow chart for the operation of the laser beam guidance subsystem. The laser beam guidance subsystem uses the WFS CCD and laser steering mirror in concert to find the spot the laser creates in the sky and center the spot on the WFS CCD.

The laser beam guidance subsystem is built into the AO system (2), but uses the compact laser projection system (4) to propagate the laser beam into the atmosphere. Generally the AO system (2) is calibrated before operating.

The robotic control system (100) first checks for a safe operating state of the AO system (259) through the system monitor thread (109). Next, the compact laser projection system (4) propagates a laser beam (5) with a command from the laser beam guidance subsystem daemon (102). If the laser propagation is successful, the AO system is calibrated (261).

With respect to the WFS CCD, when the background image is taken (261), Pockels cell (61) stops allowing light from the laser beam through (except for a slight amount). This slight amount allows measurement of the background in UV light. That background measurement is removed from every image taken with the WFS CCD during AO operations (both during the automated laser search and AO correction). The laser beam is then measured by the WFS CCD images to capture, align and center the laser beam. Leftover light is due to the laser light being scattered. Very little UV light from astronomical objects can reach the ground.

Calibration using the laser beam is accomplished by taking a background image, which increases the performance of the WFS CCD. Once these steps are accomplished, the automated laser acquisition function is run (262) by sending a command to the AO subsystem daemon (104).

The automated laser acquisition function then starts out by initializing variable and array values to initial states (263). The automated laser acquisition function also resets the moveable beam steering mirror (9) to its center position, and initializes the operation of the WFS CCD. Once the initialization is complete, an initial image is taken with the WFS CCD (265).

A WFS CCD image is divided into several sub-apertures. In each sub-aperture of the WFS CCD images, a total brightness and centroid are measured (266). For laser centering automation, the measuring of brightness in each sub-aperture allows to mark a sub-aperture as "acquired" when the sub-aperture brightness is greater than a preset threshold.

When the initial WFS CCD image is taken, the number of acquired sub-apertures are counted. If the number of acquires sub-apertures exceed a preset percentage of the total number of sub-apertures, then the search is stopped (268). If the number of acquired sub-apertures is below the acquisition threshold, then the moveable beam steering mirror (9) is moved one step in a set direction (271) and another WFS CCD image is taken and analyzed (266, 267).

The moveable beam steering mirror (9) is moved a preset angle corresponding to a physical motion of the motor associated with the moveable beam steering mirror (9). The physical motion for moving the moveable beam steering mirror (9) is done in a spiraling pattern from the center of the motor range to its limit of travel.

The above procedure is repeated for each position of the laser steering mirror (270) until the number of acquired apertures exceeds the set percentage. If the search fails to acquire the laser beam (269), an error is sent to the robotic observing system (100). Failure states can include (but are not limited to): poor WFS CCD backgrounding, laser shutoff, clouds or atmospheric phenomena, or an extremely bright background source.

The adaptive optics handles failures by re-measuring the background and attempting the centering procedure again. However, if the AO system fails enough times the robotic control system (100) skips to another observing target.

When the acquisition is successful (268), the spiral search is stopped at that position. Continued searching after acquisition is inefficient and unnecessary. However, a second, finer search can be run at this point (273), using the same procedure as the first spiral search but with a higher threshold for the percentage of acquired sub-apertures and a smaller step size.

Once the search for the laser beam is finished, a log message of the results of the search is produced that details what happened during the automated search process (272). A success or failure message is sent to the robotic control system (100). If the search was successful, the robotic control system (100) takes another AO system background image (261) and then starts operation (274). This additional step is used to increase the performance of the AO system operations.

The laser beam guidance subsystem position is then measured by first centroiding the sub-apertures. Afterwards, the laser beam is steered until it is centered in the sub-apertures. This sub-aperture centering continues throughout the time the adaptive optics system is operating, automatically keeping the laser aligned on the sky with respect to the target.

Successful operation of the laser beam may require several steps. Although commands to the laser beam guidance subsystem daemon are sent through a connected client connection and can be done manually, when the robotic control system (100) is operational, the following operations are done automatically.

With respect to the laser beam guidance subsystem, after installation of the laser, laser chiller and all hardware connections, the laser beam guidance subsystem is powered on with a command sent to the laser beam guidance subsystem daemon that powers the laser on using the NPS system. For example, an embodiment might use a laser which requires 90 seconds to power up and start communications with the control computer. Therefore, the laser beam guidance subsystem daemon waits until communications have started. Furthermore, such communications can be provided through the use of serial port communications.

Once laser connection is established, the laser beam guidance subsystem daemon is commanded to initialize operations, which starts the compact laser projection system operations, activates the laser chiller system and reports the initial state of the laser. The laser chiller system begins operation immediately but takes some time to properly chill the laser head to operating temperatures. The robotic control system (100) waits until the laser temperature has stabilized before continuing operations.

Once the laser is ready to be propagated, the robotic control system operations (described above) can start. The telescope (1) is pointed at an object. Then the laser beam guidance subsystem safety system checks if it is safe to propagate the laser at that time. If it is not, another object is selected. Alternatively if it is safe, the laser beam guidance subsystem is commanded to start. This command propagates the laser inside of the compact laser projection system (4). The laser safety shutter is then opened which allows the laser to propagate out of the compact laser projection system (4) and, for example, into the sky.

The laser beam is focused by the output lens (12) at a height of 10 km above the end of the telescope tube in the direction of the telescope (1). The laser beam is automatically positioned at the center range of the tip tilt mirror at the start of laser operation. This initial positioning is performed by the AO system control anytime AO operations has started or stopped.

The robotic control system (100) then takes a background image of the AO system. This background measures the laser background signal at a current position with any background due to objects. The robotic control system (100) then sends the measurements through the laser beam guidance subsystem daemon routine explained above. Once an appropriate alignment is acquired, the laser beam is left in that position until the AO system starts operations. At that point, the tip tilt signal due to the laser motions is measured by the WFS CCD and signals are sent by the AO system to keep the laser in position.

The above process is continued until the present observation is complete, at which point the laser beam guidance subsystem daemon is commanded to stop propagation of the laser beam from the compact laser projection system and the laser safety shutter closed. If there is an error during operations, the laser beam guidance subsystem is automatically stopped, the safety shutter closed and a signal sent to the robotic control system (100). The robotic control system (100) would then stop the current scientific observation and attempt to fix the problem and move to another observation.

The observing procedure continues, going through other objects, until the end of the night or when all objects have been viewed. At that point, the laser safety shutter is closed. The laser beam guidance subsystem is then commanded to stop operations and then shut down. Once laser beam guidance subsystem shut down has been completed, the power to the laser and laser chiller are turned off with the NPS. Furthermore, the laser beam guidance subsystem daemon is then shut down as well.

The above description pertaining to the operation of the laser beam guidance subsystem daemon, as shown in FIG. 18, corresponds to 214 (starting the LGS system) and 218 (stopping the LGS system) of FIG. 16 when incorporated into the overall Robo-AO system.

With reference again to FIG. 16, after the shutdown of the LGS system (218), the Robo-AO subsystems are commanded to shutdown (219). This occurs, for example, at the end of the night, when all objects have been observed or if a system error forces a shutdown. Following the command to shutdown (219), the Robo-AO ensures that all threads have been closed properly (122) otherwise any active threads could hang the robotic system control (100) up.

The following morning after observation has been completed, housekeeping and archiving activities are done. Such activities are performed by separate software not associated with the robotic control system (100).

The examples set forth above are provided to give those of ordinary skill in the art a complete disclosure and description of how to make and use the embodiments of the robotic adaptive optics laser system, and are not intended to limit the scope of what the inventors regard as their disclosure. The skilled person may find other suitable implementations of the presented embodiments.

Figure 19:
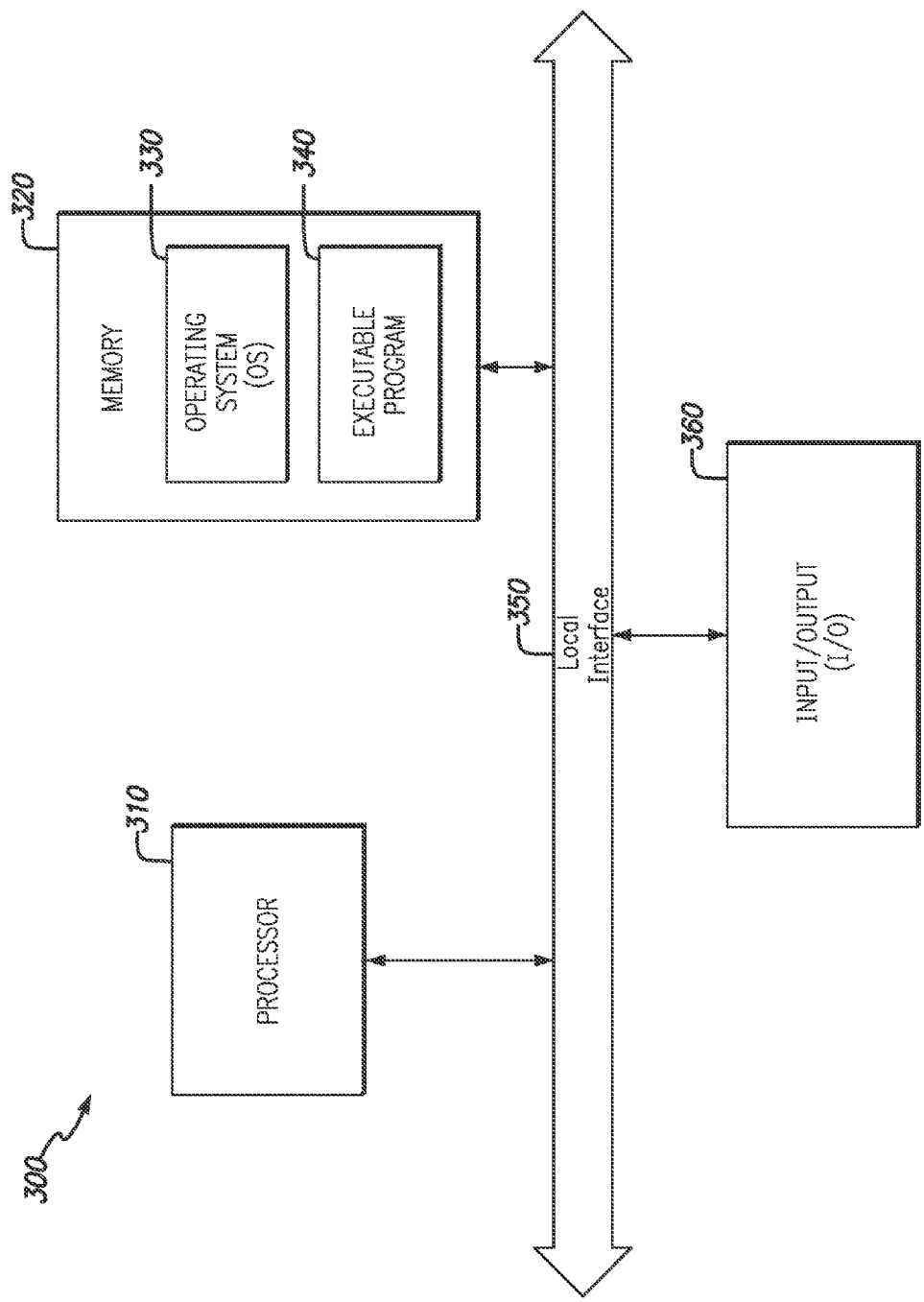
FIG. 19 shows a computer system that may be used to implement the robotic adaptive optics laser system of the present invention

Discussion will now proceed to FIG. 19 which shows a computer system that may be used in combination with the control software described above. It should be understood that certain elements may be additionally incorporated into computer system (300) and that the figure only shows certain basic elements (illustrated in the form of functional blocks). These functional blocks include a processor (310), memory (320), and one or more input and/or output (I/O) devices (360) (or peripherals) that are communicatively coupled via a local interface (350). The local interface (350) can be, for example, metal tracks on a printed circuit board, or any other forms of wired, wireless, and/or optical connection media. Furthermore, the local interface (350) is a symbolic representation of several elements such as controllers, buffers (caches), drivers, repeaters, and receivers that are generally directed at providing address, control, and/or data connections between multiple elements.

The processor (310) is a hardware device for executing software, more particularly, software stored in memory (320). The processor (310) can be any commercially available processor or a custom-built device. Examples of suitable commercially available microprocessors include processors manufactured by companies such as Intel®, AMD®, and Motorola®.

The memory (320) can include any type of one or more volatile memory elements (e.g., random access memory (RAM, such as DRAM, SRAM, SDRAM, etc.)) and nonvolatile memory elements (e.g., ROM, hard drive, tape, CDROM, etc.). The memory elements may incorporate electronic, magnetic, optical, and/or other types of storage technology. It must be understood that the memory (320) can be implemented as a single device or as a number of devices arranged in a distributed structure, wherein various memory components are situated remote from one another, but each accessible, directly or indirectly, by the processor (310).

The software in memory (320) may include one or more separate programs, each of which comprises an ordered listing of executable instructions for implementing logical functions. In the example of FIG. 10, the software in the memory (320) includes an executable program (340) that can be executed to launch the various subsystem daemons in accordance with the present invention. Memory (320) further includes a suitable operating system (OS) (330). The OS (330) can be an operating system that is used in various types of commercially-available devices such as, for example, a personal computer running a Windows® OS, an Apple® product running an Apple-related OS, or an Android OS running in a smart phone. The operating system (330) essentially controls the execution of executable program (340) and also the execution of other computer programs, such as those providing scheduling, input-output control, file and data management, memory management, and communication control and related services.

Executable program (340) is a source program, executable program (object code), script, or any other entity comprising a set of instructions to be executed in order to perform a functionality. When a source program, then the program may be translated via a compiler, assembler, interpreter, or the like, and may or may not also be included within the memory (320), so as to operate properly in connection with the OS (330).

The I/O devices (360) may include input devices, for example but not limited to, a keyboard, mouse, scanner, microphone, etc. Furthermore, the I/O devices (360) may also include output devices, for example but not limited to, a printer and/or a display. Finally, the I/O devices (36) may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer system (300) is a PC, workstation, or the like, the software in the memory (320) may further include a basic input output system (BIOS) (omitted for simplicity). The BIOS is a set of essential software routines that initialize and test hardware at startup, start the OS (330), and support the transfer of data among the hardware devices. The BIOS is stored in ROM so that the BIOS can be executed when the computer system (300) is activated.

When the computer system (300) is in operation, the processor (310) is configured to execute software stored within the memory (320), to communicate data to and from the memory (320), and to generally control operations of the computer system (300) pursuant to the software. The control system and the OS (330), in whole or in part, but typically the latter, are read by the processor (310), perhaps buffered within the processor (310), and then executed.

When the subsystem daemons are implemented, as is shown in FIG. 10, it should be noted that they can be stored on any computer readable storage medium for use by, or in connection with, any computer related system or method. In the context of this document, a computer readable storage medium is an electronic, magnetic, optical, or other physical device or means that can contain or store a computer program for use by, or in connection with, a computer related system or method.

The control system can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store, communicate, propagate, or transport the program for use by or in connection with the instruction execution system, apparatus, or device. The computer readable storage medium can be, for example but not limited to, an electronic, magnetic, optical, electromagnetic, infrared, or semiconductor system, apparatus, or device. More specific examples (a non-exhaustive list) of the computer-readable storage medium would include the following: a portable computer diskette, a random access memory (RAM), a read-only memory (ROM), an erasable programmable read-only memory (EPROM, EEPROM, or Flash memory) an optical disk such as a DVD or a CD.

In an alternative embodiment, where the control system is implemented in hardware, the audio data spread spectrum embedding and detection system can implemented with any one, or a combination, of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications can be made without departing from the spirit and scope of the present disclosure. Accordingly, other embodiments are within the scope of the following claims.

The invention claimed is:
1. A method comprising:
activating a laser projection system to propagate a laser beam, whereby at least a portion of the laser beam is returned to the system for detection of an error;
configuring an adaptive optics system to detect the detected error to perform a compensating action comprising modifying an operating characteristic of at least one optical component contained in the laser projection system; and
executing a computer-controlled automated acquisition procedure to automatically align the laser projection system, the automated acquisition procedure comprising:
capturing in a wavefront sensor, an image associated with a portion of the projected laser beam returned;

using information obtained by processing the captured image to perform a compensating operation directed at addressing the error; and executing an iterative routine that comprises:
- a) processing the image captured in the wavefront sensor to determine if an overall brightness level in the captured image exceeds an acquisition threshold;
- b) when below the acquisition threshold, changing at least one of an orientation or a curvature of a reflecting surface of the laser steering mirror; and
- c) repeating steps a) and b) and when equal to or exceeding the acquisition threshold, terminating the iterative routine.

2. The method of claim 1, wherein the error is a measured distortion of the laser beam being returned to the system, the measured distortion induced by the atmosphere.

3. The method of claim 1, wherein the automated acquisition procedure comprises an initialization procedure that includes placing a laser steering mirror in a default orientation.

4. The method of claim 1, further comprising:
providing a telescope configured to observe one or more objects, the telescope being associated with the laser projection system whereby the laser projection system projects a laser beam substantially parallel to a viewing axis of the telescope and the adaptive optics system whereby the adaptive optics system provides corrections to the telescope for distortion caused by the atmosphere based on a measured distortion obtained from a portion of the laser beam returned by the atmosphere by modifying an operating characteristic of at least one optical component contained in at least one of the telescope or the laser projection system.

5. The method of claim 1, wherein the telescope is also controllable by the automated laser alignment system.

6. The method of claim 1, wherein the one or more objects observed by the telescope are astronomical objects.

7. The method of claim 1, wherein modifying the operating characteristic of at least one optical component comprises operating a motor to modify at least one of an orientation of a principal axis of a mirror or a curvature of a surface of the mirror.

8. The method of claim 1, wherein determining if the overall brightness level in the image exceeds the acquisition threshold comprises:
dividing the processed image into a plurality of segments, each segment forming a corresponding image;
measuring a brightness level of each image corresponding to the plurality of segments.

9. The method of claim 8, further comprising:
determining a total count of segments each having a segment brightness level exceeding a threshold segment brightness level.

10. The method of claim 9, further comprising:
using the total count of segments as a parameter to determine if the overall brightness level in the captured image exceeds the acquisition threshold.

11. The method of claim 1, wherein changing the at least one of an orientation or a curvature of a reflecting surface of the laser steering mirror comprises moving the laser steering mirror in an outward spiraling pattern.

12. The method of claim 1, wherein the automated acquisition procedure comprises a first acquisition procedure that provides for a coarse level of alignment to the telescope followed by a second acquisition procedure that provides for a fine level of alignment to the telescope.

13. The method of claim 1, further comprising first checking for a safe operation state before activating the laser projection system.

14. The method of claim 1, further comprising repetition of the activating and executing steps until all objects are observed or a specified time has elapsed.

\* \* \* \* \*